US012565613B2

(12) United States Patent
Kim et al.

(10) Patent No.: US 12,565,613 B2
(45) Date of Patent: Mar. 3, 2026

(54) QUANTUM DOTS WITH DONOR-ACCEPTOR LIGANDS

(71) Applicant: Shoei Chemical Inc., Tokyo (JP)

(72) Inventors: Daekyoung Kim, Santa Clara, CA (US); Christian Ippen, Cupertino, CA (US); Ruiquing Ma, Morristown, NJ (US); Dylan Gary, Cheney, WA (US); Donald Zehnder, San Carlos, CA (US)

(73) Assignee: SHOEI CHEMICAL INC., Tokyo (JP)

( * ) Notice: Subject to any disclaimer, the term of this patent is extended or adjusted under 35 U.S.C. 154(b) by 806 days.

(21) Appl. No.: 17/859,595

(22) Filed: Jul. 7, 2022

(65) Prior Publication Data

US 2023/0036119 A1 Feb. 2, 2023

Related U.S. Application Data

(63) Continuation of application No. PCT/US2021/012574, filed on Jan. 8, 2021.

(60) Provisional application No. 62/958,373, filed on Jan. 8, 2020.

(51) Int. Cl.

| | |
|---|---|
| ***C09K 11/02*** | (2006.01) |
| ***B82Y 20/00*** | (2011.01) |
| ***B82Y 40/00*** | (2011.01) |
| ***C09K 11/08*** | (2006.01) |
| ***C09K 11/88*** | (2006.01) |

(52) U.S. Cl.

CPC ........ *C09K 11/025* (2013.01); *C09K 11/0883* (2013.01); *C09K 11/883* (2013.01); *B82Y 20/00* (2013.01); *B82Y 40/00* (2013.01)

(58) Field of Classification Search

CPC .. C09K 11/025; C09K 11/883; C09K 11/0883

See application file for complete search history.

(56) References Cited

U.S. PATENT DOCUMENTS

| | | | |
|---|---|---|---|
| 5,505,928 | A | 4/1996 | Alivisatos et al. |
| 6,207,229 | B1 | 3/2001 | Bawendi et al. |
| 6,225,198 | B1 | 5/2001 | Alivisatos et al. |
| 6,306,736 | B1 | 10/2001 | Alivisatos et al. |
| 6,322,901 | B1 | 11/2001 | Bawendi et al. |
| 6,576,291 | B2 | 6/2003 | Bawendi et al. |
| 6,607,829 | B1 | 8/2003 | Bawendi et al. |
| 6,788,453 | B2 | 9/2004 | Banin et al. |

(Continued)

FOREIGN PATENT DOCUMENTS

EP 2416392 A2 * 2/2012 ............. H05B 33/14

OTHER PUBLICATIONS

Bui et al., "Recent advances on organic blue thermally activated delayed fluorescence (TADF) emitters for organic light-emitting diodes (OLEDs) Beilsten," J. Org. Chem. 14:282-308 (2018).

(Continued)

*Primary Examiner* — C Melissa Koslow

(74) *Attorney, Agent, or Firm* — Alleman Hall LLP

(57) ABSTRACT

The present invention provides nanostructure compositions and methods of producing nanostructure compositions. The nanostructure compositions comprise a population of nanostructures comprising donor-acceptor ligands. The present invention also provides nanostructure films comprising the nanostructure compositions and methods of making nanostructure films using the nanostructure compositions.

16 Claims, 2 Drawing Sheets

(56) References Cited

U.S. PATENT DOCUMENTS

| | | | |
|---|---|---|---|
| 6,821,337 B2 | 11/2004 | Bawendi et al. | |
| 6,861,155 B2 | 3/2005 | Bawendi et al. | |
| 6,949,206 B2 | 9/2005 | Whiteford et al. | |
| 7,060,243 B2 | 6/2006 | Bawendi et al. | |
| 7,125,605 B2 | 10/2006 | Bawendi et al. | |
| 7,138,098 B2 | 11/2006 | Bawendi et al. | |
| 7,267,875 B2 | 9/2007 | Whiteford et al. | |
| 7,374,807 B2 | 5/2008 | Parce et al. | |
| 7,374,824 B2 | 5/2008 | Bawendi et al. | |
| 7,557,028 B1 | 7/2009 | Scher et al. | |
| 7,566,476 B2 | 7/2009 | Bawendi et al. | |
| 7,572,393 B2 | 8/2009 | Whiteford et al. | |
| 7,645,397 B2 | 1/2010 | Parce et al. | |
| 8,062,967 B1 | 11/2011 | Scher et al. | |
| 8,101,234 B2 | 1/2012 | Bawendi et al. | |
| 8,158,193 B2 | 4/2012 | Bawendi et al. | |
| 8,282,412 B1 | 10/2012 | Yaguchi et al. | |
| 8,563,133 B2 | 10/2013 | Whiteford et al. | |
| 9,169,435 B2 | 10/2015 | Guo et al. | |
| 9,899,619 B2 | 2/2018 | Lee et al. | |
| 2008/0237540 A1 | 10/2008 | Dubrow | |
| 2008/0281010 A1 | 11/2008 | Lefas et al. | |
| 2010/0110728 A1 | 5/2010 | Dubrow et al. | |
| 2011/0262752 A1 | 10/2011 | Bawendi et al. | |
| 2011/0263062 A1 | 10/2011 | Bawendi et al. | |
| 2015/0236195 A1 | 8/2015 | Guo et al. | |
| 2015/0315460 A1* | 11/2015 | Gim .................. | H10K 85/6572 977/774 |
| 2018/0158984 A1 | 6/2018 | Manders et al. | |

OTHER PUBLICATIONS

Duan et al., "Strategies to Design Bipolar Small Molecules for OLEDs: Donor-Acceptor Structure and Non-Donor-Acceptor Structure," Advanced Materials 23:1137-1144 (2011).

Kang et al., "High-performance bipolar host materials for blue TADF devices with excellent external quantum efficiencies," Journal of Materials Chemistry C 4:4512-4520 (2016).

Im et al., "Molecular Design Strategy of Organic Thermally Activated Delayed Fluorescence Emitters," Chemistry of Materials 29:1946-1963 (2017).

Liu et al., "Performance of Inverted Quantum Dot Light-Emitting Diodes Enhanced by Using Phosphorescent Molecules as Exciton Harvesters," J. Phys. Chem. C. 120, 8, 4667-4672 (2016).

Lian et al., "Subpicosecond Photoinduced Hole Transfer from a CdS Quantum Dot to a Molecular Acceptor Bound Through an Exciton-Delocalizing Ligand," ACS NANO, vol. 10, No. 6, pp. 6372-6382 (2016).

Califano, Marco, "Charge Dynamic in Quantum-Dot-Acceptor Complexes in the Presence of Confining and Deconfining Ligands," Journal of Physical Chemistry Letters, vol. 11, No. 1, pp. 280-285 (2019).

Li et al., "Influence of an exciton-delocalization ligand on the structural, electronic, and spectral features of the Cd 33 S 33 quantum dot: insights from computational studies," Journal of Materials Chemistry C., vol. 6, No. 32, pp. 8751-8761 (2018).

Kumar et al., "Novel dithiols as capping ligands for CdSe quantum dots: optical properties and solar cell applications," Journal of Materials Chemistry C, vol. 3, No. 9, pp. 1957-1964 (2015).

International Search Report and Written Opinion for PCT/US2021/012574, mailed Jul. 9, 2021, 26 pages.

Wells, R. et al., "The use of tris(trimethylsilyl)arsine to prepare gallium arsenide and indium arsenide," Chemistry of Materials Technical Report No. DU/DC/TR-10, Oct. 3, 1988, 13 pages.

Guzelian, A. et al., "Colloidal chemical synthesis and characterization of InAs nanocrystal quantum dots," Applied Physics Letters, vol. 69, No. 10, Sep. 2, 1996, 3 pages.

Xie, R. et al., "Colloidal InP nanocrystals as efficient emitters covering blue to near-infrared," Journal of the American Chemical Society, vol. 129, No. 50, Nov. 23, 2007, 2 pages.

Micic, O. et al., "Core-shell quantum dots of lattice-matched ZnCdSe2 shells on InP cores: Experiment and theory," The Journal of Physical Chemistry B, vol. 104, No. 51, Dec. 28, 2000, 8 pages.

Liu, Z. et al., "Coreduction colloidal synthesis of III-V nanocrystals: The case of InP," Angewandte Chemie International Edition, vol. 47, No. 19, Apr. 21, 2008, 3 pages.

Li, L. et al., "Economic synthesis of high quality InP nanocrystals using calcium phosphide as the phosphorus precursor," Chemistry of Materials, vol. 20, No. 8, Mar. 20, 2008, 3 pages.

Battaglia, D. et al., "Formation of high quality InP and InAs nanocrystals in a noncoordinating solvent," Nano Letters, vol. 2, No. 9, Aug. 15, 2002, 4 pages.

Kim, S., et al., "Highly Luminescent InP/GaP/ZnS Nanocrystals and Their Application to White Light-Emitting Diodes," Journal of the American Chemical Society, vol. 134, No. 8, Feb. 3, 2012, 6 pages.

Nann, T. et al., "Water splitting by visible light: A nanophotocathode for hydrogen production," Angewandte Chemie International Edition, vol. 49, No. 9, Feb. 22, 2010, 4 pages.

Borchert, H. et al., "Investigation of ZnS passivated InP nanocrystals by XPS," Nano Letters vol. 2, No. 2, Dec. 14, 2001, 4 pages.

Li, L. et al., "One-pot synthesis of highly luminescent InP/ZnS nanocrystals without precursor injection," Journal of the American Chemical Society, vol. 130, No. 35, Aug. 8, 2008, 2 pages.

Hussain, S. et al., "One-pot fabrication of high-quality InP/ZnS (core/shell) quantum dots and their application to cellular imaging," ChemPhysChem, vol. 10, No. 9-10, Jun. 9, 2009, 5 pages.

Xu, S. et al., "Rapid synthesis of high-quality InP nanocrystals," Journal of the American Chemical Society, vol. 128, No. 4, Jan. 6, 2007, 2 pages.

Micic, O. et al., "Size-dependent spectroscopy of InP quantum dots," The Journal of Physical Chemistry B, vol. 101, No. 25, Jun. 19, 1997, 9 pages.

Haubold, S. et al., "Strongly luminescent InP/ZnS core-shell nanoparticles," ChemPhysChem, vol. 2, No. 5, May 15, 2001, 4 pages.

Cros-Gagneux, A. et al., "Surface chemistry of InP quantum dots: A comprehensive study," Journal of the American Chemical Society, vol. 132, No. 51, Dec. 2, 2010, 11 pages.

Micic, O. et al., "Synthesis and characterization of InP, GaP, and GaInP2 quantum dots," The Journal of Physical Chemistry, vol. 99, No. 19, May 1, 1995, 6 pages.

Guzelian, A. et al., "Synthesis of size-selected, surface-passivated InP nanocrystals," The Journal of Physical Chemistry, vol. 100, No. 17, Apr. 25, 1996, 8 pages.

Lucey, D. et al., "Monodispersed InP quantum dots prepared by colloidal chemistry in a non-coordinating solvent," Chemistry of Materials, vol. 17, No. 14, Jun. 15, 2005, 9 pages.

Lim, J. et al., "InP@ZnSeS, core@composition gradient shell quantum dots with enhanced stability," Chemistry of Materials, vol. 23, No. 20, Oct. 25, 2011, 6 pages.

Zan, F. et al., "Experimental studies on blinking behavior of single InP/ZnS quantum dots: Effects of synthetic conditions and UV irradiation," The Journal of Physical Chemistry C, vol. 116, No. 6, Jan. 19, 2012, 7 pages.

Ziegler, J. et al., "Silica-Coated InP/ZnS Nanocrystals as Converter Material in White LEDs," Advanced Materials, vol. 20, No. 21, Nov. 3, 2008, 6 pages.

Boyle, M. et al., "Epoxy Resins," ASM Handbook vol. 21, 2001, 12 pages.

* cited by examiner

QUANTUM DOTS WITH DONOR-ACCEPTOR LIGANDS

BACKGROUND OF THE INVENTION

Field of the Invention

The present invention provides nanostructure compositions and methods of producing nanostructure compositions. The nanostructure compositions comprise a population of nanostructures comprising donor-acceptor ligands. The present invention also provides nanostructure films comprising the nanostructure compositions and methods of making nanostructure films using the nanostructure compositions.

Background of the Invention

Quantum dots ligated by long-chain aliphatic acids exhibit poor conductivity due to the insulating nature of the ligands. Ligand stripping or exchange to small ligands often leads to n-type conductivity with electrons as the major charge carrier because in inorganic semiconductors the electron effective mass is much smaller than the hole effective mass resulting in higher electron mobility.

Two parameters govern the power consumption of an organic light-emitting diode (OLED): the device stacking and the quantum yield of luminescence of the light emitting material. The driving voltage of an OLED is highly sensitive to the thickness of different layers in a device, as well as, the charge transport ability and energy levels of the materials. By minimizing the energy gaps between adjacent layers and facilitating charge injection from the electrodes, the injection and transportation of holes and electrons can be realized at lower operating voltages. The second parameter, the photoluminescence quantum yield, is limited in fluorescent materials because only singlet excitons can be utilized for light emission; thus, limiting the internal quantum efficiency (IQE) of fluorescent OLEDs to 25% (Bui, T.-T., *Beilsten J. Org. Chem.* 14:282-308 (2018)). Conversely, phosphorescent materials are capable of harvesting singlet and triplet excitons for emission by intersystem crossing, enabling a theoretical internal quantum efficiency of 100% for phosphorescent OLEDs.

Materials in the emitting layer of an OLED should match the energy level for charge injection and should possess a bipolar character have both electron-transporting and hole-transporting properties to permit the formation of both stable cation and anion radicals. Thus, there is growing interest in finding materials with bipolar transporting characteristics for OLEDs. As the charge-carrier transport in small molecules is a chain of redox processes between the neutral molecules and the corresponding radical ions, electron-donating and electron-withdrawing moieties have the potential ability to transport holes and electrons, respectively. Therefore, one strategy to achieve bipolar transport in organic molecules is to incorporate both electron-donating (donor) building blocks and electron-withdrawing (acceptor) building blocks into the same molecule (Duan, L., et al., *Advanced Materials* 23:1137-1144 (2011)).

Bipolar host molecules composed of carbazole, pyridoindole, and dibenzothiophene were found to be effective as blue thermally activated delayed fluorescence (TADF) based OLEDs (Kang, J. S., et al., *Journal of Materials Chemistry C* 4:4512-4520 (2016)). These molecules were shown to have low driving voltages and high external quantum efficiencies (EQEs) which were attributed to the well-controlled bipolar character of the host giving a better charge balance in the emitting layer.

Thermally activated delayed fluorescence (TADF) emitters can thermally repopulate the singlet state from the triplet state by reverse intersystem crossing, leading to an increase in the luminescence intensity. In an OLED, TADF emitters behave by harvesting both singlet and triplet excitons for radiative transition, except that the emission occurs from the singlet state and not from the triplet state (in reverse of that observed for metal complexes) and that the triplet-triplet annihilation commonly observed with phosphorescent OLEDs can be drastically reduced. Therefore, TADF emitters provide the high efficiency of triplet emitters and the stability of fluorescent materials while eliminating triplet-triplet annihilation and low device stability observed for phosphorescent OLEDs and the low IQE observed for fluorescent OLEDs.

TADF emitters have been constructed with strong donors and acceptors that localize the highest occupied molecular orbital (HOMO) and lowest unoccupied molecular orbital (LUMO) on the donor and acceptor moiety, respectively, which lowers the singlet energy of the TADF emitters with little effect on the triplet energy by spatial separation of the HOMO and LUMO (Im, Y., et al., *Chemistry of Materials* 29:1946-1963 (2017)). Conversely, weak donors and acceptors induce less significant HOMO and LUMO localization, which results in a small decrease of singlet energy. Therefore, strong donor and acceptor moieties have been shown to be superior to weak donor and acceptor moieties to decrease emission energy of TADF emitters.

A need exists to prepare nanostructure compositions and/or resin mixes that have improved voltage stability and improved photoluminescence quantum yield of the quantum dot layer when used to prepare a nanostructure film.

BRIEF SUMMARY OF THE INVENTION

The present disclosure provides a nanostructure composition comprising:

(a) at least one population of nanostructures; and (b) at least one donor-acceptor ligand, wherein the donor-acceptor ligand comprises at least one terminal functional group, and wherein the at least one terminal functional group is bound to the surface of the nanostructures.

In some embodiments, the nanostructure composition comprises between one and five populations of nanostructures. In some embodiments, the nanostructure composition comprises two populations of nanostructures.

In some embodiments, nanostructures of the nanostructure composition comprise a core selected from the group consisting of InP, InZnP, InGaP, CdSe, CdS, CdSSe, CdZnSe, CdZnS, ZnSe, ZnTe, ZnSeTe, ZnS, ZnSSe, InAs, InGaAs, and InAsP. In some embodiments, the nanostructures of the nanostructure composition comprise a core of InP.

In some embodiments, the nanostructures of the nanostructure composition comprise at least one shell.

In some embodiments, the nanostructures of the nanostructure composition comprise a ZnS shell.

In some embodiments, the nanostructures of the nanostructure composition comprise a ZnS shell and a ZnSe shell.

In some embodiments, the nanostructures of the nanostructure composition comprise an InP core, a ZnS shell, and a ZnSe shell.

In some embodiments, the donor-acceptor ligand of the nanostructure composition has formula I or formula II:

$D_d\text{-}A_a\text{-}FG_f$ (I) or $A_a\text{-}D_d\text{-}FG_f$ (II)

wherein:

FG is —OH, —SH, —$NH_2$, —$CO_2H$, —$P(O)(OH)_2$, —P(O)OH, or —$SO_3H$;

D is a donor moiety comprising a monocyclic or fused polycyclic aryl or heteroaryl comprising between 5 and 20 atoms, optionally substituted with one or more substituents;

A is an acceptor moiety comprising for each occurrence independently, a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4.

In some embodiments, FG in the donor-acceptor ligand is —$CO_2H$.

In some embodiments, A in the donor-acceptor ligand is an acceptor moiety comprising a radical of:

(i) a compound of formula V:

(V)

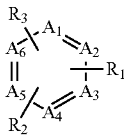

wherein:

$A_1$ to $A_6$ independently comprise C or N, and at least one of $A_1$ to $A_6$ is N; and $R_1$, $R_2$, and $R_3$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ii) a compound of formula IX:

(IX)

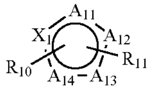

wherein:

$A_{11}$ to $A_{14}$ independently comprise C or N, wherein at least one of $A_{11}$ to $A_{14}$ is N;

$X_1$ is O, S, or $NR_{12}$;

$R_{10}$ and $R_{11}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{12}$ is hydrogen, $C_{1-10}$ alkyl, $C_{6-18}$ aryl, or heteroaryl; or (iii) a compound of formula X:

(X)

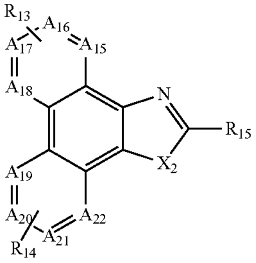

wherein:

$A_{15}$ to $A_{22}$ independently comprise C or N;

$X_2$ is O or S; and $R_{13}$, $R_{14}$, and $R_{15}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iv) a compound of formula XI:

(XI)

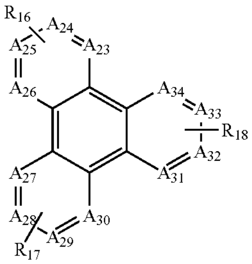

wherein:

$A_{23}$ to $A_{34}$ independently comprise C or N; and $R_{16}$, $R_{17}$, and $R_{18}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (v) a compound of formula XII:

(XII)

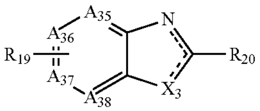

wherein:

$A_{35}$ to $A_{38}$ independently comprise C or N;

$X_3$ is O, S, or $NR_{21}$;

$R_{19}$ and $R_{20}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{21}$ is hydrogen, $C_{1-10}$ alkyl, $C_{6-18}$ aryl, or heteroaryl; or (vi) a compound of formula XIII:

(XIII)

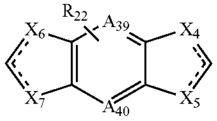

wherein:

$A_{39}$ and $A_{40}$ independently comprise C or N;

$X_4$ to $X_7$ independently comprise C, O, S, or $NR_{23}$, wherein at least one of $X_4$ to $X_7$ is $NR_{23}$;

$R_{22}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{23}$ is hydrogen, $C_{1-10}$ alkyl, $C_{6-18}$ aryl, or heteroaryl; or (vii) a compound of formula XIV:

(XIV)

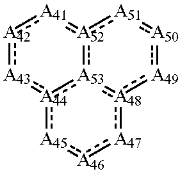

wherein:

$A_{41}$ to $A_{53}$ independently comprise C or N; or (viii) a compound of formula XV:

(XV)

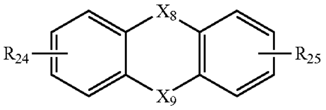

wherein:

$X_8$ is C(O) or $S(O)_2$;

$X_9$ is $CR_{26}R_{27}$, C(O), or $S(O)_2$;

$R_{24}$ and $R_{25}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{26}$ and $R_{27}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ix) a compound of formula XVI:

(XVI)

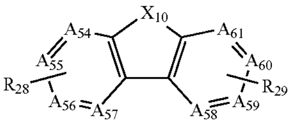

wherein:

$A_{54}$ to $A_{61}$ independently comprise C or N;

$X_{10}$ is $CR_{30}R_{31}$, S, O, or $S(O)_2$;

$R_{28}$ and $R_{29}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{30}$ and $R_{31}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (x) a compound of formula XVII:

(XVII)

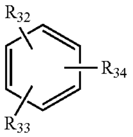

wherein:

$R_{32}$ is —$SO_2$—($C_{6-18}$ aryl), —CN, —C(O)—($C_{6-18}$ aryl), —C(O)—($C_{6-18}$ aryl)-C(O)—($C_{6-18}$ aryl), —$SO_2$—($C_{6-18}$ aryl)-$SO_2$—($C_{6-18}$ aryl), or —B—($C_{6-18}$ aryl)$_2$;

$R_{33}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{34}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, A in the donor-acceptor ligand is an acceptor moiety selected from the group consisting of radicals of the compounds:

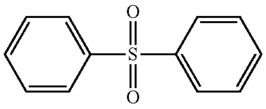

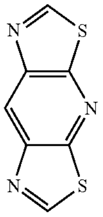

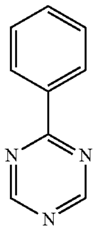

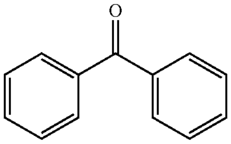

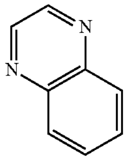

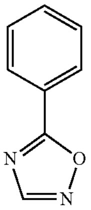

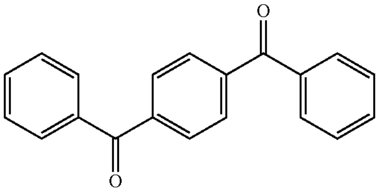

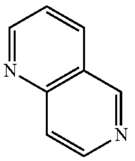

-continued
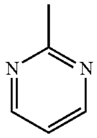 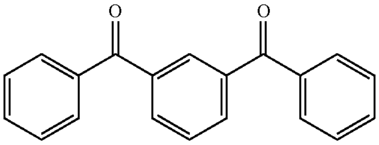
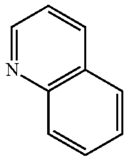 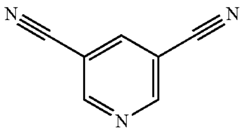 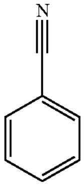
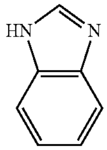 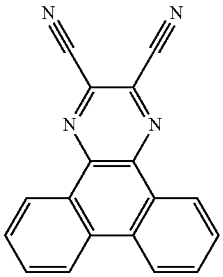 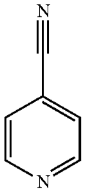
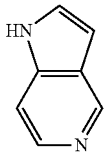 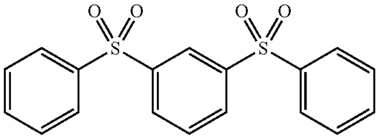
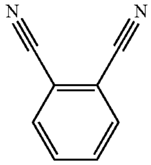 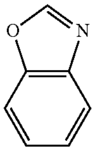
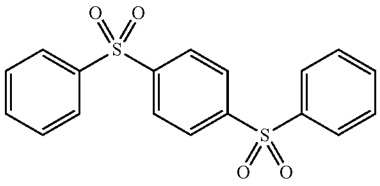
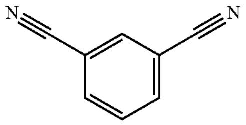 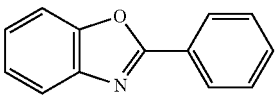
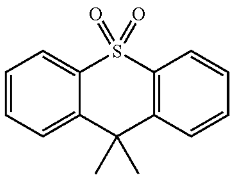 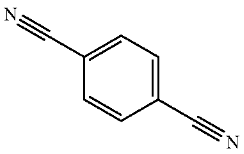
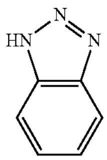 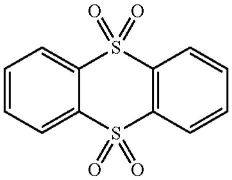
-continued
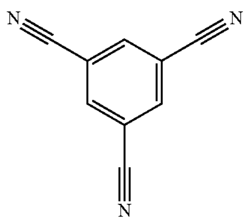 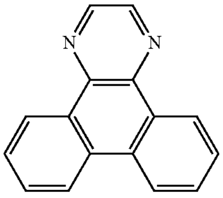
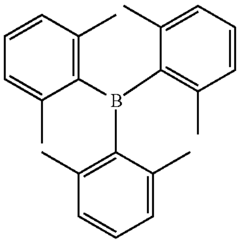 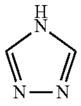
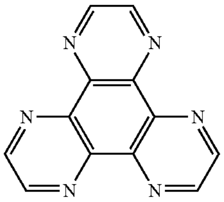 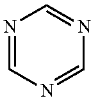 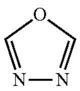
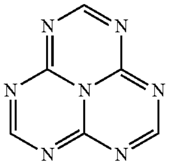 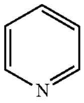 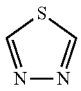
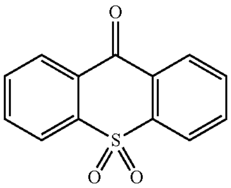 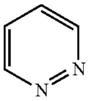 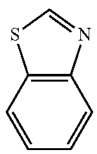
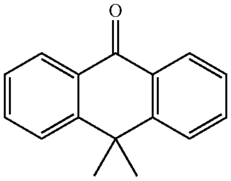 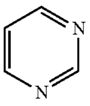 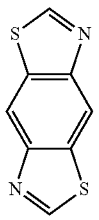
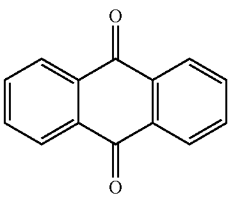 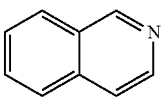
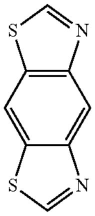 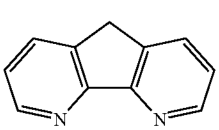 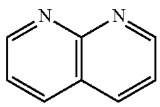

-continued
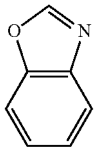
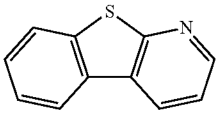
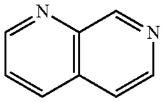
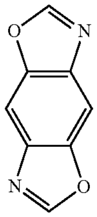
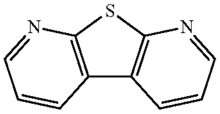
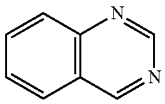
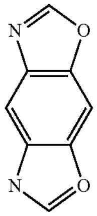
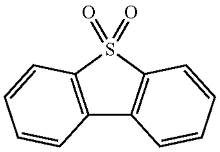
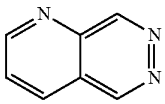
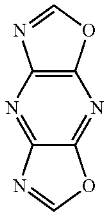
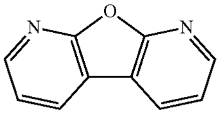
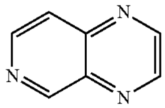
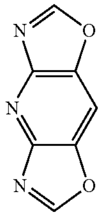
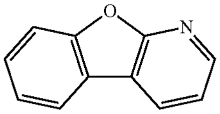
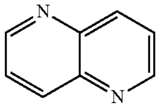
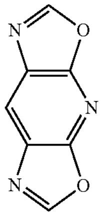
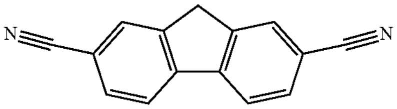
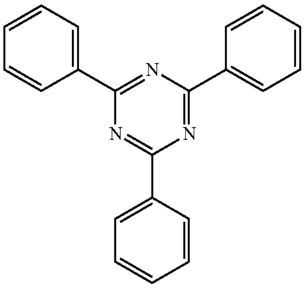
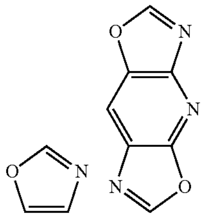
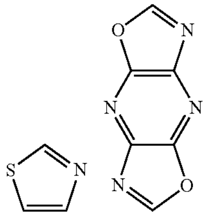
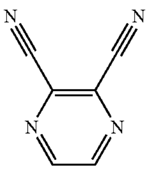
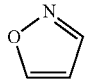
-continued
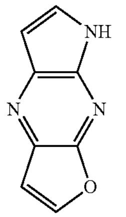
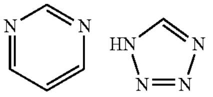
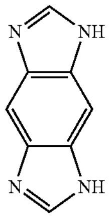
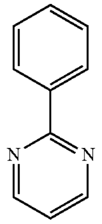
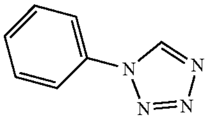
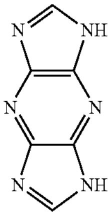
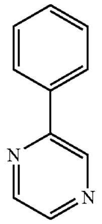
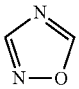
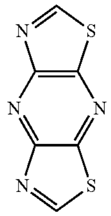
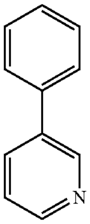
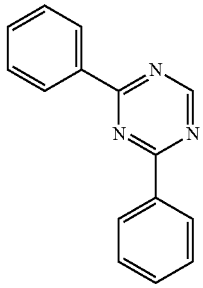
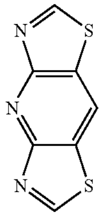
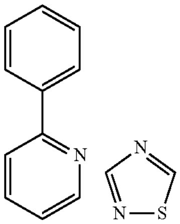
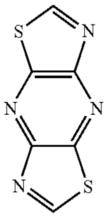
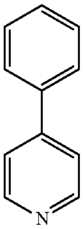
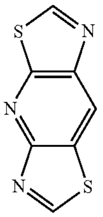
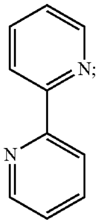
and
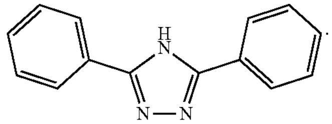 [SMILES: c1ccc(-c2nnc(-c3ccccc3)[nH]2)cc1]
.
In some embodiments, A in the donor-acceptor ligand is an acceptor moiety that is a radical of a compound having formula V:

(V)

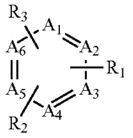

wherein:

$A_1$ to $A_6$ independently comprise C or N, and at least one of $A_1$ to $A_6$ is N; and $R_1$, $R_2$, and $R_3$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiment, at least one of $R_1$, $R_2$, or $R_3$ in the compound of formula V is —CN, methyl, phenyl, or pyridine.

In some embodiments, A in the donor-acceptor ligand is an acceptor moiety that is a radical of a compound having formula VI:

(VI)

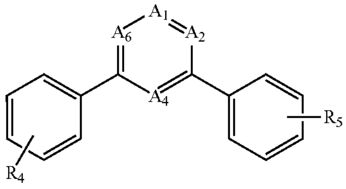

wherein:

$R_4$ and $R_5$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, $A_2$, $A_4$, and $A_6$ in the compound of formula VI are N.

In some embodiments, A in the donor-acceptor ligand is an acceptor moiety that is a radical of a compound having formula VII:

(VII)

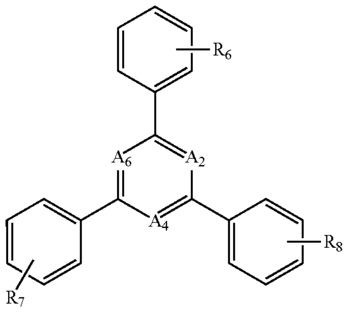

wherein:

$R_6$, $R_7$, and $R_8$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, $A_2$, $A_4$, and $A_6$ in the compound of formula VII are N.

In some embodiments, A in the donor-acceptor ligand is an acceptor moiety that is a radical of a compound having formula VIII:

(VIII)

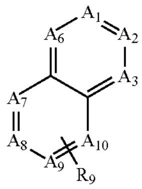

wherein:

$A_7$ to $A_{10}$ independently comprise C or N; and $R_9$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, $A_3$ is N and $R_9$ is H in the compound of formula VIII.

In some embodiments, at least two of $A_1$, $A_3$, $A_6$, As, $A_9$, and $A_{10}$ are N in the compound of formula VIII.

In some embodiments, A in the donor-acceptor ligand is an acceptor moiety that is a radical of a compound having formula IX:

(IX)

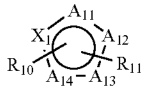

wherein:

$A_{11}$ to $A_{14}$ independently comprise C or N, wherein at least one of $A_{11}$ to $A_{14}$ is N;

$X_1$ is O, S, or $NR_{12}$;

$R_{10}$ and $R_{11}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{12}$ is hydrogen, $C_{1-10}$ alkyl, $C_{6-18}$ aryl, or heteroaryl.

In some embodiments, $A_{12}$ and $A_{13}$ are N and $R_{10}$ and $R_{11}$ are each independently H or phenyl in the compound of formula IX.

In some embodiments, A in the donor-acceptor ligand is an acceptor moiety that is a radical of a compound having formula X:

(X)

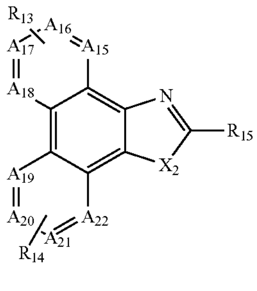

wherein:

$A_{15}$ to $A_{22}$ independently comprise C or N;

$X_2$ is O or S; and $R_{13}$, $R_{14}$, and $R_{15}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $-SO_2H$, $-NO_2$, $-CN$, halogen, cycloalkyl, or $C_{6-18}$ haloaryl.

In some embodiments, A in the donor-acceptor ligand is an acceptor moiety that is a radical of a compound having formula XI:

(XI)

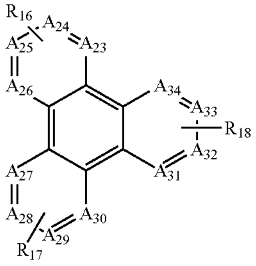

wherein:

$A_{23}$ to $A_{34}$ independently comprise C or N; and $R_{16}$, $R_{17}$, and $R_{18}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $-SO_2H$, $-NO_2$, $-CN$, halogen, cycloalkyl, or $C_{6-18}$ haloaryl.

In some embodiments, $A_{23}$ and $A_{26}$ are N and $R_{16}$, $R_{17}$, and $R_{18}$ are H in the compound of formula XI.

In some embodiments, A in the donor-acceptor ligand is an acceptor moiety that is a radical of a compound having formula XII:

(XII)

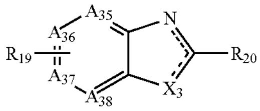

wherein:

$A_{35}$ to $A_{38}$ independently comprise C or N;

$X_3$ is O, S, or $NR_{21}$;

$R_{19}$ and $R_{20}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $-SO_2H$, $-NO_2$, $-CN$, halogen, cycloalkyl, or $C_{6-18}$ haloaryl; and $R_{21}$ is hydrogen, $C_{1-10}$ alkyl, $C_{6-18}$ aryl, or heteroaryl.

In some embodiments, $R_{19}$ and $R_{20}$ are H in the compound of formula XII.

In some embodiments, A in the donor-acceptor ligand is an acceptor moiety that is a radical of a compound having formula XIII:

(XIII)

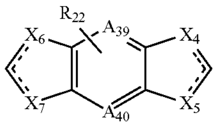

wherein:

$A_{39}$ and $A_{40}$ independently comprise C or N;

$X_4$ to $X_7$ independently comprise C, O, S, N, or $NR_{23}$, wherein at least one of $X_4$ to $X_7$ is $NR_{23}$;

$R_{22}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $-SO_2H$, $-NO_2$, $-CN$, halogen, cycloalkyl, or $C_{6-18}$ haloaryl; and $R_{23}$ is hydrogen, $C_{1-10}$ alkyl, $C_{6-18}$ aryl, or heteroaryl.

In some embodiments, at least two of $X_4$ to $X_7$ are N and $R_{22}$ is H in the compound of formula XIII.

In some embodiments, two of $X_4$ to $X_7$ are N and two of $X_4$ to $X_7$ are O or S in the compound of formula XIII.

In some embodiments, two of $X_4$ to $X_7$ are N and two of $X_4$ to $X_7$ are NH in the compound of formula XIII.

In some embodiments, A in the donor-acceptor ligand is an acceptor moiety that is a radical of a compound having formula XIV:

(XIV)

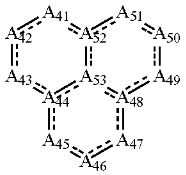

wherein:

$A_{41}$ to $A_{53}$ independently comprise C or N.

In some embodiments, at least two of $A_{41}$ to $A_{53}$ are N in the compound of formula XIV.

In some embodiments, A in the donor-acceptor ligand is an acceptor moiety that is a radical of a compound having formula XV:

(XV)

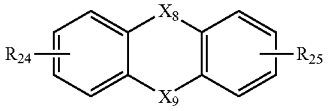

wherein:

$X_8$ is C(O) or $S(O)_2$;

$X_9$ is $CR_{26}R_{27}$, C(O), or $S(O)_2$;

$R_{24}$ and $R_{25}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $-SO_2H$, $-NO_2$, $-CN$, halogen, cycloalkyl, or $C_{6-18}$ haloaryl; and $R_{26}$ and $R_{27}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $-SO_2H$, $-NO_2$, $-CN$, halogen, cycloalkyl, or $C_{6-18}$ haloaryl.

In some embodiments, $X_8$ is C(O) and $R_{24}$ and $R_{25}$ are H in the compound of formula XV.

In some embodiments, $X_9$ is $S(O)_2$, C(O), or $C(CH_3)_2$ in the compound of formula XV.

In some embodiments, A in the donor-acceptor ligand is an acceptor moiety that is a radical of a compound having formula XVI:

(XVI)

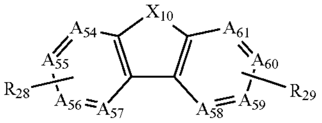

wherein:

$A_{54}$ to $A_{61}$ independently comprise C or N;

$X_{10}$ is $CR_{30}R_{31}$, S, O, or $S(O)_2$;

$R_{28}$ and $R_{29}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{30}$ and $R_{31}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, at least one of $A_{54}$ and $A_{61}$ is N in the compound of formula XVI.

In some embodiments, A in the donor-acceptor ligand is an acceptor moiety that is a radical of a compound having formula XVII:

(XVII)

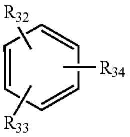

wherein:

$R_{32}$ is —$SO_2$—($C_{6-18}$ aryl), —CN, —C(O)—($C_{6-18}$ aryl), —C(O)—($C_{6-18}$ aryl)-C(O)—($C_{6-18}$ aryl), —$SO_2$—($C_{6-18}$ aryl)-$SO_2$—($C_{6-18}$ aryl), or —B—($C_{6-18}$ aryl)$_2$; and $R_{33}$ and $R_{34}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, D in the donor-acceptor ligand is a donor moiety comprising a radical of:

(i') a compound of formula XVIII:

(XVIII)

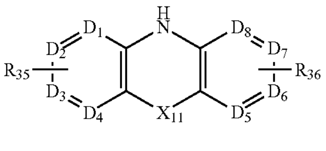

wherein:

$D_1$ to $D_8$ independently comprise C or N;

$X_{11}$ is selected from the group consisting of O, S, $NR_{37}$, $CR_{38}R_{39}$, and $SR_{40}R_{41}$;

$R_{35}$ and $R_{36}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{37}$, $R_{38}$, $R_{39}$, $R_{40}$, and $R_{41}$ are each independently hydrogen, $C_{1-10}$ alkyl, $C_{6-18}$ aryl, or heteroaryl; or (ii') a compound of formula XIX:

(XIX)

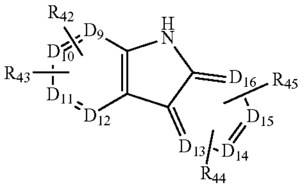

wherein:

$D_9$ to $D_{16}$ independently comprise C or N; and $R_{42}$ and $R_{45}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iii') a compound of formula XX:

(XX)

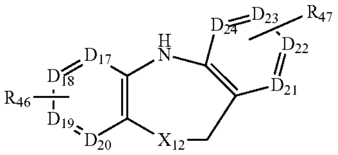

wherein:

$D_{17}$ to $D_{24}$ independently comprise C or N;

$X_{12}$ is selected from the group consisting of O, S, $NR_{48}$, $CR_{49}R_{50}$, and $SR_{51}R_{52}$;

$R_{46}$ and $R_{47}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{48}$, $R_{49}$, $R_{50}$, $R_{51}$, and $R_{52}$ are each independently hydrogen, $C_{1-10}$ alkyl, $C_{6-18}$ aryl, or heteroaryl; or (iv') a compound of formula XXI:

(XXI)

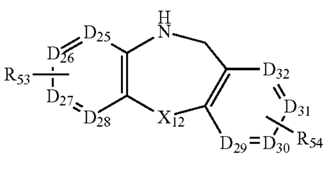

wherein:

$D_{25}$ to $D_{32}$ independently comprise C or N;

$X_{12}$ is selected from the group consisting of O, S, $NR_{55}$, $CR_{56}R_{57}$, and $SR_{58}R_{59}$;

$R_{53}$ and $R_{54}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{55}$, $R_{56}$, $R_{57}$, $R_{58}$, and $R_{59}$ are each independently hydrogen, $C_{1-10}$ alkyl, $C_{6-18}$ aryl, or heteroaryl; or (v') a compound of formula XXII:

(XXII)

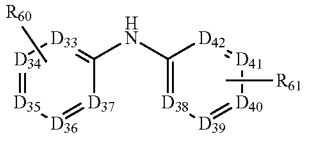

wherein:

$D_{33}$ to $D_{42}$ independently comprise C or N; and $R_{60}$ and $R_{61}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl.

In some embodiments, D in the donor-acceptor ligand is an donor moiety selected from the group consisting of radicals of the compounds:

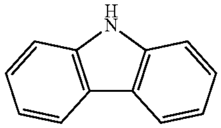

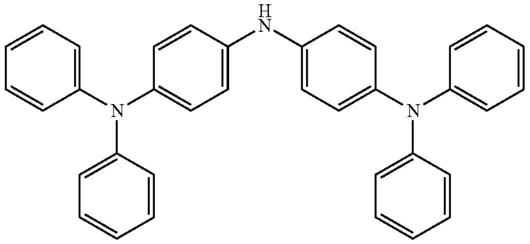

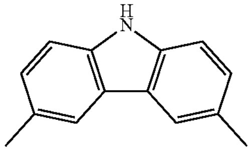

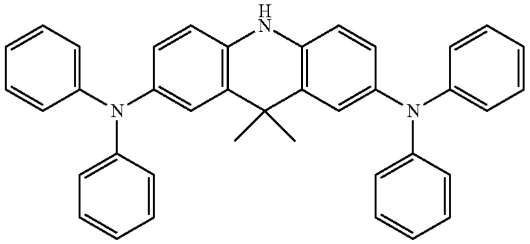

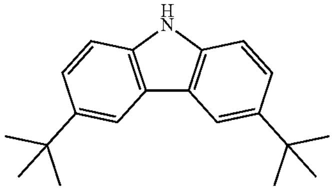

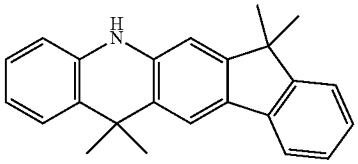

-continued

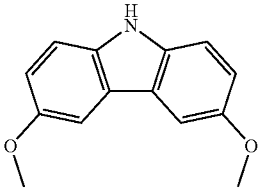

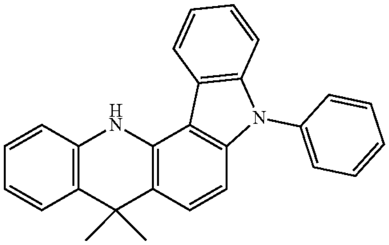

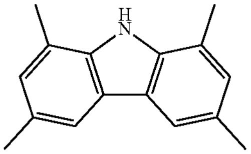

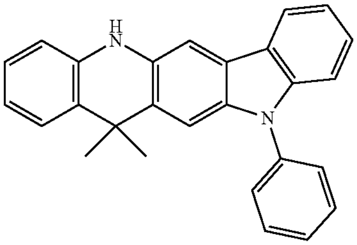

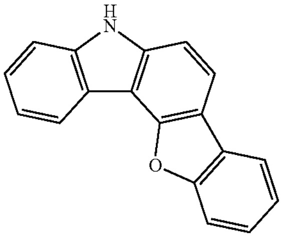

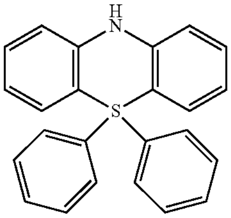

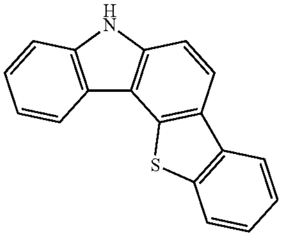

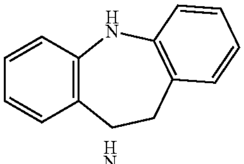

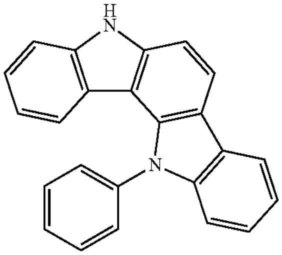

-continued
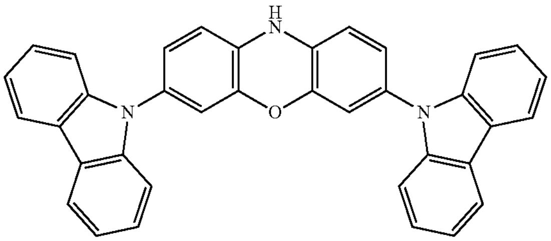
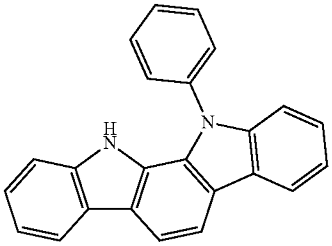
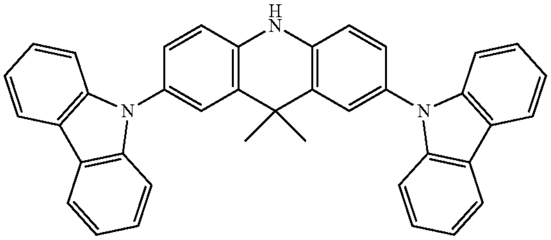
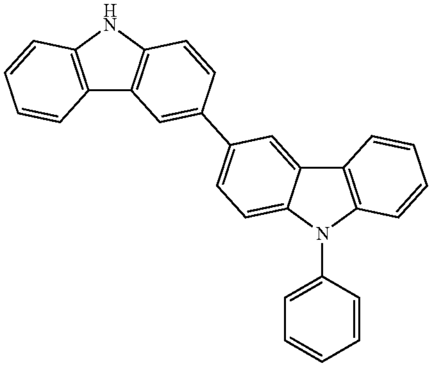
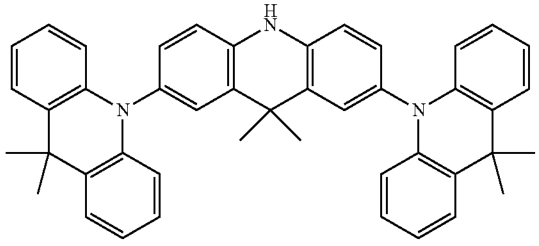
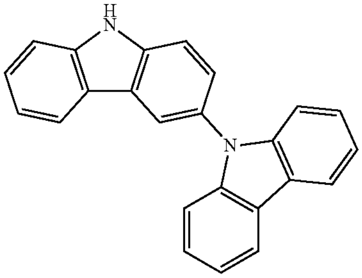
-continued
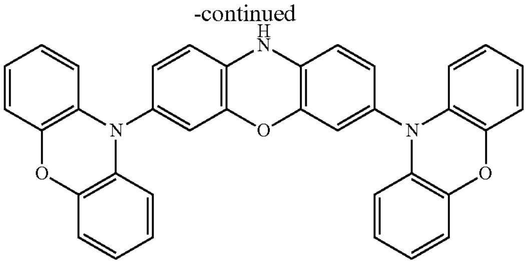
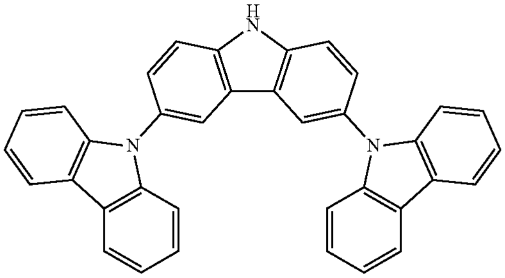
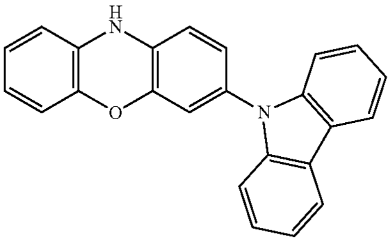
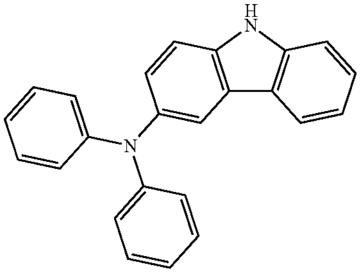
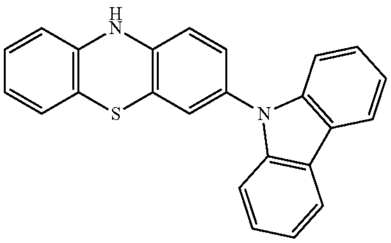
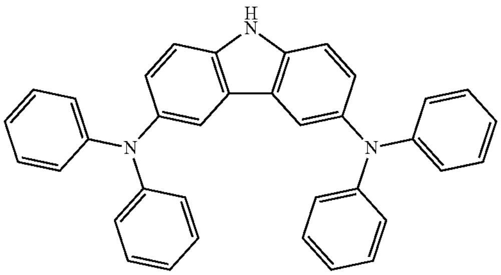

-continued
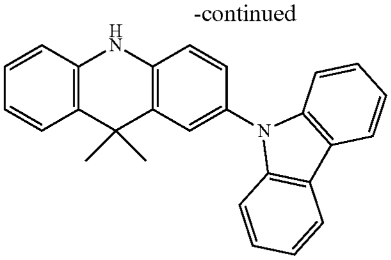
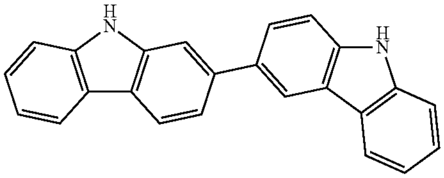
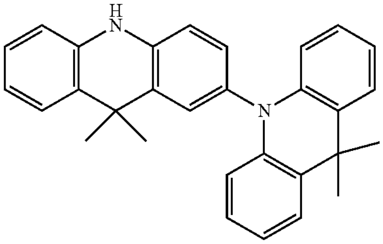
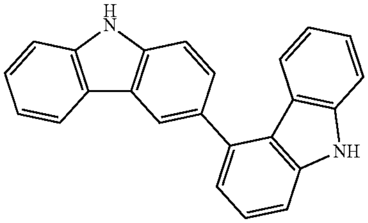
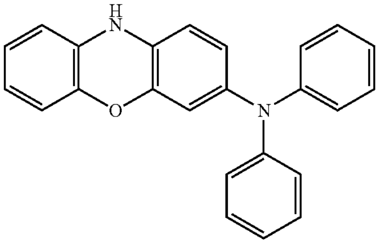
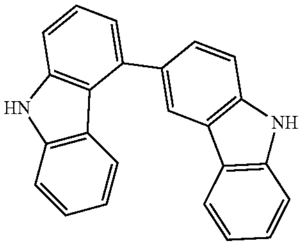
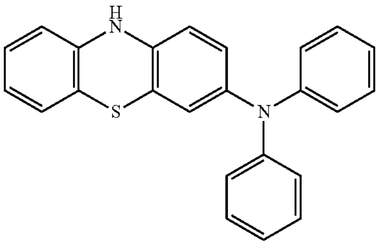
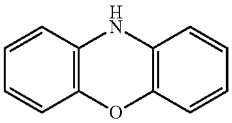
-continued
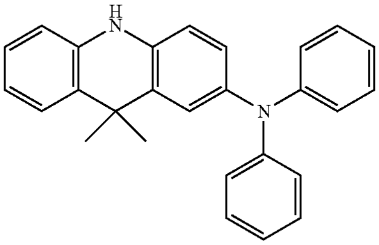
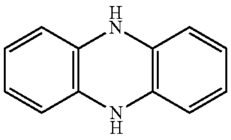
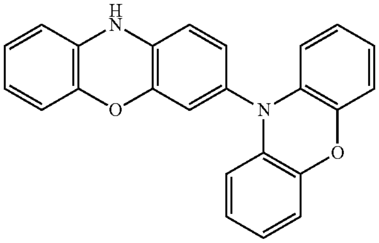
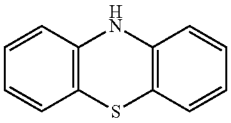
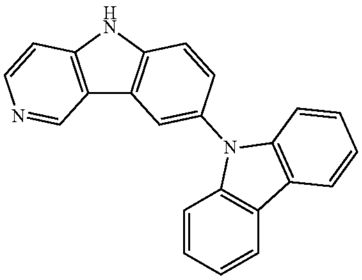
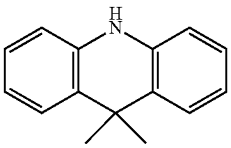
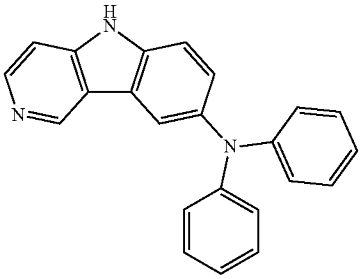
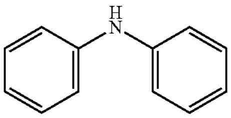

-continued

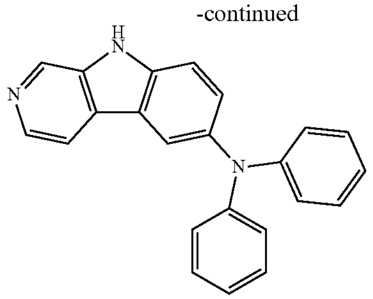

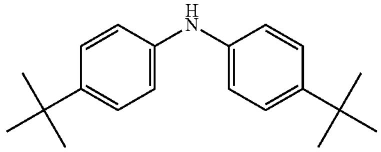

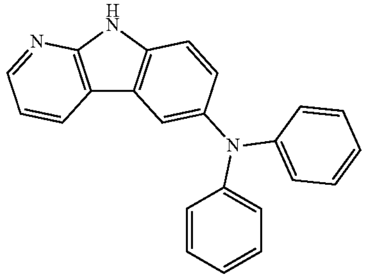

and

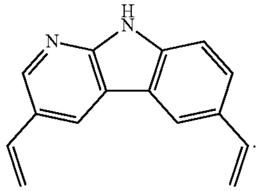 [SMILES: C=Cc1ccc2[nH]c3ncc(C=C)cc3c2c1]

In some embodiments, D in the donor-acceptor ligand is an donor moiety that is a radical of a compound having formula XVIII:

(XVIII)

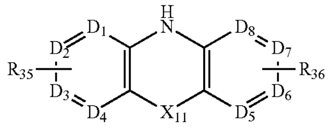

wherein:

$D_1$ to $D_8$ independently comprise C or N;

$X_{11}$ is selected from the group consisting of O, S, $NR_{37}$, $CR_{38}R_{39}$, and $SR_{40}R_{41}$;

$R_{35}$ and $R_{36}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{37}$, $R_{38}$, $R_{39}$, $R_{40}$, and $R_{41}$ are each independently hydrogen, $C_{1-10}$ alkyl, $C_{6-18}$ aryl, or heteroaryl.

In some embodiments, $D_1$ to $D_8$ are C and $X_{11}$ is $C(CH_3)_2$ in the compound of formula XVIII.

In some embodiments, at least one of $R_{35}$ or $R_{36}$ is a carbazole, a diphenyl amine, an acridan, or a phenoxamine in the compound of formula XVIII.

In some embodiments, D in the donor-acceptor ligand is an donor moiety that is a radical of a compound having formula XIX:

(XIX)

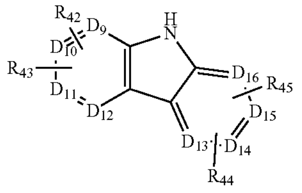

wherein:

$D_9$ to $D_{16}$ independently comprise C or N; and $R_{42}$ to $R_{45}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, $D_9$ to $D_{16}$ are C in the compound of formula XIX.

In some embodiments, at least one of $R_{42}$ to $R_{45}$ is $C_{1-10}$ alkyl, carbazole, or diphenyl amine in the compound of formula XIX.

In some embodiments, D in the donor-acceptor ligand is an donor moiety that is a radical of a compound having formula XX:

(XX)

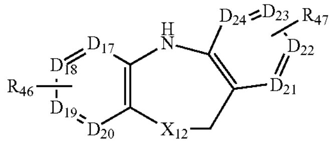

wherein:

$D_{17}$ to $D_{24}$ independently comprise C or N;

$X_{12}$ is selected from the group consisting of O, S, $NR_{48}$, $CR_{49}R_{50}$, and $SR_{51}R_{52}$;

$R_{46}$ and $R_{47}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{48}$, $R_{49}$, $R_{50}$, $R_{51}$, and $R_{52}$ are each independently hydrogen, $C_{1-10}$ alkyl, $C_{6-18}$ aryl, or heteroaryl.

In some embodiments, D in the donor-acceptor ligand is an donor moiety that is a radical of a compound having formula XXI:

(XXI)

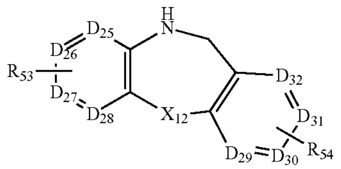

wherein:

$D_{25}$ to $D_{32}$ independently comprise C or N;

$X_{12}$ is selected from the group consisting of O, S, $NR_{55}$, $CR_{56}R_{57}$, and $SR_{58}R_{59}$;

$R_{53}$ and $R_{54}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl; and $R_{55}$, $R_{56}$, $R_{57}$, $R_{58}$, and $R_{59}$ are each independently hydrogen, $C_{1-10}$ alkyl, $C_{6-18}$ aryl, or heteroaryl.

In some embodiments, D in the donor-acceptor ligand is an donor moiety that is a radical of a compound having formula XXII:

(XXII)

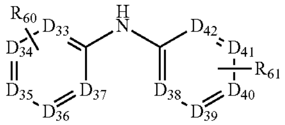

wherein:

$D_{33}$ to $D_{42}$ independently comprise C or N; and $R_{60}$ and $R_{61}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl.

In some embodiments, $D_{33}$ to $D_{42}$ are C and $R_{60}$ and $R_{61}$ are H in the compound of formula XXII.

In some embodiments, the donor-acceptor ligand is selected from the group consisting of radicals of the compounds:

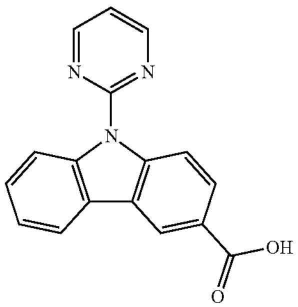

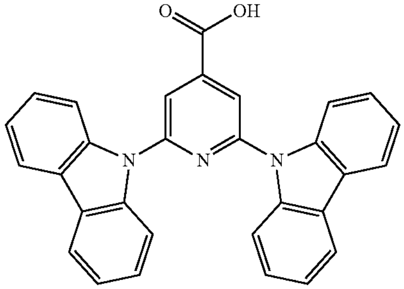

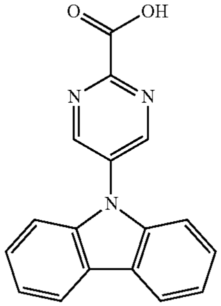

-continued

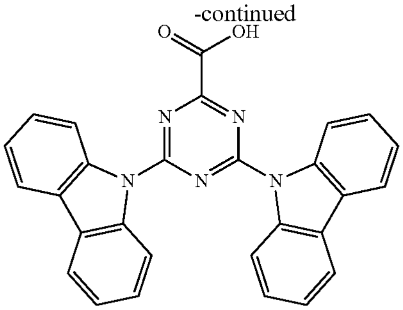

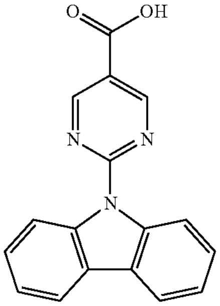

and

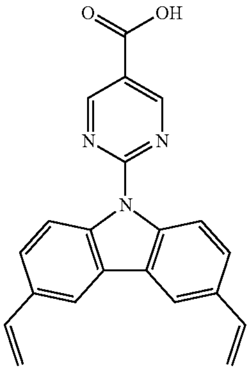 [SMILES: C=Cc1ccc2c(c1)c1cc(C=C)ccc1n2-c1ncc(C(=O)O)cn1]

The present disclosure also provides an illumination device comprising the nanostructure composition.

In some embodiments, the illumination device is a touchscreen, a monitor, a television, a cellphone, or a light emitting diode.

In some embodiments, the illumination device is a light emitting diode.

The present disclosure also provides a method of replacing a first ligand on a nanostructure with a second ligand, the method comprising admixing a reaction mixture comprising a population of nanostructures having the first ligand bound to the nanostructure and a donor-acceptor ligand which is the second ligand, such that the second ligand displaces the first ligand and becomes bound to the nanostructure, wherein the donor-acceptor ligand has formula I or formula II.

$$D_d\text{-}A_a\text{-}FG_f\ (I)\ \text{or}\ A_a\text{-}D_d\text{-}FG_f \quad (II)$$

wherein:

FG is —OH, —SH, $—NH_2$, $—CO_2H$, $—P(O)(OH)_2$, —P(O)OH, or $—SO_3H$;

D is a donor moiety comprising a monocyclic or fused polycyclic aryl or heteroaryl comprising between 5 and 20 atoms, optionally substituted with one or more substituents;

A is an acceptor moiety comprising for each occurrence independently, a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4.

In some embodiments, the population of nanostructures comprises between one and five populations of nanostructures. In some embodiments, the population of nanostructure comprises two populations of nanostructures.

In some embodiments, the nanostructures comprise a core selected from the group consisting of InP, InZnP, InGaP, CdSe, CdS, CdSSe, CdZnSe, CdZnS, ZnSe, ZnTe, ZnSeTe, ZnS, ZnSSe, InAs, InGaAs, and InAsP. In some embodiments, the nanostructures comprise a core of InP.

In some embodiments, the nanostructures comprise at least one shell.

In some embodiments, the nanostructures comprise a ZnS shell.

In some embodiments, A in the donor-acceptor ligand is an acceptor moiety comprising a radical of:

(i) a compound of formula V:

(V)

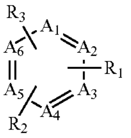

wherein $A_1$ to $A_6$ independently comprise C or N, and at least one of $A_1$ to $A_6$ is N; and $R_1$, $R_2$, and $R_3$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ii) a compound of formula IX:

(IX)

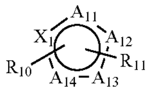

wherein:

$A_{11}$ to $A_{14}$ independently comprise C or N, wherein at least one of $A_{11}$ to $A_{14}$ is N;

$X_1$ is O, S, or $NR_{12}$;

$R_{10}$ and $R_{11}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or C is haloaryl; and $R_{12}$ is hydrogen, $C_{1-10}$ alkyl, $C_{6-18}$ aryl, or heteroaryl; or (iii) a compound of formula X:

(X)

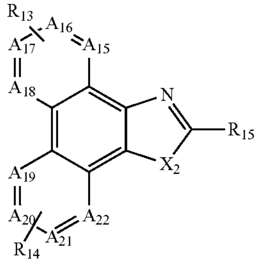

wherein:

$A_{15}$ to $A_{22}$ independently comprise C or N;

$X_2$ is O or S; and $R_{13}$, $R_{14}$, and $R_{15}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iv) a compound of formula XI:

(XI)

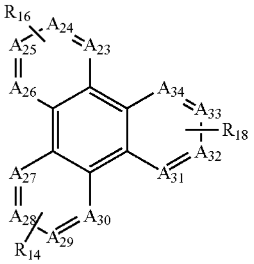

wherein:

$A_{23}$ to $A_{34}$ independently comprise C or N; and $R_{16}$, $R_{17}$, and $R_{18}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (v) a compound of formula XII:

(XII)

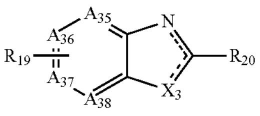

wherein:

$A_{35}$ to $A_{38}$ independently comprise C or N;

$X_3$ is O, S, or $NR_{21}$;

$R_{19}$ and $R_{20}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{21}$ is hydrogen, $C_{1-10}$ alkyl, $C_{6-18}$ aryl, or heteroaryl; or (vi) a compound of formula XIII:

(XIII)

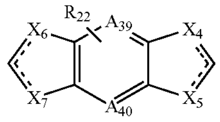

wherein:

$A_{39}$ and $A_{40}$ independently comprise C or N;

$X_4$ to $X_7$ independently comprise C, O, S, or $NR_{23}$, wherein at least one of $X_4$ to $X_7$ is $NR_{23}$;

$R_{22}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{23}$ is hydrogen, $C_{1-10}$ alkyl, $C_{6-18}$ aryl, or heteroaryl; or (vii) a compound of formula XIV:

(XIV)

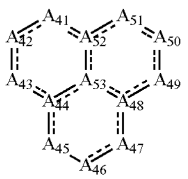

wherein:

$A_{41}$ to $A_{53}$ independently comprise C or N; or (viii) a compound of formula XV:

(XV)

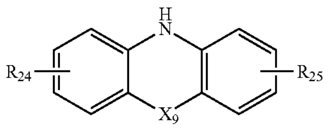

wherein:

$X_8$ is C(O) or $S(O)_2$;

$X_9$ is $CR_{26}R_{27}$, C(O), or $S(O)_2$;

$R_{24}$ and $R_{25}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{26}$ and $R_{27}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ix) a compound of formula XVI:

(XVI)

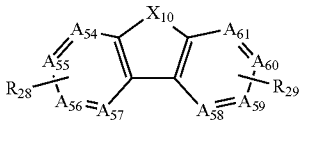

wherein:

$A_{54}$ to $A_{61}$ independently comprise C or N;

$X_{10}$ is $CR_{30}R_{31}$, S, O, or $S(O)_2$;

$R_{28}$ and $R_{29}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{30}$ and $R_{31}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (x) a compound of formula XVII:

(XVII)

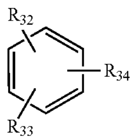

wherein:

$R_{32}$ is —$SO_2$—($C_{6-18}$ aryl), —CN, —C(O)—($C_{6-18}$ aryl), —C(O)—($C_{6-18}$ aryl)-C(O)—($C_{6-18}$ aryl), —$SO_2$—($C_{6-18}$ aryl)-$SO_2$—($C_{6-18}$ aryl), or —B—($C_{6-18}$ aryl)$_2$;

$R_{33}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{34}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, D in the donor-acceptor ligand is a donor moiety comprising a radical of:

(i') a compound of formula XVIII:

(XVIII)

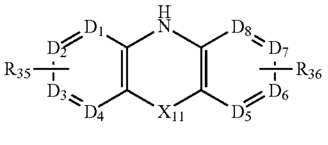

wherein:

$D_1$ to $D_8$ independently comprise C or N;

$X_{11}$ is selected from the group consisting of O, S, $NR_{37}$, $CR_{38}R_{39}$, and $SR_{40}R_{41}$;

$R_{35}$ and $R_{36}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{37}$, $R_{38}$, $R_{39}$, $R_{40}$, and $R_{41}$ are each independently hydrogen, $C_{1-10}$ alkyl, $C_{6-18}$ aryl, or heteroaryl; or (ii') a compound of formula XIX:

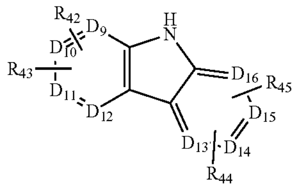

(XIX)

wherein:

$D_9$ to $D_{16}$ independently comprise C or N; and $R_{42}$ and $R_{45}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iii') a compound of formula XX:

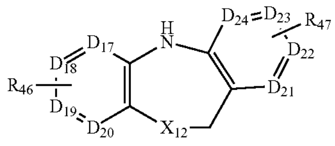

(XX)

wherein:

$D_{17}$ to $D_{24}$ independently comprise C or N;

$X_{12}$ is selected from the group consisting of O, S, $NR_{48}$, $CR_{49}R_{50}$, and $SR_{51}R_{52}$;

$R_{46}$ and $R_{47}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{48}$, $R_{49}$, $R_{50}$, $R_{51}$, and $R_{52}$ are each independently hydrogen, $C_{1-10}$ alkyl, $C_{6-18}$ aryl, or heteroaryl; or (iv') a compound of formula XXI:

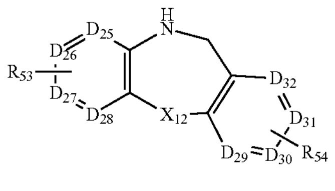

(XXI)

wherein:

$D_{25}$ to $D_{32}$ independently comprise C or N;

$X_{12}$ is selected from the group consisting of O, S, $NR_{55}$, $CR_{56}R_{57}$, and $SR_{58}R_{59}$;

$R_{53}$ and $R_{54}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{55}$, $R_{56}$, $R_{57}$, $R_{58}$, and $R_{59}$ are each independently hydrogen, $C_{1-10}$ alkyl, $C_{6-18}$ aryl, or heteroaryl; or (v') a compound of formula XXII:

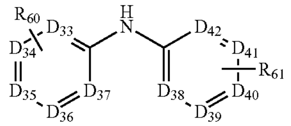

(XXII)

wherein:

$D_{33}$ to $D_{42}$ independently comprise C or N; and $R_{60}$ and $R_{61}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, the second ligand displaces between about 30% and about 100% on a molar basis of the first ligand on the nanostructure.

In some embodiments, the second ligand displaces between about 40% and about 100% on a molar basis of the first ligand on the nanostructure.

In some embodiments, the admixing is at a temperature between about 20° C. and about 100° C.

The present disclosure also provides a nanostructure film layer comprising:

(a) at least one population of nanostructures, wherein the nanostructures comprise ligands bound to the nanostructures; and (b) at least one donor-acceptor ligand comprising at least one terminal functional group, wherein the at least one terminal functional group is bound to the surface of the nanostructures.

In some embodiments, the nanostructure film layer comprises between one and five populations of nanostructures. In some embodiments, the nanostructure film layer comprises two populations of nanostructures.

In some embodiments, the at least one population of nanostructures in the nanostructure film layer comprises a core selected from the group consisting of InP, InZnP, InGaP, CdSe, CdS, CdSSe, CdZnSe, CdZnS, ZnSe, ZnTe, ZnSeTe, ZnS, ZnSSe, InAs, InGaAs, and InAsP. In some embodiments, the population of nanostructures in the nanostructure film layer comprises a core of InP.

In some embodiments, the at least one population of nanostructures in the nanostructure film layer comprises as a weight percentage between about 0.0001% and about 5% of the total weight of the nanostructure film layer.

In some embodiments, the donor-acceptor ligand in the nanostructure film layer has formula I or formula II:

$D_d$-$A_a$-$FG_f$ (I) or $A_a$-$D_d$-$FG_f$ (II)

wherein:

FG is —OH, —SH, —$NH_2$, —$CO_2H$, —$P(O)(OH)_2$, —P(O)OH, or —$SO_3H$;

D is a donor moiety comprising a monocyclic or fused polycyclic aryl or heteroaryl comprising between 5 and 20 atoms, optionally substituted with one or more substituents;

A is an acceptor moiety comprising for each occurrence independently, a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4.

In some embodiments, A in the donor-acceptor ligand is an acceptor moiety comprising a radical of:

(i) a compound of formula V:

(V)

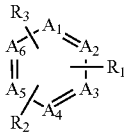

wherein:

$A_1$ to $A_6$ independently comprise C or N, and at least one of $A_1$ to $A_6$ is N; and $R_1$, $R_2$, and $R_3$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ii) a compound of formula IX:

(IX)

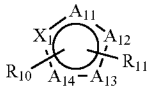

wherein:

$A_{11}$ to $A_{14}$ independently comprise C or N, wherein at least one of $A_{11}$ to $A_{14}$ is N;

$X_1$ is O, S, or $NR_{12}$;

$R_{10}$ and $R_{11}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{12}$ is hydrogen, $C_{1-10}$ alkyl, $C_{6-18}$ aryl, or heteroaryl; or (iii) a compound of formula X:

(X)

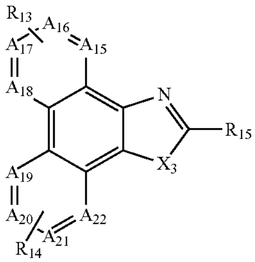

wherein:

$A_{15}$ to $A_{22}$ independently comprise C or N;

$X_2$ is O or S; and $R_{13}$, $R_{14}$, and $R_{15}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iv) a compound of formula XI:

(XI)

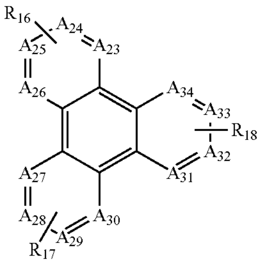

wherein:

$A_{23}$ to $A_{34}$ independently comprise C or N; and $R_{16}$, $R_{17}$, and $R_{18}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (v) a compound of formula XII:

(XII)

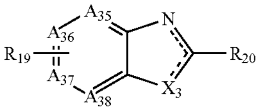

wherein:

$A_{35}$ to $A_{38}$ independently comprise C or N;

$X_3$ is O, S, or $NR_{21}$;

$R_{19}$ and $R_{20}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{21}$ is hydrogen, $C_{1-10}$ alkyl, $C_{6-18}$ aryl, or heteroaryl; or (vi) a compound of formula XIII:

(XIII)

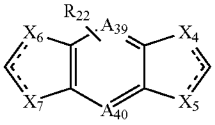

wherein:

$A_{39}$ and $A_{40}$ independently comprise C or N;

$X_4$ to $X_7$ independently comprise C, O, S, or $NR_{23}$, wherein at least one of $X_4$ to $X_7$ is $NR_{23}$;

$R_{22}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{23}$ is hydrogen, $C_{1-10}$ alkyl, $C_{6-18}$ aryl, or heteroaryl; or (vii) a compound of formula XIV:

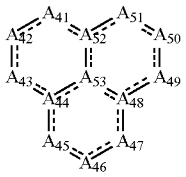

(XIV)

wherein:

$A_{41}$ to $A_{53}$ independently comprise C or N; or (viii) a compound of formula XV:

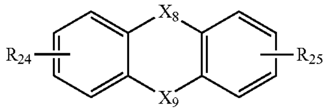

(XV)

wherein:

$X_8$ is C(O) or $S(O)_2$;

$X_9$ is $CR_{26}R_{27}$, C(O), or $S(O)_2$;

$R_{24}$ and $R_{25}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{26}$ and $R_{27}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ix) a compound of formula XVI:

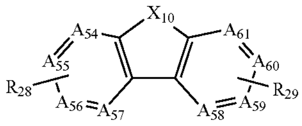

(XVI)

wherein:

$A_{54}$ to $A_{61}$ independently comprise C or N;

$X_{10}$ is $CR_{30}R_{31}$, S, O, or $S(O)_2$;

$R_{28}$ and $R_{29}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{30}$ and $R_{31}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (x) a compound of formula XVII:

(XVII)

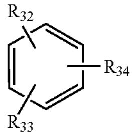

wherein:

$R_{32}$ is —$SO_2$—($C_{6-18}$ aryl), —CN, —C(O)—($C_{6-18}$ aryl), —C(O)—($C_{6-18}$ aryl)-C(O)—($C_{6-18}$ aryl), —$SO_2$—($C_{6-18}$ aryl)-$SO_2$—($C_{6-18}$ aryl), or —B—($C_{6-18}$ aryl)$_2$;

$R_{33}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{34}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, D in the donor-acceptor ligand is a donor moiety comprising a radical of:

(i') a compound of formula XVIII:

(XVIII)

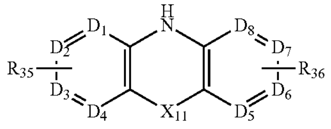

wherein:

$D_1$ to $D_8$ independently comprise C or N;

$X_{11}$ is selected from the group consisting of O, S, $NR_{37}$, $CR_{38}R_{39}$, and $SR_{40}R_{41}$;

$R_{35}$ and $R_{36}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{37}$, $R_{38}$, $R_{39}$, $R_{40}$, and $R_{41}$ are each independently hydrogen, $C_{1-10}$ alkyl, $C_{6-18}$ aryl, or heteroaryl; or (ii') a compound of formula XIX:

(XIX)

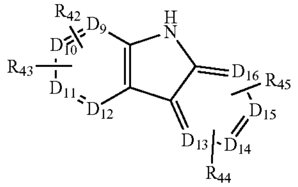

wherein:

$D_9$ to $D_{16}$ independently comprise C or N; and $R_{42}$ and $R_{45}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iii') a compound of formula XX:

(XX)

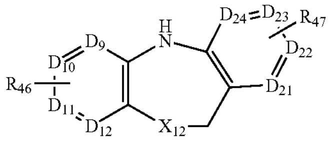

wherein:

$D_{17}$ to $D_{24}$ independently comprise C or N;

$X_{12}$ is selected from the group consisting of O, S, $NR_{48}$, $CR_{49}R_{50}$, and $SR_{51}R_{52}$;

$R_{46}$ and $R_{47}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl; and $R_{48}$, $R_{49}$, $R_{50}$, $R_{51}$, and $R_{52}$ are each independently hydrogen, $C_{1-10}$ alkyl, $C_{6-18}$ aryl, or heteroaryl; or (iv') a compound of formula XXI:

(XXI)

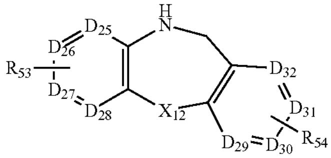

wherein:

$D_{25}$ to $D_{32}$ independently comprise C or N;

$X_{12}$ is selected from the group consisting of O, S, $NR_{55}$, $CR_{56}R_{57}$, and $SR_{58}R_{59}$;

$R_{53}$ and $R_{54}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl; and $R_{55}$, $R_{56}$, $R_{57}$, $R_{58}$, and $R_{59}$ are each independently hydrogen, $C_{1-10}$ alkyl, $C_{6-18}$ aryl, or heteroaryl; or (v') a compound of formula XXII:

(XXII)

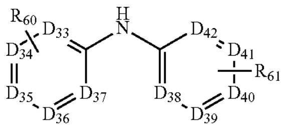

wherein.

$D_{33}$ to $D_{42}$ independently comprise C or N; and $R_{60}$ and $R_{61}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl.

In some embodiments, the at least one population of nanostructures in the nanostructure film layer comprises at least one shell.

In some embodiments, the at least one population of nanostructures in the nanostructure film layer comprises two shells.

In some embodiments, the nanostructures in the population of nanostructures are quantum dots.

In some embodiments, the quantum dots are InP and/or ZnSe quantum dots.

The present disclosure also provides a light emitting diode comprising:

(a) a first conductive layer;

(b) a second conductive layer; and (c) an emitting layer between the first conductive layer and the second conductive layer, wherein the emitting layer comprises at least one population of nanostructures comprising a donor-acceptor ligand, wherein the donor-acceptor ligand comprises at least one terminal functional group, and wherein the at least one terminal functional group is bound to the surface of the nanostructures.

In some embodiments, the emitting layer comprises between one and five populations of nanostructures. In some embodiments, the emitting layer comprises two populations of nanostructures.

In some embodiments, the at least one population of nanostructures in the emitting layer comprises a core selected from the group consisting of InP, InZnP, InGaP, CdSe, CdS, CdSSe, CdZnSe, CdZnS, ZnSe, ZnTe, ZnSeTe, ZnS, ZnSSe, InAs, InGaAs, and InAsP. In some embodiments, nanostructures comprise a core of InP.

In some embodiments, the at least one population of nanostructures in the emitting layer comprises as a weight percentage between about 0.0001% and about 5% of the total weight of the nanostructure film layer.

In some embodiments, the donor-acceptor ligand of the population of nanostructures has formula I or formula II:

$D_d$-$A_a$-$FG_f$ (I) or $A_a$-$D_d$-$FG_f$ (II)

wherein:

FG is —OH, —SH, $—NH_2$, $—CO_2H$, $—P(O)(OH)_2$, —P(O)OH, or $—SO_3H$;

D is a donor moiety comprising a monocyclic or fused polycyclic aryl or heteroaryl comprising between 5 and 20 atoms, optionally substituted with one or more substituents;

A is an acceptor moiety comprising for each occurrence independently, a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4.

In some embodiments, A in the donor-acceptor ligand is an acceptor moiety comprising a radical of:

(i) a compound of formula V:

(V)

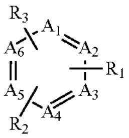

wherein:

$A_1$ to $A_6$ independently comprise C or N, and at least one of $A_1$ to $A_6$ is N; and $R_1$, $R_2$, and $R_3$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl; or (ii) a compound of formula IX:

(IX)

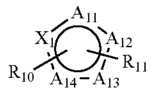

wherein:

$A_{11}$ to $A_{14}$ independently comprise C or N, wherein at least one of $A_{11}$ to $A_{14}$ is N;

$X_1$ is O, S, or $NR_{12}$;

$R_{10}$ and $R_{11}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl; and $R_{12}$ is hydrogen, $C_{1-10}$ alkyl, $C_{6-18}$ aryl, or heteroaryl; or (iii) a compound of formula X:

(X)

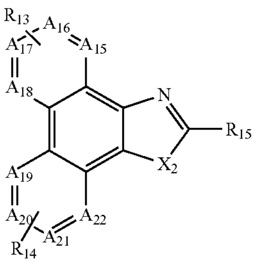

wherein:

$A_{15}$ to $A_{22}$ independently comprise C or N;

$X_2$ is O or S; and $R_{13}$, $R_{14}$, and $R_{15}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl; or (iv) a compound of formula XI:

(XI)

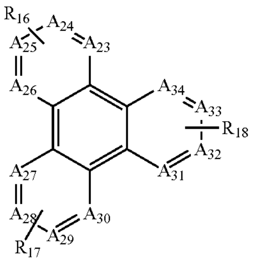

wherein:

$A_{23}$ to $A_{34}$ independently comprise C or N; and $R_{16}$, $R_{17}$, and $R_{18}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl; or (v) a compound of formula XII:

(XII)

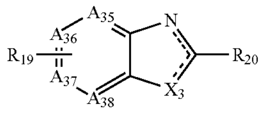

wherein:

$A_{35}$ to $A_{38}$ independently comprise C or N;

$X_3$ is O, S, or $NR_{21}$;

$R_{19}$ and $R_{20}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl; and $R_{21}$ is hydrogen, $C_{1-10}$ alkyl, $C_{6-18}$ aryl, or heteroaryl; or (vi) a compound of formula XIII:

(XIII)

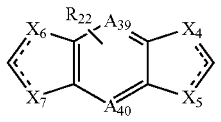

wherein:

$A_{39}$ and $A_{40}$ independently comprise C or N;

$X_4$ to $X_7$ independently comprise C, O, S, or $NR_{23}$, wherein at least one of $X_4$ to $X_7$ is $NR_{23}$;

$R_{22}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl; and $R_{23}$ is hydrogen, $C_{1-10}$ alkyl, $C_{6-18}$ aryl, or heteroaryl; or (vii) a compound of formula XIV:

(XIV)

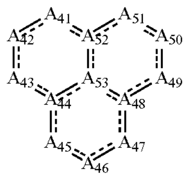

wherein:

$A_{41}$ to $A_{53}$ independently comprise C or N; or (viii) a compound of formula XV:

(XV)

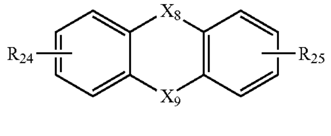

wherein:

$X_8$ is C(O) or $S(O)_2$;

$X_9$ is $CR_{26}R_{27}$, C(O), or $S(O)_2$;

$R_{24}$ and $R_{25}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl; and $R_{26}$ and $R_{27}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ix) a compound of formula XVI:

(XVI)

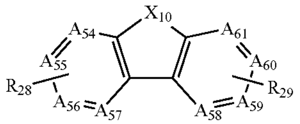

wherein:

$A_{54}$ to $A_{61}$ independently comprise C or N;

$X_{10}$ is $CR_{30}R_{31}$, S, O, or $S(O)_2$;

$R_{28}$ and $R_{29}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{30}$ and $R_{31}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (x) a compound of formula XVII:

(XVII)

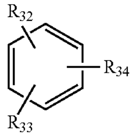

wherein:

$R_{32}$ is —$SO_2$—($C_{6-18}$ aryl), —CN, —C(O)—($C_{6-18}$ aryl), —C(O)—($C_{6-18}$ aryl)-C(O)—($C_{6-18}$ aryl), —$SO_2$—($C_{6-18}$ aryl)-$SO_2$—($C_{6-18}$ aryl), or —B—($C_{6-18}$ aryl)$_2$;

$R_{33}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{34}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, D in the donor-acceptor ligand is a donor moiety comprising a radical of:

(i') a compound of formula XVIII:

(XVIII)

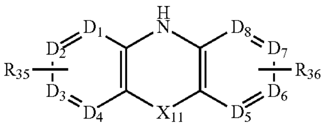

wherein:

$D_1$ to $D_8$ independently comprise C or N;

$X_{11}$ is selected from the group consisting of O, S, $NR_{37}$, $CR_{38}R_{39}$, and $SR_{40}R_{41}$;

$R_{35}$ and $R_{36}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{37}$, $R_{38}$, $R_{39}$, $R_{40}$, and $R_{41}$ are each independently hydrogen, $C_{1-10}$ alkyl, $C_{6-18}$ aryl, or heteroaryl; or (ii') a compound of formula XIX:

(XIX)

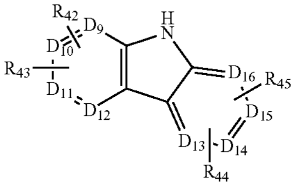

wherein:

$D_9$ to $D_{16}$ independently comprise C or N; and $R_{42}$ and $R_{45}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iii') a compound of formula XX:

(XX)

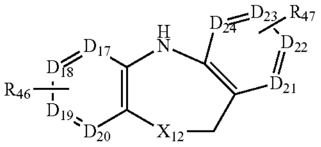

wherein:

$D_{17}$ to $D_{24}$ independently comprise C or N;

$X_{12}$ is selected from the group consisting of O, S, $NR_{48}$, $CR_{49}R_{50}$, and $SR_{51}R_{52}$;

$R_{46}$ and $R_{47}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{48}$, $R_{49}$, $R_{50}$, $R_{51}$, and $R_{52}$ are each independently hydrogen, $C_{1-10}$ alkyl, $C_{6-18}$ aryl, or heteroaryl; or (iv') a compound of formula XXI:

(XXI)

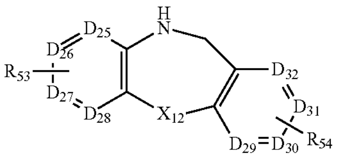

wherein:

$D_{25}$ to $D_{32}$ independently comprise C or N;

$X_{12}$ is selected from the group consisting of O, S, $NR_{55}$, $CR_{56}R_{57}$, and $SR_{58}R_{59}$;

$R_{53}$ and $R_{54}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{55}$, $R_{56}$, $R_{57}$, $R_{58}$, and $R_{59}$ are each independently hydrogen, $C_{1-10}$ alkyl, $C_{6-18}$ aryl, or heteroaryl; or (v') a compound of formula XXII:

(XXII)

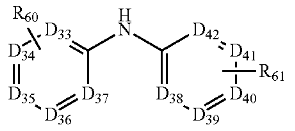

wherein:

$D_{33}$ to $D_{42}$ independently comprise C or N; and $R_{60}$ and $R_{61}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl.

In some embodiments, the first conductive layer of the light emitting diode comprises indium tin oxide, indium zinc oxide, tin dioxide, zinc oxide, magnesium, aluminum, aluminum-lithium, calcium, magnesium-indium, magnesium-silver, silver, gold, or mixtures thereof.

In some embodiments, the first conductive layer of the light emitting diode comprises indium tin oxide.

In some embodiments, the second conductive layer of the light emitting diode comprises indium tin oxide, indium zinc oxide, titanium dioxide, tin oxide, zinc sulfide, silver, or mixtures thereof.

In some embodiments, the second conductive layer of the light emitting diode comprises aluminum.

In some embodiments, the second conductive layer of the light emitting diode comprises gold.

In some embodiments, the light emitting diode further comprises a semiconductor polymer layer.

In some embodiments, the semiconductor polymer layer of the light emitting diode comprises copper phthalocyanine, 4,4',4"-tris[(3-methylphenyl)phenylamino]triphenylamine (m-MTDATA), 4,4',4"-tris(diphenylamino)triphenylamine (TDATA), 4,4',4"-tris[2-naphthyl(phenyl)amino]triphenylamine (2T-NATA), polyaniline/dodecylbenzenesulfonic acid, poly(3,4-ethylenedioxythiophene)/polystyrene sulfonate)(PEDOT/PSS), polyaniline/camphor sulfonic acid, or polyaniline/poly(4-styrenesulfonate).

In some embodiments, the semiconductor polymer layer of the light emitting diode comprises PEDOT/PSS.

In some embodiments, the light emitting diode further comprises a first transport layer.

In some embodiments, the first transport layer of the light emitting diode comprises N,N'-di(naphthalen-1-yl)-N,N'-bis(4-vinylphenyl)-4,4'-diamine, poly[(9,9-dioctylfluorenyl-2,7-diyl)-co-(4,4'-(N-(4-sec-butylphenyl))diphenylamine)], or poly(9-vinylcarbazole).

In some embodiments, the first transport layer of the light emitting diode comprises N,N'-di(naphthalen-1-yl)-N,N'-bis(4-vinylphenyl)-4,4'-diamine.

In some embodiments, the light emitting diode further comprises a second transport layer.

In some embodiments, the second transport layer of the light emitting diode comprises 1,3-bis(3,5-dipyrid-3-ylphenyl)benzene (B3PyPB), bathocuproine, bathophenanthroline, 3-(biphenyl-4-yl)-5-(4-tert-butylphenyl)-4-phenyl-4H-1,2,4-triazole, 2-(4-biphenylyl)-5-phenyl-1,3,4-oxadiazole, 3,5-bis(4-tert-butylphenyl)-4-phenyl-4H-1,2,4-triazole, bis(8-hydroxy-2-methylquinoline)-(4-phenylphenoxy)aluminum, 2,5-bis(1-naphthyl)-1,3,4-oxadiazole, 3,5-diphenyl-4-(1-naphthyl)-1H-1,2,4-triazole, 1,3,5-tri(m-pyridin-3-ylphenyl)benzene (TmPyPB), 2,2',2"-(1,3,5-benzinetriyl)-tris(1-phenyl-1-H-benzimidazole)(TPBi), tris-(8-hydroxyquinoline)aluminum, TiO2, ZnO, SnO2, SiO2, ZrO2, or ZnMgO.

In some embodiments, the second transport layer of the light emitting diode comprises ZnMgO.

In some embodiments, the first conductive layer of the light emitting diode comprises indium tin oxide, the second conductive layer comprises aluminum, the semiconductor polymer layer comprises PEDOT/PSS, the first transport layer comprises N,N'-di(naphthalen-1-yl)-N,N'-bis(4-vinylphenyl)-4,4'-diamine, and the second transport layer comprises ZnMgO.

In some embodiments, the first conductive layer of the light emitting diode comprises indium tin oxide, the second conductive layer comprises gold, the semiconductor polymer layer comprises PEDOT/PSS, and the first transport layer comprises N,N'-di(naphthalen-1-yl)-N,N'-bis(4-vinylphenyl)-4,4'-diamine.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

As shown in FIG. 2, the singlet energy of the host material, bipolar ligand, and TADF ligand ($S_{14}$, $S_{13}$, and $S_{12}$, respectively) is higher than the singlet energy of quantum dots (QDs) due to energy transfer from the organic materials to the quantum dots through Forster resonance energy transfer (FRET) and Dexter energy transfer (DET).

DETAILED DESCRIPTION OF THE INVENTION

Figure 1:
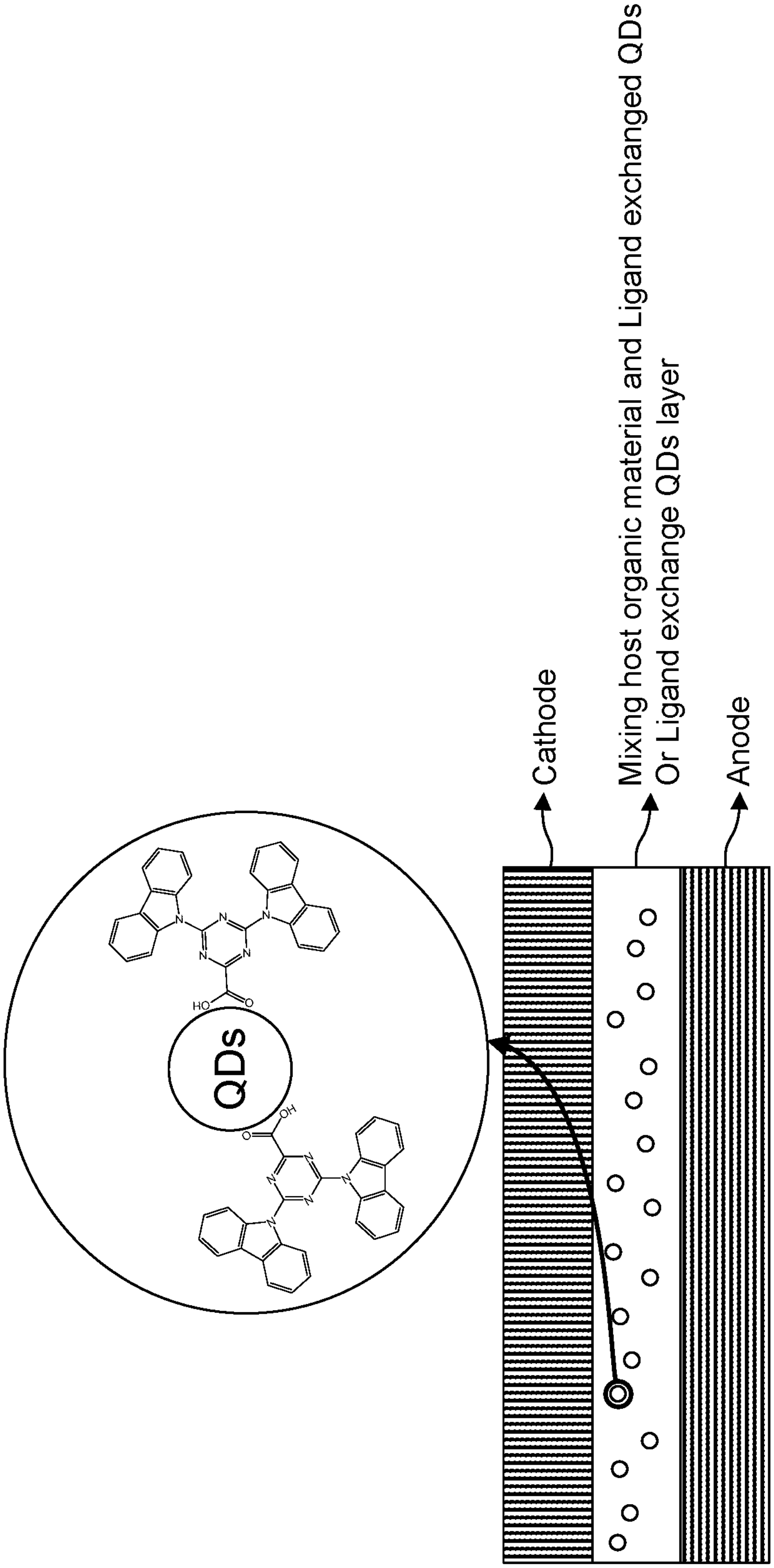
FIG. 1 is a schematic showing a device comprising an emitting layer of quantum dots comprising coordinatively bound thermally activated delayed fluorescence (TADF) or bipolar ligands between a cathode and an anode layer.
Figure 2:
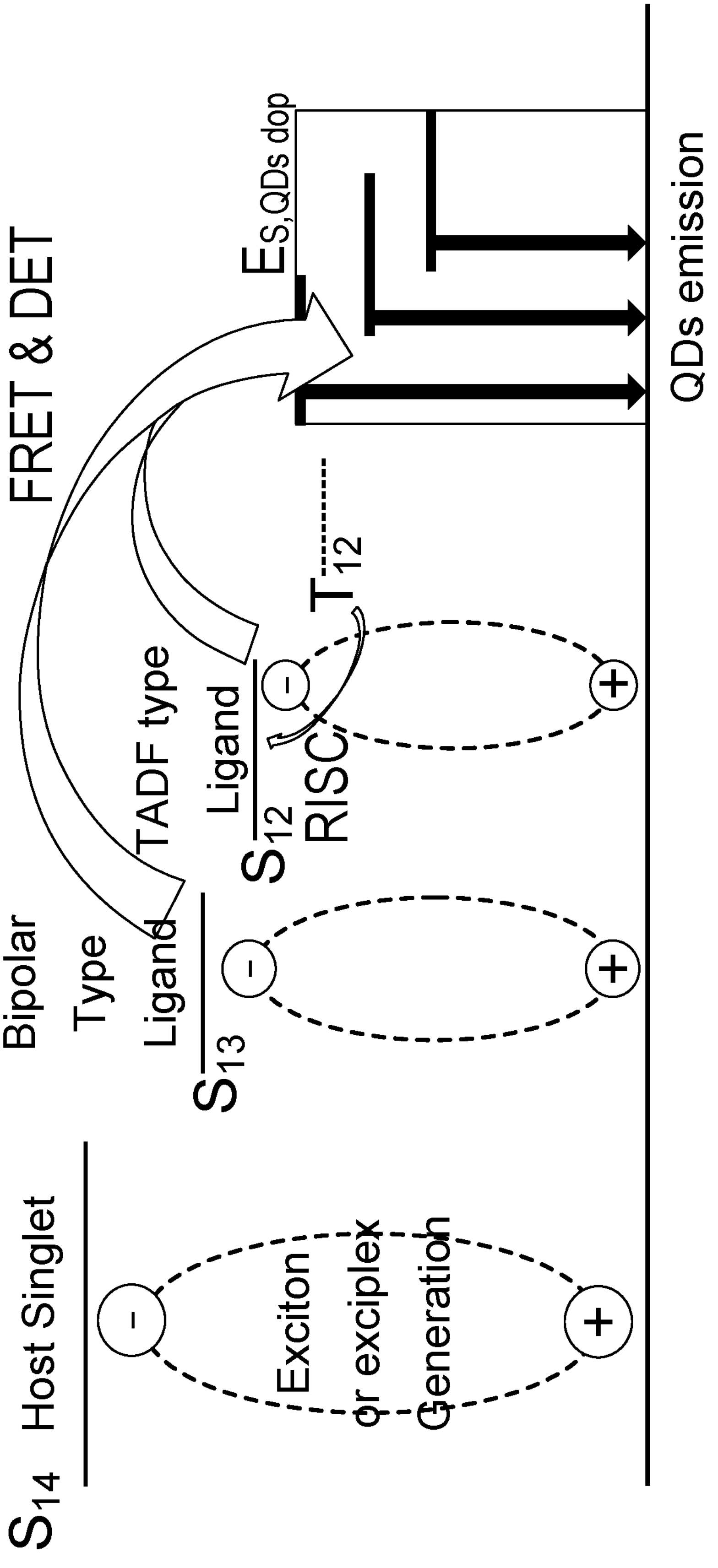
FIG. 2 is schematic showing the light emission mechanism of quantum dots comprising TADF or bipolar ligands.

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in practice for testing, the preferred materials and methods are described herein. Accordingly, the terminology used herein is for the purpose of describing particular embodiments only, and is not intended to be limiting.

As used in this specification and the appended claims, the singular forms "a," "an," and "the" include plural referents unless the context clearly dictates otherwise. Thus, for example, reference to "a nanostructure" includes a plurality of such nanostructures, and the like.

The term "about" as used herein indicates the value of a given quantity varies by 10% of the value. For example, "about 100 nm" encompasses a range of sizes from 90 nm to 110 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm, less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogenous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

A "ligand" is a molecule capable of interacting (whether weakly or strongly) with one or more facets of a nanostructure, e.g., through covalent, ionic, van der Waals, or other molecular interactions with the surface of the nanostructure.

"Photoluminescence quantum yield" is the ratio of photons emitted to photons absorbed, e.g., by a nanostructure or population of nanostructures. As known in the art, quantum yield is typically determined by a comparative method using well-characterized standard samples with known quantum yield values.

As used herein, the term “shell” refers to material deposited onto the core or onto previously deposited shells of the same or different composition and that result from a single act of deposition of the shell material. The exact shell thickness depends on the material as well as the precursor input and conversion and can be reported in nanometers or monolayers. As used herein, “target shell thickness” refers to the intended shell thickness used for calculation of the required precursor amount. As used herein, “actual shell thickness” refers to the actually deposited amount of shell material after the synthesis and can be measured by methods known in the art. By way of example, actual shell thickness can be measured by comparing particle diameters determined from transmission electron microscopy (TEM) images of nanocrystals before and after a shell synthesis.

As used herein, the term “stable” refers to a mixture or composition that resists change or decomposition due to internal reaction or due to the action of air, heat, light, electric field, electric current, pressure, or other natural conditions.

As used herein, the term “full width at half-maximum” (FWHM) is a measure of the size distribution of quantum dots. The emission spectra of quantum dots generally have the shape of a Gaussian curve. The width of the Gaussian curve is defined as the FWHM and gives an idea of the size distribution of the particles. A smaller FWHM corresponds to a narrower quantum dot nanocrystal size distribution. FWHM is also dependent upon the emission wavelength maximum.

As used herein, the term “moiety” refers to the radical of a molecule that is attached to another moiety.

As used herein, the term “donor moiety” refers to a molecular fragment that can donate electrons from its highest occupied molecular orbital to an acceptor moiety upon excitation. In some embodiments, the donor moiety comprises an amine group, an alkoxy group, or a combination thereof. In some embodiments, the donor moiety is selected from the group consisting of a carbazole, a benzofurocarbazole, a thienocarbazole, an indolocarbazole, a bicarbazole, an amine, a diamine, an acridan, a phenoxazine, a phenothiazine, or a phenazine.

As used herein, the term “acceptor moiety” refers to a molecular fragment that can accept electrons into its lowest unoccupied molecular orbital from a donor moiety that has been subject to excitation. In some embodiments, the acceptor moiety comprises a nitro group, a cyano group, a sulfonyl group, a ketone group, or a combination thereof. In some embodiments, the acceptor moiety is selected from the group consisting of a diphenyl sulfone, an aromatic ketone, a triazine, a benzonitrile, a benzooxazole, a quinoxaline, an anthroquinone, and a heptazine.

“Alkyl” as used herein refers to a straight or branched, saturated, aliphatic radical having the number of carbon atoms indicated. In some embodiments, the alkyl is $C_{1-2}$ alkyl, $C_{1-3}$ alkyl, $C_{1-4}$ alkyl, $C_{1-5}$ alkyl, $C_{1-6}$ alkyl, $C_{1-7}$ alkyl, $C_{1-8}$ alkyl, $C_{1-9}$ alkyl, $C_{1-10}$ alkyl, $C_{1-12}$ alkyl, $C_{1-14}$ alkyl, $C_{1-16}$ alkyl, $C_{1-18}$ alkyl, $C_{1-20}$ alkyl, $C_{8-20}$ alkyl, $C_{12-20}$ alkyl, $C_{14-20}$ alkyl, $C_{16-20}$ alkyl, or $C_{18-20}$ alkyl. For example, $C_{1-6}$ alkyl includes, but is not limited to, methyl, ethyl, propyl, isopropyl, butyl, isobutyl, sec-butyl, tert-butyl, pentyl, isopentyl, and hexyl. In some embodiments, the alkyl is octyl, nonyl, decyl, undecyl, dodecyl, tridecyl, tetradecyl, pentadecyl, hexadecyl, heptadecyl, octadecyl, nonadecyl, or icosanyl.

The term “alkylene,” as used herein, alone or in combination, refers to a saturated aliphatic group derived from a straight or branched chain saturated hydrocarbon attached at two or more positions, such as methylene ($—CH_2—$). Unless otherwise specified, the term “alkyl” may include “alkylene” groups.

“Alkenyl” as used herein refers to a monovalent group derived from a straight- or branched-chain hydrocarbon moiety having at least one carbon-carbon double bond by the removal of a single hydrogen atom. In some embodiments, the alkenyl group contains 2-20 carbon atoms and is a $C_{2-20}$ alkenyl. In some embodiments, the alkenyl group contains 2-15 carbon atoms and is a $C_{2-15}$ alkenyl. In some embodiments, the alkenyl group contains 2-10 carbon atoms and is a $C_{2-10}$ alkenyl. In some embodiments, the alkenyl group contains 2-8 carbon atoms and is a $C_{2-8}$ alkenyl. In some embodiments, the alkenyl group contains 2-5 carbons and is a $C_{2-5}$ alkenyl. Alkenyl groups include, for example, ethenyl, propenyl, butenyl, and 1-methyl-2-buten-1-yl.

“Alkynyl” as used herein refers to a monovalent group derived from a straight- or branched-chain hydrocarbon having at least one carbon-carbon triple bond by the removal of a single hydrogen atom. In some embodiments, the alkynyl group contains 2-20 carbon atoms and is a $C_{2-20}$ alkynyl. In some embodiments, the alkynyl group contains 2-15 carbon atoms and is a $C_{2-15}$ alkynyl. In some embodiments, the alkynyl group contains 2-10 carbon atoms and is a $C_{2-10}$ alkynyl. In some embodiments, the alkynyl group contains 2-8 carbon atoms and is a $C_{2-8}$ alkynyl. In some embodiments, the alkynyl group contains 2-5 carbons and is a $C_{2-8}$ alkynyl. Representative alkynyl groups include, but are not limited to, ethynyl, 2- propynyl (propargyl), and 1-propynyl.

“Alkoxy” as used herein, refers to an “alkyl-O—” group, wherein alkyl is defined above. Alkoxy groups include, for example, methoxy or ethoxy.

“Alkylamino” as used herein, refers to a “substituted amino” of the formula ($—NR^K_2$) wherein each $R^K$ is, independently, a hydrogen or an optionally substituted alkyl group, as defined herein, and the nitrogen moiety is directly attached to the parent molecule.

“Heteroalkyl” as used herein, refers to an alkyl moiety which is optionally substituted with one or more functional groups, and that contain one or more oxygen, sulfur, nitrogen, phosphorus, or silicon atoms, e.g., in place of carbon atoms.

“Cycloalkyl” as used herein, refers to a monovalent or divalent group of 3 to 8 carbon atoms, preferably 3 to 5 carbon atoms derived from a saturated cyclic hydrocarbon. Cycloalkyl groups can be monocyclic or polycyclic. Cycloalkyl can be substituted by $C_{1-3}$ alkyl groups or halogens.

“Carboxy” as used herein, refers to a group that contains a carbon-oxygen double bond such as —COOH, $—COOR^A$, OC(O)H, $—OC(O)R^A$, wherein $R^A$ is alkyl, alkenyl, alkynyl, heteroalkyl, cycloalkyl, heterocycloalkyl, aryl, or heteroaryl, each of which can be optionally substituted. In some embodiments, the carboxy is a carboxylic acid, a dicarboxylic acid, a polycarboxylic acid, or a carboxylate.

“Haloalkyl” as used herein, refers to at least one halogen appended to the parent molecular group through an alkyl moiety. Suitable haloalkyl employed in compounds are chloromethyl, 2-fluoroethyl, trifluoromethyl, pentafluoroethyl, and 2-chloro-3-fluorophenyl.

“Amido” as used herein, refers to both “aminocarbonyl” and “carbonylamino.” These terms when used alone or in connection with another group refers to an amido group such as $N(R^LR^M)$—C(O)— or $R^MC(O)$—$N(R^L)$ when used terminally and C(O)—$N(R^L)$ or $N(R^M)$—C(O)— when used internally, wherein each of $R^L$ and $R^M$ is independently hydrogen, alkyl, cycloaliphatic, (cycloaliphatic)aliphatic, aryl, araliphatic, heterocycloaliphatic, (heterocycloaliphatic) aliphatic, heteroaryl, carboxy, suilfanyl, sulfinyl, sulfonyl, (aliphatic)carbonyl, (cycloaliphatic)carbonyl, ((cycloaliphatic)aliphatic)carbonyl, arylcarbonyl, (araliphatic)carbonyl, (heterocycloaliphatic)carbonyl, ((beterocycloaliphatic) aliphatic)carbonyl, (heteroaryl)carbonyl, or (heteroaraliphatic)carbonyl, each of which being defined herein and being optionally substituted. Examples of amino groups include alkylamino, dialkylamino, or arylamino. Examples of amido groups include alkylamido (such as alkylcarbonylamino or alkylcarbonylamino), (heterocycloaliphatic)amido, (heteroaralkyl)amido, (heteroaryl)amido, (heterocycloalkyl)alkylamido, arylamido, aralkylamido, (cycloalkyl)alkylarnido, or cycloalkylamido.

“Carboxyalkyl” as used herein, refers to a carboxylic acid group (—COOH) appended to a lower alkyl radical.

“Heterocycloalkyl” as used herein, refers to cycloalkyl substituents that have from 1 to 5, and more typically from 1 to 4 heteroatoms in the ring structure. Suitable heteroatoms employed in compounds are nitrogen, oxygen, and sulfur. Representative heterocycloalkyl moieties include, for example, morpholino, piperazinyl, piperidinyl, and the like.

“Aryl” or “aromatic” as used herein refers to unsubstituted monocyclic or bicyclic aromatic ring systems having from six to fourteen carbon atoms, i.e., a $C_{6-14}$ aryl. Non-limiting exemplary aryl groups include phenyl, naphthyl, phenanthryl, anthracyl, indenyl, azulenyl, biphenyl, biphenylenyl, fluorenyl groups, terphenyl, pyrenyl, 9,9-dimethyl-2-fluorenyl, anthryl, triphenylenyl, chrysenyl, fluorenylidenephenyl, and 5H-dibenzo[a,d]cycloheptenylidenephenyl. In one embodiment, the aryl group is a phenyl, naphthyl, or 9,9-dimethyl-2-fluorenyl.

“Heteroaryl” or “heteroaromatic” as used herein refers to unsubstituted monocyclic and bicyclic aromatic ring systems having 5 to 14 ring atoms, i.e., a 5- to 14-membered heteroaryl, wherein at least one carbon atom of one of the rings is replaced with a heteroatom independently selected from the group consisting of oxygen, nitrogen, and sulfur. In one embodiment, the heteroaryl contains 1, 2, 3, or 4 heteroatoms independently selected from the group consisting of oxygen, nitrogen, and sulfur. In one embodiment, the heteroaryl has three heteroatoms. In another embodiment, the heteroaryl has two heteroatoms. In another embodiment, the heteroaryl has one heteroatom. In another embodiment, the heteroaryl is a 5- to 10-membered heteroaryl. In another embodiment, the heteroaryl is a 5- or 6-membered heteroaryl. In another embodiment, the heteroaryl has 5 ring atoms, e.g., thienyl, a 5-membered heteroaryl having four carbon atoms and one sulfur atom. In another embodiment, the heteroaryl has 6 ring atoms, e.g., pyridyl, a 6-membered heteroaryl having five carbon atoms and one nitrogen atom. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, β-carbolinyl, phenanthridinyl, acridinyl, pyrimidinyl, phenanthrolinyl, phenazinyl, thiazolyl, isothiazolyl, phenothiazolyl, isoxazolyl, furazanyl, and phenoxazinyl. In one embodiment, the heteroaryl is thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H-pyrazol-3-yl, 1H-pyrazol-4-yl, and 1H-pyrazol-5-yl), pyridyl (e.g., pyridin-2-yl, pyridin-3-yl, and pyridin-4-yl), pyrimidinyl (e.g., pyrimidin-2-yl, pyrimidin-4-yl, and pyrimidin-5-yl), thiazolyl (e.g., thiazol-2-yl, thiazol-4-yl, and thiazol-5-yl), isothiazolyl (e.g., isothiazol-3-yl, isothiazol-4-yl, and isothiazol-5-yl), oxazolyl (e.g., oxazol-2-yl, oxazol-4-yl, and oxazol-5-yl), isoxazolyl (e.g., isoxazol-3-yl, isoxazol-4-yl, and isoxazol-5-yl), or indazolyl (e.g., 1H-indazol-3-yl). The term “heteroaryl” also includes possible N-oxides. A non-limiting exemplary N-oxide is pyridyl N-oxide.

The term “radical” used herein, as known to a person with ordinary skill in the art of chemistry, refers to a chemical species with an unpaired valence electron.

Unless clearly indicated otherwise, ranges listed herein are inclusive.

A variety of additional terms are defined or otherwise characterized herein.

Nanostructure Composition

In some embodiments, the present disclosure provides a nanostructure composition comprising:

(a) at least one population of nanostructures; and (b) at least one donor-acceptor ligand, wherein the donor-acceptor ligand comprises at least one terminal functional group, wherein the at least one terminal functional group is bound to the surface of the nanostructures.

In some embodiments, the nanostructure is a quantum dot.

In some embodiments, the donor-acceptor ligand is a thermally activated delayed fluorescence (TADF) ligand.

In some embodiments, the donor-acceptor ligand comprises at least one donor moiety attached to the at least one terminal functional group. In some embodiments, the donor-acceptor ligand comprises at least one acceptor moiety attached to the at least one terminal functional group.

In some embodiments, the present disclosure provides a nanostructure composition comprising:

(a) at least one population of nanostructures; and (b) at least one donor-acceptor ligand bound to the surface of the nanostructures, the donor-acceptor ligand comprising:

(i) a donor-acceptor ligand of formula (I)

$$D_d\text{-}A_a\text{-}FG_f \qquad (I)$$

wherein:

FG is —OH, —SH, —$NH_2$, —$CO_2H$, —$P(O)(OH)_2$, —P(O)OH, or —$SO_3H$;

D is a donor moiety comprising a monocyclic or fused polycyclic aryl or heteroaryl comprising between 5 and 20 atoms, optionally substituted with one or more substituents;

A is an acceptor moiety comprising for each occurrence independently, a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4; or (ii) donor-acceptor ligand of formula (II)

$$A_a\text{-}D_d\text{-}FG_f \qquad (II)$$

wherein:

FG is —OH, —SH, —$NH_2$, —$CO_2H$, —P(O)$(OH)_2$, —P(O)OH, or —$SO_3H$;

A is an acceptor moiety comprising a monocyclic or fused polycyclic aryl or heteroaryl comprising between 5 and 20 atoms, optionally substituted with one or more substituents;

D is a donor moiety comprising for each occurrence independently, a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4; or (iii) a combination thereof.

In some embodiments, the nanostructure is a quantum dot.

In some embodiments, the present disclosure provides a nanostructure composition comprising:

(a) at least one population of nanostructures, wherein the nanostructures comprise ligands bound to the nanostructures; and (b) at least one donor-acceptor ligand bound to the surface of the nanostructures, the donor-acceptor ligand comprising:

(i) a donor-acceptor ligand of formula (III)

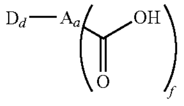

(III)

wherein:

D is a donor moiety comprising for each occurrence independently, a monocyclic or fused polycyclic aryl or heteroaryl comprising between 5 and 20 atoms, optionally substituted with one or more substituents;

A is an acceptor moiety comprising a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4; or (ii) a donor-acceptor ligand of formula (IV)

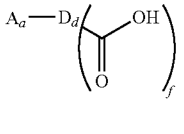

(IV)

wherein:

A is an acceptor moiety comprising a monocyclic or fused polycyclic aryl or heteroaryl comprising between 5 and 20 atoms, optionally substituted with one or more substituents;

D is a donor moiety comprising for each occurrence independently, a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4; or (iii) a combination thereof.

In some embodiments, the nanostructure composition further comprises an organic resin.

In some embodiments, the nanostructure is a quantum dot.

Nanostructure Film Layer

In some embodiments, the present invention provides a nanostructure film layer comprising:

(a) at least one population of nanostructures, wherein the nanostructures comprise ligands bound to the nanostructures; and (b) at least one donor-acceptor ligand bound to the nanostructures.

In some embodiments, the nanostructure film layer further comprises an organic resin.

In some embodiments, the nanostructure is a quantum dot.

Illumination Device

In some embodiments, the present invention provides an illumination device comprising:

(a) a first conductive layer;

(b) a second conductive layer; and (c) an emitting layer between the first conductive layer and the second conductive layer, wherein the emitting layer comprises at least one population of nanostructures comprising a donor-acceptor ligand bound to the nanostructures.

In some embodiments, the light emitting diode is a quantum dot light emitting diode.

In some embodiments, the donor-acceptor ligand comprises at least one acceptor moiety attached to the at least one terminal functional group. In some embodiments, the donor-acceptor ligand comprises at least one donor moiety attached to the at least one terminal functional group. In some embodiments, the nanostructures comprise a combination of donor-acceptor ligands comprising at least one acceptor moiety attached to the at least one terminal functional group and donor-acceptor ligands at least one donor moiety attached to the at least one terminal functional group.

Nanostructures

The quantum dots (or other nanostructures) for use in the present invention can be produced from any suitable material, suitably an inorganic material, and more suitably an inorganic conductive or semiconductive material. Suitable semiconductor materials include any type of semiconductor, including Group II-VI, Group III-V, Group IV-VI, and Group IV semiconductors. Suitable semiconductor materials include, but are not limited to, Si, Ge, Sn, Se, Te, B, C(including diamond), P, BN, BP, BAs, AlN, AlP, AlAs, AlSb, GaN, GaP, GaAs, GaSb, InN, InP, InAs, InSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, and combinations thereof.

The synthesis of Group II-VI nanostructures has been described in U.S. Pat. Nos. 6,225,198, 6,322,901, 6,207,229, 6,607,829, 6,861,155, 7,060,243, 7,125,605, 7,374,824, 7,566,476, 8,101,234, and 8,158,193 and in U.S. Patent Appl. Publication Nos. 2011/0262752 and 2011/0263062. In some embodiments, the core is a Group II-VI nanocrystal selected from the group consisting of ZnO, ZnSe, ZnS, ZnTe, CdO, CdSe, CdS, CdTe, HgO, HgSe, HgS, and HgTe. In some embodiments, the core is a nanocrystal selected from the group consisting of ZnSe, ZnS, CdSe, and CdS.

Although Group II-VI nanostructures such as CdSe and CdS quantum dots can exhibit desirable luminescence behavior, issues such as the toxicity of cadmium limit the applications for which such nanostructures can be used. Less toxic alternatives with favorable luminescence properties are thus highly desirable. Group III-V nanostructures in general and InP-based nanostructures in particular, offer the best known substitute for cadmium-based materials due to their compatible emission range.

In some embodiments, the nanostructures are free from cadmium. As used herein, the term "free of cadmium" is intended that the nanostructures contain less than 100 ppm by weight of cadmium. The Restriction of Hazardous Substances (RoHS) compliance definition requires that there must be no more than 0.01% (100 ppm) by weight of cadmium in the raw homogeneous precursor materials. The cadmium level in the Cd-free nanostructures is limited by the trace metal concentration in the precursor materials. The trace metal (including cadmium) concentration in the precursor materials for the Cd-free nanostructures, can be measured by inductively coupled plasma mass spectroscopy (ICP-MS) analysis, and are on the parts per billion (ppb) level. In some embodiments, nanostructures that are "free of cadmium" contain less than about 50 ppm, less than about 20 ppm, less than about 10 ppm, or less than about 1 ppm of cadmium.

In some embodiments, the core is a Group III-V nanostructure. In some embodiments, the core is a Group III-V nanocrystal selected from the group consisting of BN, BP, BAs, BSb, AlN, AlP, AlAs, AlSb, GaN, GaP, GaAs, GaSb, InN, InP, InAs, and InSb. In some embodiments, the core is an InP nanocrystal. In some embodiments, the core is a ZnSe nanocrystal.

The synthesis of Group III-V nanostructures has been described in U.S. Pat. Nos. 5,505,928, 6,306,736, 6,576,291, 6,788,453, 6,821,337, 7,138,098, 7,557,028, 7,645,397, 8,062,967, and 8,282,412 and in U.S. Patent Appl. Publication No. 2015/0236195. Synthesis of Group III-V nanostructures has also been described in Wells, R. L., et al., "The use of tris(trimethylsilyl)arsine to prepare gallium arsenide and indium arsenide," *Chem. Mater.* 1:4-6 (1989) and in Guzelian, A. A., et al., "Colloidal chemical synthesis and characterization of InAs nanocrystal quantum dots," *Appl. Phys. Lett.* 69: 1432-1434 (1996).

Synthesis of InP-based nanostructures has been described, e.g., in Xie, R., et al., "Colloidal InP nanocrystals as efficient emitters covering blue to near-infrared," *J. Am. Chem. Soc.* 129:15432-15433 (2007); Micic, O. I., et al., "Core-shell quantum dots of lattice-matched ZnCdSe2 shells on InP cores: Experiment and theory," *J. Phys. Chem. B* 104:12149-12156 (2000); Liu, Z., et al., "Coreduction colloidal synthesis of III-V nanocrystals: The case of InP," *Angew. Chem. Int. Ed. Engl.* 47:3540-3542 (2008); Li, L. et al., "Economic synthesis of high quality InP nanocrystals using calcium phosphide as the phosphorus precursor," *Chem. Mater.* 20:2621-2623 (2008); D. Battaglia and X. Peng, "Formation of high quality InP and InAs nanocrystals in a noncoordinating solvent," *Nano Letters* 2:1027-1030 (2002); Kim, S., et al., "Highly luminescent InP/GaP/ZnS nanocrystals and their application to white light-emitting diodes," *J. Am. Chem. Soc.* 134:3804-3809 (2012); Nann, T., et al., "Water splitting by visible light: A nanophotocathode for hydrogen production," *Angew. Chem. Int. Ed.* 49:1574-1577 (2010); Borchert, H., et al., "Investigation of ZnS passivated InP nanocrystals by XPS," *Nano Letters* 2:151-154 (2002); L. Li and P. Reiss, "One-pot synthesis of highly luminescent InP/ZnS nanocrystals without precursor injection," *J. Am. Chem. Soc.* 130:11588-11589 (2008); Hussain, S., et al. "One-pot fabrication of high-quality InP/ZnS (core/shell) quantum dots and their application to cellular imaging," *Chemphyschem.* 10:1466-1470 (2009); Xu, S., et al., "Rapid synthesis of high-quality InP nanocrystals," *J. Am. Chem. Soc.* 128:1054-1055 (2006); Micic, O. I., et al., "Size-dependent spectroscopy of InP quantum dots," *J. Phys. Chem. B* 101:4904-4912 (1997); Haubold, S., et al., "Strongly luminescent InP/ZnS core-shell nanoparticles," *Chemphyschem.* 5:331-334 (2001); CrosGagneux, A., et al., "Surface chemistry of InP quantum dots: A comprehensive study," *J. Am. Chem. Soc.* 132:18147-18157 (2010); Micic, O. I., et al., "Synthesis and characterization of InP, GaP, and $GaInP_2$ quantum dots," *J. Phys. Chem.* 99:7754-7759 (1995); Guzelian, A. A., et al., "Synthesis of size-selected, surface-passivated InP nanocrystals," *J. Phys. Chem.* 100:7212-7219 (1996); Lucey, D. W., et al., "Monodispersed InP quantum dots prepared by colloidal chemistry in a non-coordinating solvent," *Chem. Mater.* 17:3754-3762 (2005); Lim, J., et al., "InP@ZnSeS, core@composition gradient shell quantum dots with enhanced stability," *Chem. Mater.* 23:4459-4463 (2011); and Zan, F., et al., "Experimental studies on blinking behavior of single InP/ZnS quantum dots: Effects of synthetic conditions and UV irradiation," *J. Phys. Chem. C* 116:394-3950 (2012).

In some embodiments, the core is doped. In some embodiments, the dopant of the nanocrystal core comprises a metal, including one or more transition metals. In some embodiments, the dopant is a transition metal selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au, and combinations thereof. In some embodiments, the dopant comprises a non-metal. In some embodiments, the dopant is ZnS, ZnSe, ZnTe, CdSe, CdS, CdTe, HgS, HgSe, HgTe, CuInS2, CuInSe2, AlN, AlP, AlAs, GaN, GaP, or GaAs.

Inorganic shell coatings on nanostructures are a universal approach to tailoring their electronic structure. Additionally, deposition of an inorganic shell can produce more robust particles by passivation of surface defects. Ziegler, J., et al., Adv. Mater. 20:4068-4073 (2008). For example, shells of wider band gap semiconductor materials such as ZnS can be deposited on a core with a narrower band gap such as CdSe or InP to afford structures in which excitons are confined within the core. This approach increases the probability of radiative recombination and makes it possible to synthesize very efficient quantum dots with quantum yields close to unity and thin shell coatings.

In some embodiments, the nanostructures comprise a core and at least one shell. In some embodiments, the nanostructures comprise a core and at least two shells. The shell can, e.g., increase the quantum yield and/or stability of the nanostructures. In some embodiments, the core and the shell comprise different materials. In some embodiments, the nanostructure comprises shells of different shell material.

Exemplary materials for preparing shells include, but are not limited to, Si, Ge, Sn, Se, Te, B, C(including diamond), P, Co, Au, BN, BP, BAs, AlN, AlP, AlAs, AlSb, GaN, GaP, GaAs, GaSb, InN, InP, InAs, InSb, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $Al_2CO$, and combinations thereof.

In some embodiments, the shell is a mixture of at least two of a zinc source, a selenium source, a sulfur source, a tellurium source, and a cadmium source. In some embodiments, the shell is a mixture of two of a zinc source, a selenium source, a sulfur source, a tellurium source, and a cadmium source. In some embodiments, the shell is a mixture of three of a zinc source, a selenium source, a sulfur source, a tellurium source, and a cadmium source. In some embodiments, the shell is a mixture of: zinc and sulfur; zinc and selenium; zinc, sulfur, and selenium; zinc and tellurium; zinc, tellurium, and sulfur; zinc, tellurium, and selenium; zinc, cadmium, and sulfur; zinc, cadmium, and selenium; cadmium and sulfur; cadmium and selenium; cadmium, selenium, and sulfur; cadmium and zinc; cadmium, zinc, and sulfur; cadmium, zinc, and selenium; or cadmium, zinc, sulfur, and selenium. In some embodiments, the shell is a mixture of zinc and selenium. In some embodiments, the shell is a mixture of zinc and sulfur.

Exemplary core/shell luminescent nanostructures include, but are not limited to (represented as core/shell)CdSe/ZnS, InP/ZnS, PbSe/PbS, CdSe/CdS, CdTe/CdS, and CdTe/ZnS. The synthesis of core/shell nanostructures is disclosed in U.S. Pat. No. 9,169,435.

In some embodiments, the nanostructures comprise a core and at least one shell. In some embodiments, one shell is a mixture of zinc and selenium. In some embodiments, the nanostructures comprise a ZnS core and a ZnSe shell.

In some embodiments, the nanostructures include a core and at least two shells. In some embodiments, one shell is a mixture of zinc and selenium and one shell is a mixture of zinc and sulfur. In some embodiments, the nanostructures comprise an InP core, a ZnSe shell, and a ZnS shell.

The luminescent nanocrystals can be made from a material impervious to oxygen, thereby simplifying oxygen barrier requirements and photostabilization of the quantum dots in the quantum dot film layer. In exemplary embodiments, the luminescent nanocrystals are coated with one or more organic polymeric ligand material and dispersed in an organic polymeric matrix comprising one or more matrix materials. The luminescent nanocrystals can be further coated with one or more inorganic layers comprising one or more material such as a silicon oxide, an aluminum oxide, or a titanium oxide (e.g., $SiO_2$, $Si_2O_3$, $TiO_2$, or $Al_2O_3$), to hermetically seal the quantum dots.

First Ligands

In some embodiments, the nanostructures comprise ligands bound to their surface. In some embodiments, the nanostructures include a coating layer comprising ligands to protect the nanostructures from external moisture and oxidation, to control aggregation, and to allow for dispersion of the nanostructures in the matrix material. Suitable first ligands include those disclosed in U.S. Pat. Nos. 6,949,206; 7,267,875; 7,374,807; 7,572,393; 7,645,397; and 8,563,133 and in U.S. Patent Appl. Publication Nos. 2008/0237540; 2008/0281010; and 2010/0110728.

In some embodiments, the nanostructure comprises a multi-part ligand structure, such as the three-part ligand structure disclosed in U.S. Patent Appl. Publication No. 2008/237540, in which the head-group, tail-group, and middle/body group are independently fabricated and optimized for their particular function, and then combined into an ideally functioning complete surface ligand.

In some embodiments, the first ligands comprise one or more organic polymeric ligands. Suitable ligands provide: efficient and strong bonding quantum dot encapsulation with low oxygen permeability; precipitate or segregate into domain in the matrix material to form a discontinuous dual-phase or multi-phase matrix; disperse favorably throughout the matrix material; and are commercially available materials or can be easily formulated from commercially available materials.

In some embodiments, the first ligand comprises a carboxy, a thiol, a phosphine, or a phosphine oxide group.

In some embodiments, the first ligand comprises a carboxy group. In some embodiments, the first ligand comprises a carboxylic acid group. In some embodiments, the first ligand comprises a carboxylic acid group and the carboxylic acid is a caprylic acid, capric acid, lauric acid, myristic acid, or palmitic acid. In some embodiments, the first ligand is a carboxylate. In some embodiments, the first ligand comprises a carboxylate and the carboxylate is a carboxyalkyl.

In some embodiments, the first ligand comprises a phosphine group. In some embodiments, the first ligand comprises a phosphine group and the phosphine group is triphenylphosphine, tributylphosphine, trihexylphosphine, trioctylphosphine (TOP), or tridecylphosphine.

In some embodiments, the first ligand comprises a phosphine oxide group. In some embodiments, the first ligand comprises a phosphine oxide group and the phosphine oxide is triphenylphosphine oxide, tributylphosphine oxide, trihexylphosphine oxide, trioctylphosphine oxide (TOPO), or tridecylphosphine oxide.

Acceptor Moiety

In some embodiments, the acceptor moiety is, for each occurrence independently, a monocyclic or fused polycyclic aryl or heteroaryl comprising between 5 and 20 atoms, optionally substituted with one or more substituents. In some embodiments, each acceptor moiety is covalently attached to a functional group. In some embodiments, each acceptor moiety is covalently attached to a $—CO_2H$ moiety. In some embodiments, each acceptor moiety is covalently attached to a donor moiety.

In some embodiments, the acceptor moiety (A) is a monocyclic or fused polycyclic aryl or heteroaryl comprising between 5 and 20 atoms, substituted with at least one cyano, ketone, ester, amide, aldehyde, sulfone, sulfoxide, or phosphine oxide.

In some embodiments, the acceptor moiety (A) is a pyridine, pyrimidine, pyrazine, triazine, triazole, or oxadiazole, optionally substituted with one or more substituents.

In some embodiments, the acceptor moiety (A) comprises a radical of a compound of formula V:

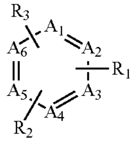

(V)

wherein:

$A_1$ to $A_6$ independently comprise C or N, and at least one of $A_1$ to $A_6$ is N; and $R_1$, $R_2$, and $R_3$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $—SO_2H$, $—NO_2$, —CN, halogen, cycloalkyl, or $C_{6-18}$ haloaryl.

In some embodiments, wherein $A_3$ and $A_5$ of formula V are C and $R_1$ and $R_4$ are phenyl, the acceptor moiety (A) comprises a radical of a compound of formula VI:

(VI)

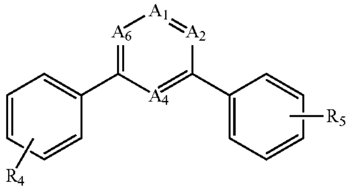

wherein:

$R_4$ and $R_5$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, wherein $A_1$, $A_3$, and $A_5$ are C and $R_1$ to $R_3$ are phenyl in formula V, the acceptor moiety (A) comprises a radical of a compound of formula VII:

(VII)

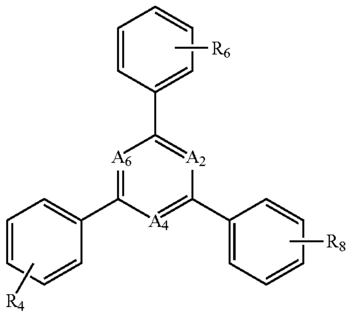

wherein:

$R_6$, $R_7$, and $R_8$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, wherein $A_4$ and $A_5$ form together with the carbon atoms to which they are bonded a 6-membered aromatic or heteroaromatic ring in formula V, the acceptor moiety (A) comprises a radical of a compound of formula VIII:

(VIII)

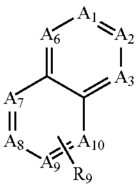

wherein:

$A_7$ to $A_{10}$ independently comprise C or N; and $R_9$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, in the compound of formula VIII, $A_2$ and $A_6$ are N, $A_1$, $A_3$, and $A_7$ to $A_{10}$ are C, and $R_9$ is H. In some embodiments, in the compound of formula VIII, $A_3$ and $A_6$ are N, $A_1$, $A_2$, and $A_7$ to $A_{10}$ are C, and $R_9$ is H.

In some embodiments, the acceptor moiety (A) comprises a radical of a compound of formula IX:

(IX)

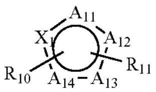

wherein:

$A_{11}$ to $A_{14}$ independently comprise C or N, wherein at least one of $A_{11}$ to $A_{14}$ is N;

$X_1$ is O, S, or $NR_{12}$;

$R_{10}$ and $R_{11}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{12}$ is hydrogen, $C_{1-10}$ alkyl, $C_{6-18}$ aryl, or heteroaryl.

In some embodiments, the acceptor moiety (A) comprises a radical of a compound of formula X:

(X)

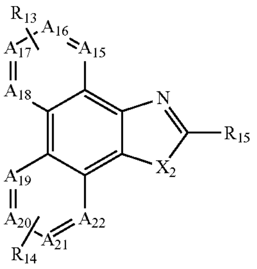

wherein:

$A_{15}$ to $A_{22}$ independently comprise C or N;

$X_2$ is O or S; and $R_{13}$, $R_{14}$, and $R_{15}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, in the compound of formula X, $A_{15}$ to $A_{22}$ are C, $X_2$ is O, and $R_{13}$ to $R_{15}$ are H.

In some embodiments, the acceptor moiety (A) comprises a radical of a compound of formula XI:

(XI)

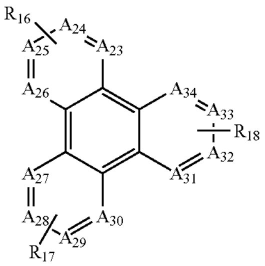

wherein:

$A_{23}$ to $A_{34}$ independently comprise C or N; and $R_{16}$, $R_{17}$, and $R_{18}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, in the compound of formula XI, $A_{23}$ is N, $A_{24}$ to $A_{34}$ are C, and $R_{16}$ to $R_{18}$ are H. In some embodiments, in the compound of formula XI, $A_{23}$ and $A_{34}$ are N, $A_{24}$ to $A_{33}$ are C, and $R_{16}$ to $R_{18}$ are H.

In some embodiments, the acceptor moiety (A) comprises a radical of a compound of formula XII:

(XII)

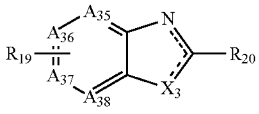

wherein:

$A_{35}$ to $A_{38}$ independently comprise C or N;

$X_3$ is O, S, or $NR_{21}$;

$R_{19}$ and $R_{20}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{21}$ is hydrogen, $C_{1-10}$ alkyl, $C_{6-18}$ aryl, or heteroaryl.

In some embodiments, in the compound of formula XII, $A_{35}$ to $A_{38}$ are C, $X_3$ is $NR_{21}$, $R_{19}$ and $R_{20}$ are H, and $NR_{21}$ is phenyl. In some embodiments, in the compound of formula XII, $A_{35}$ to $A_{38}$ are C, $X_3$ is $NR_{21}$, $R_{19}$ is hydrogen, and $R_{20}$ and $R_{21}$ are phenyl.

In some embodiments, acceptor moiety (A) comprises a radical of a compound of formula XIII:

(XIII)

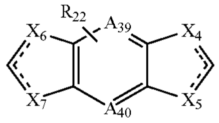

wherein:

$A_{39}$ and $A_{40}$ independently comprise C or N;

$X_4$ to $X_7$ independently comprise C, O, S, or $NR_{23}$, wherein at least one of $X_4$ to $X_7$ is $NR_{23}$;

$R_{22}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{23}$ is hydrogen, $C_{1-10}$ alkyl, $C_{6-18}$ aryl, or heteroaryl.

In some embodiments, acceptor moiety (A) comprises a radical of a compound of formula XIV:

(XIV)

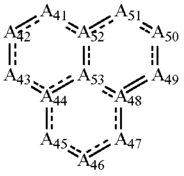

wherein:

$A_{41}$ to $A_{53}$ independently comprise C or N.

In some embodiments, $A_{41}$, $A_{43}$, $A_{45}$, $A_{47}$, $A_{49}$, $A_{51}$, and $A_{53}$ comprise N and $A_{42}$, $A_{44}$, $A_{46}$, $A_{48}$, $A_{50}$, and $A_{52}$ comprise C.

In some embodiments, acceptor moiety (A) comprises a radical of a compound of formula XV:

(XV)

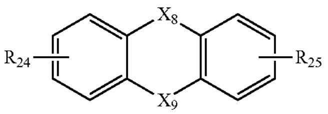

wherein:

$X_8$ is C(O) or $S(O)_2$;

$X_9$ is $CR_{26}R_{27}$, C(O), or $S(O)_2$;

$R_{24}$ and $R_{25}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{26}$ and $R_{27}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, $X_8$ is C(O) and $R_{24}$ and $R_{25}$ are H. In some embodiments, $X_8$ is $S(O)_2$ and $R_{24}$ and $R_{25}$ are H.

In some embodiments, acceptor moiety (A) comprises a radical of a compound of formula XVI:

(XVI)

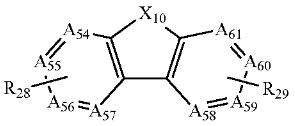

wherein:

$A_{54}$ and $A_{61}$ independently comprise C or N;

$X_{10}$ is $CR_{30}R_{31}$, S, O, or $S(O)_2$;

$R_{28}$ and $R_{29}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{30}$ and $R_{31}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, acceptor moiety (A) comprises a radical of a compound of formula XVII:

(XVII)

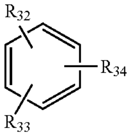

wherein:

$R_{32}$ is —$SO_2$—($C_{6-18}$ aryl), —CN, —C(O)—($C_{6-18}$ aryl), —C(O)—($C_{6-18}$ aryl)-C(O)—($C_{6-18}$ aryl), —$SO_2$—($C_{6-18}$ aryl)-$SO_2$—($C_{6-18}$ aryl), or —B—($C_{6-18}$ aryl)$_2$;

$R_{33}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{34}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, each acceptor moiety is radical of a compound selected from TABLE 1.

TABLE 1
| Number | Chemical Name | Structure |
| --- | --- | --- |
| A1 | sulfonylbenzene | 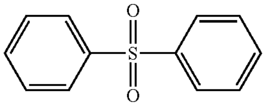 [SMILES: O=S(=O)(c1ccccc1)c1ccccc1] |
| A2 | benzophenone | 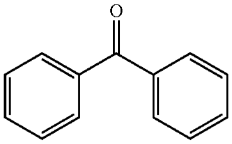 |
| A3 | 1,4-phenylenebis(phenylmethanone) | 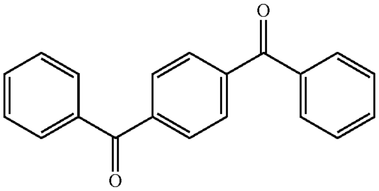 [SMILES: O=C(c1ccccc1)c1ccc(C(=O)c2ccccc2)cc1] |
| A4 | 1,3-phenylenebis(phenylmethanone) | 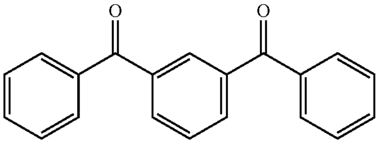 [SMILES: O=C(c1ccccc1)c1cccc(C(=O)c2ccccc2)c1] |
| A5 | benzonitrile | 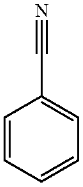 |
| A6 | isonicotinonitrile | 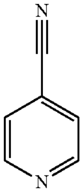 |
| A7 | phthalonitrile | 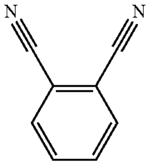 |
| A8 | isophthalonitrile | 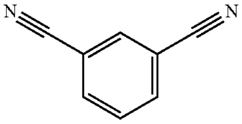 |
| A9 | terephthalonitrile | 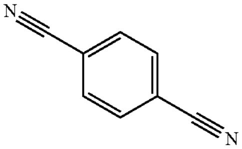 |

TABLE 1-continued
| Number | Chemical Name | Structure |
|---|---|---|
| A10 | benzene-1,3,5-tricarbonitrile | 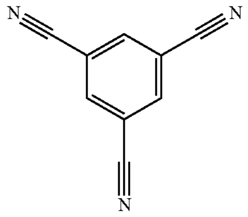 [SMILES: N#Cc1cc(C#N)cc(C#N)c1] |
| A11 | 4H-1,2,4-triazole | 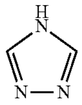 |
| A12 | 1,3,4-oxadizole | 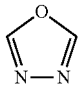 |
| A13 | 1,3,4-thiadiazole | 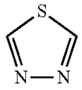 |
| A14 | benzo[d]thiazole | 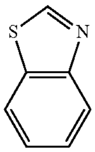 |
| A15 | benzo[1,2-d:4,5-d']bis(thiazole) | 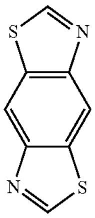 |
| A16 | benzo[1,2-d:5,4-d']bis(thiazole) | 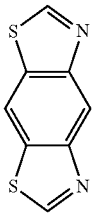 [SMILES: c1nc2cc3ncsc3cc2s1] |
| A17 | benzo[d]oxazole | 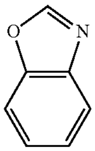 |
| A18 | benzo[1,2-d:4,5-d')bis(oxazole) | 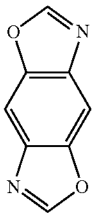 [SMILES: c1nc2cc3ocnc3cc2o1] |

TABLE 1-continued
| Number | Chemical Name | Structure |
| --- | --- | --- |
| A19 | benzo[1,2-d:5,4-d')bis(oxazole) | 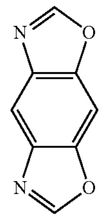 [SMILES: c1nc2cc3ncoc3cc2o1] |
| A20 | dioxazolo[4,5-b:5',4'-e]pyrazine | 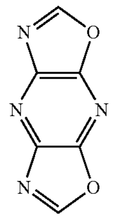 [SMILES: c1nc2nc3ncoc3nc2o1] |
| A21 | dioxazolo[4,5-b:5',4'-e]pyridine | 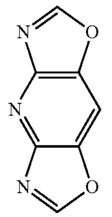 [SMILES: c1nc2nc3ncoc3cc2o1] |
| A22 | dioxazolo[5,4-b:4',5'-e]pyridine | 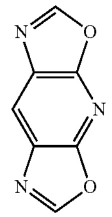 [SMILES: c1nc2cc3ncoc3nc2o1] |
| A23 | dioxazolo[4,5-b:4',5'-e]pyridine | 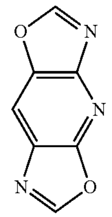 [SMILES: c1nc2nc3ocnc3cc2o1] |
| A24 | dioxazolo[4,5-b:4',5'-e]pyrazine | 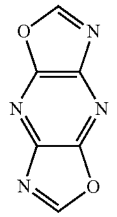 [SMILES: c1nc2nc3ocnc3nc2o1] |
| A25 | 5H-furo[2,3-b]pyrrole[3,2-e]pyrazine | 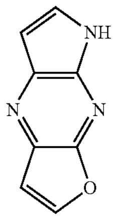 [SMILES: c1cc2nc3ccoc3nc2[nH]1] |

TABLE 1-continued
| Number | Chemical Name | Structure |
|---|---|---|
| A26 | 1,7-dihydrobenzo[1,2-d:4,5-d']diimidazole | 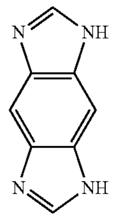 |
| A27 | 1,7-dihydrodiimidazo[4,5-b:4',5'e]pyrazine | 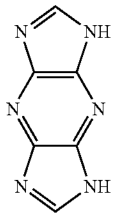 [SMILES: c1nc2nc3nc[nH]c3nc2[nH]1] |
| A28 | dithiazolo[4,5-b:5'4'-e]pyrazine | 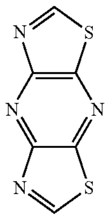 [SMILES: c1nc2nc3ncsc3nc2s1] |
| A29 | dithiazolo[4,5-b:5'4'-e]pyridine | 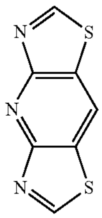 [SMILES: c1nc2nc3ncsc3cc2s1] |
| A30 | dithiazolo[4,5-b:4'5'-e]pyrazine | 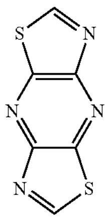 [SMILES: c1nc2nc3scnc3nc2s1] |
| A31 | dithiazolo[4,5-b:4'5'-e]pyridine | 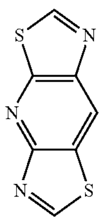 [SMILES: c1nc2nc3scnc3cc2s1] |
| A32 | dithiazolo[5,4-b:4'5'-e]pyridine | 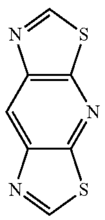 [SMILES: c1nc2cc3ncsc3nc2s1] |

TABLE 1-continued
| Number | Chemical Name | Structure |
|---|---|---|
| A33 | quinoxaline | 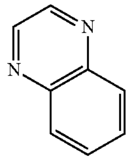 |
| A34 | 1,6-naphthyridine | 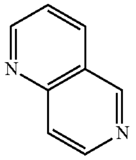 |
| A35 | quinoline | 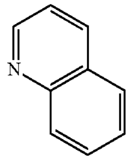 |
| A36 | 1H-benzo[d]imidazole | 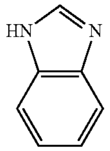 |
| A37 | 1H-pyrrolo[3,2-c]pyridine | 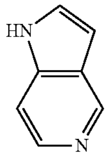 |
| A38 | benzo[d]oxazole | 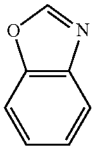 |
| A39 | 2-phenylbenzo[d]oxazole | 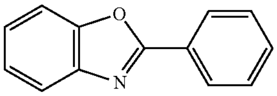 [SMILES: c1ccc(-c2nc3ccccc3o2)cc1] |
| A40 | 1H-benzo[d][1,2,3]triazole | 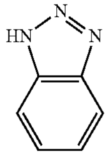 |
| A41 | dibenzo[f,h]quinoxaline | 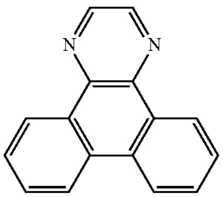 [SMILES: c1ccc2c(c1)c1ccccc1c1nccnc21] |

TABLE 1-continued
| Number | Chemical Name | Structure |
|---|---|---|
| A42 | dipyrazino[2,3-f:2'3'-h]quinoxaline | 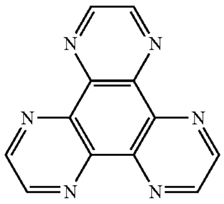 [SMILES: c1cnc2c(n1)c1nccnc1c1nccnc21] |
| A43 | 1,3,3a',4,6,7,9-heptaazaphenalene | 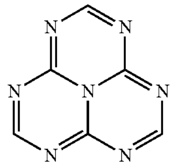 |
| A44 | 9H-thioxanthen-9-one 10,10-dioxide | 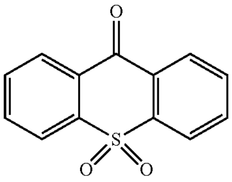 [SMILES: O=C1c2ccccc2S(=O)(=O)c2ccccc21] |
| A45 | 10,10-dimethylanthracen-9(10H)-one | 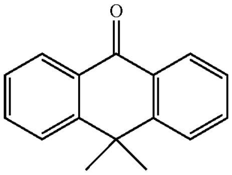 [SMILES: CC1(C)c2ccccc2C(=O)c2ccccc21] |
| A46 | anthracene-9,10-dione | 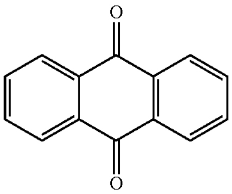 [SMILES: O=C1c2ccccc2C(=O)c2ccccc21] |
| A47 | 5H-cyclopenta[1,2-bis:5,4-b']dipyridine | 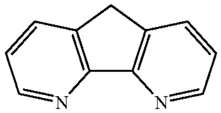 [SMILES: c1cnc2c(c1)Cc1cccnc1-2] |
| A48 | benzo[4,5]thieno[2,3-b]pyridine | 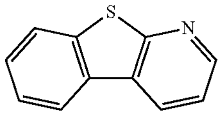 [SMILES: c1ccc2c(c1)sc1ncccc12] |
| A49 | thieno[2,3-b;5,4-b']dipyridine | 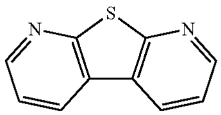 [SMILES: c1cnc2sc3ncccc3c2c1] |
| A50 | dibenzo[b,c]thiophene 5,5-dioxide | 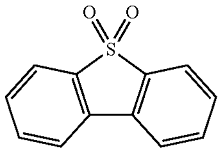 [SMILES: O=S1(=O)c2ccccc2-c2ccccc21] |

TABLE 1-continued
| Number | Chemical Name | Structure |
|---|---|---|
| A51 | furo[2,3-b;5,4-b']dipyridine | 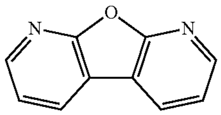 |
| A52 | benzofuro[2,3-b]pyridine | 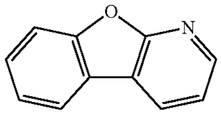 [SMILES: c1ccc2c(c1)oc1ncccc12] |
| A53 | 9H-fluorene-2,7-dicarbonitrile | 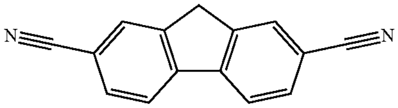 [SMILES: N#Cc1ccc2c(c1)Cc1cc(C#N)ccc1-2] |
| A54 | 2,4,6-triphenyl-1,3,5-triazine | 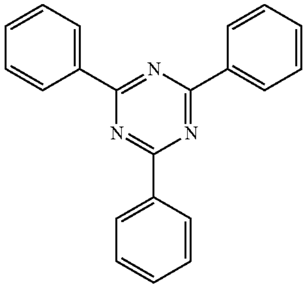 [SMILES: c1ccc(-c2nc(-c3ccccc3)nc(-c3ccccc3)n2)cc1] |
| A55 | pyrazine-2,3-dicarbonitrile | 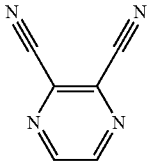 |
| A56 | pyrimidine | 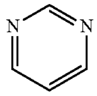 |
| A57 | 2-phenylpyrimidine | 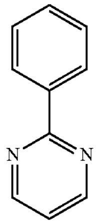 |
| A58 | 2-phenylpyrazine | 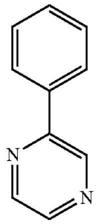 |

TABLE 1-continued
| Number | Chemical Name | Structure |
| --- | --- | --- |
| A59 | 3-phenylpyridine | 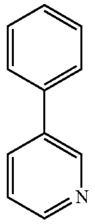 |
| A60 | 2-phenylpyridine | 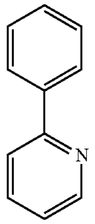 [SMILES: c1ccc(-c2ccccn2)cc1] |
| A61 | 4-phenylpyrimidine | 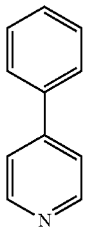 [SMILES: c1ccc(-c2ccncc2)cc1] |
| A62 | 2,2'-bipyridine | 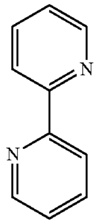 |
| A63 | 2-phenyl-1,3,5-triazine | 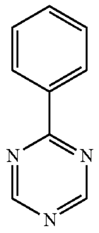 |
| A64 | 5-phenyl-1,2,4-oxadiazole | 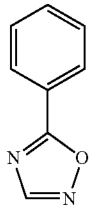 |
| A65 | 2-methylpyrimidine | 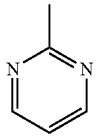 |

TABLE 1-continued
| Number | Chemical Name | Structure |
|---|---|---|
| A66 | pyridine-3,5-dicarbonitrile | 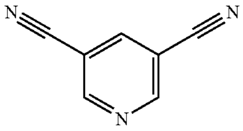 |
| A67 | dibenzo[f,h]quinoxaline-2,3-dicarbonitrile | 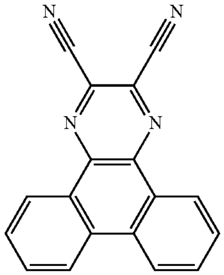 [SMILES: N#Cc1nc2c3ccccc3c3ccccc3c2nc1C#N] |
| A68 | 1,3-bis(phenylsulfonyl)benzene | 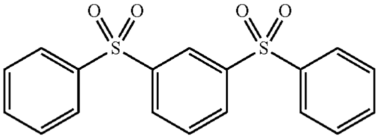 [SMILES: O=S(=O)(c1ccccc1)c1cccc(S(=O)(=O)c2ccccc2)c1] |
| A69 | 1,4-bis(phenylsulfonyl)benzene | 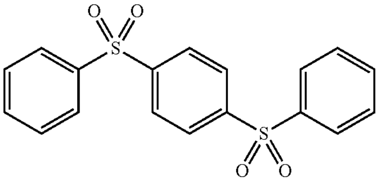 [SMILES: O=S(=O)(c1ccccc1)c1ccc(S(=O)(=O)c2ccccc2)cc1] |
| A70 | 9,9-dimethyl-9H-thioxanthene 10,10-dioxide | 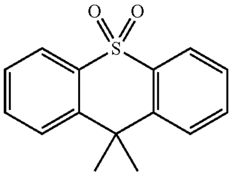 [SMILES: CC1(C)c2ccccc2S(=O)(=O)c2ccccc21] |
| A71 | thianthrene 5,5,10,10-tetraoxide | 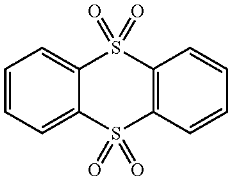 [SMILES: O=S1(=O)c2ccccc2S(=O)(=O)c2ccccc21] |
| A72 | tris(2,6-dimethylphenyl)borane | 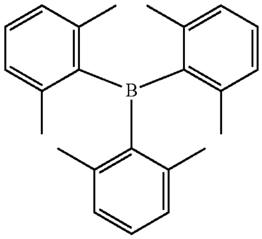 [SMILES: Cc1cccc(C)c1B(c1c(C)cccc1C)c1c(C)cccc1C] |
| A73 | triazine | 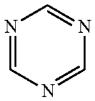 |

TABLE 1-continued
| Number | Chemical Name | Structure |
|---|---|---|
| A74 | pyridine | 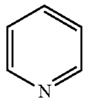 |
| A75 | pyridazine | 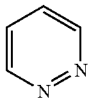 |
| A76 | pyrimidine | 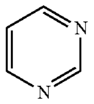 |
| A77 | isoquinoline | 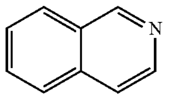 |
| A78 | 1,8-naphthyridine | 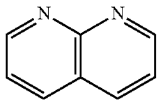 |
| A79 | 1,7-naphthyridine | 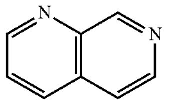 |
| A80 | quinazoline | 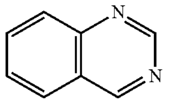 |
| A81 | pyrido[2,3-d]pyridazine | 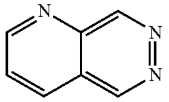 |
| A82 | pyrido[3,4-b]pyrazine | 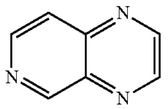 |
| A83 | 1,5-naphthyridine | 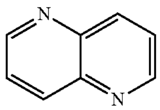 |
| A84 | oxazole | 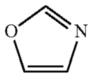 |
| A85 | thiazole | 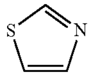 |
| A86 | isoxazole | 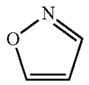 |
| A87 | 1H-tetrazole | 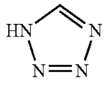 |

TABLE 1-continued

| Number | Chemical Name | Structure |
| --- | --- | --- |
| A88 | 1-phenyl-1H-tetrazole | 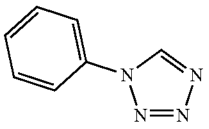 [SMILES: c1ccc(-n2cnnn2)cc1] |
| A89 | 1,2,4-oxadiazole | 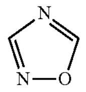 |
| A90 | 2,4-diphenyl-1,3,5-triazine | 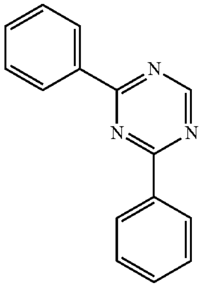 [SMILES: c1ccc(-c2ncnc(-c3ccccc3)n2)cc1] |
| A91 | 1,2,4-thiadiazole | 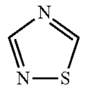 |
| A92 | 3,5-diphenyl-4H-1,2,4-triazole | 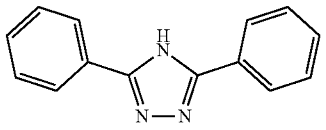 [SMILES: c1ccc(-c2nnc(-c3ccccc3)[nH]2)cc1] |

In some embodiments, the acceptor moiety is commercially available. In some embodiments, the acceptor moiety is prepared using methods known to one of ordinary skill in the art. See Im, Y., et al., *Chemistry of Materials* 29:1946-1963 (2017).

Donor Moiety

In some embodiments, the donor moiety is, for each occurrence independently, a monocyclic or fused polycyclic aryl or heteroaryl comprising between 5 and 20 atoms, optionally substituted with one or more substituents. In some embodiments, each donor moiety is covalently attached to at least one functional group. In some embodiments, each donor moiety is covalently attached to at least one $-CO_2H$. In some embodiments, each donor moiety is covalently attached to at least one acceptor moiety.

In some embodiments, each donor moiety (D) is a carbazole, benzofurocarbazole, thienocarbazole, indolocarbazole, bicarbazole, amine, diamine, acridan, phenoxazine, phenothiazine, or phenazine, optionally substituted with one or more substituents.

In some embodiments, the donor moiety (D) comprises a radical of a compound of formula XVIII:

(XVIII)

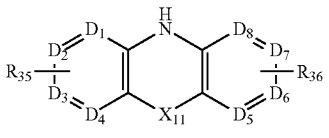

wherein:

$D_1$ to $D_8$ independently comprise C or N;

$X_{11}$ is selected from the group consisting of O, S, $NR_{37}$, $CR_{38}R_{39}$, and $SR_{40}R_{41}$;

$R_{35}$ and $R_{36}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $-SO_2H$, $-NO_2$, $-CN$, halogen, cycloalkyl, or $C_{6-18}$ haloaryl; and $R_{37}$, $R_{38}$, $R_{39}$, $R_{40}$, and $R_{41}$ are each independently hydrogen, $C_{1-10}$ alkyl, $C_{6-18}$ aryl, or heteroaryl.

In some embodiments, the donor moiety (D) comprises a radical of a compound of formula XIX:

(XIX)

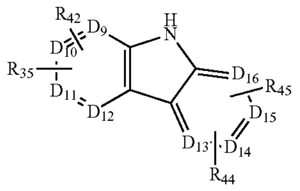

wherein:

$D_9$ to $D_{16}$ independently comprise C or N;

$R_{42}$ to $R_{45}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, $-SO_2H$, $-NO_2$, $-CN$, halogen, cycloalkyl, or $C_{6-18}$ haloaryl.

In some embodiments, the donor moiety (D) comprises a radical of a compound of formula XX:

(XX)

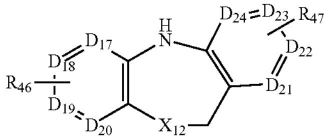

wherein:

$D_{17}$ to $D_{24}$ independently comprise C or N;

$X_{12}$ is selected from the group consisting of O, S, $NR_{48}$, $CR_{49}R_{50}$, and $SR_{51}R_{52}$;

$R_{46}$ and $R_{47}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{48}$, $R_{49}$, $R_{50}$, $R_{51}$, and $R_{52}$ are each independently hydrogen, $C_{1-10}$ alkyl, $C_{6-18}$ aryl, or heteroaryl.

In some embodiments, the donor moiety (D) comprises a radical of a compound of (XXI)

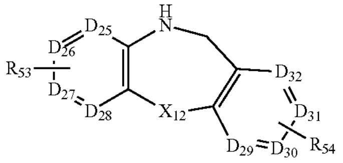

wherein:

$D_{25}$ to $D_{32}$ independently comprise C or N;

$X_{12}$ is selected from the group consisting of O, S, $NR_{55}$, $CR_{56}R_{57}$, and $SR_{58}R_{59}$;

$R_{53}$ and $R_{54}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{55}$, $R_{56}$, $R_{57}$, $R_{58}$, and $R_{59}$ are each independently hydrogen, $C_{1-10}$ alkyl, $C_{6-18}$ aryl, or heteroaryl.

In some embodiments, the donor moiety (D) comprises a radical of a compound of formula XXII:

(XXII)

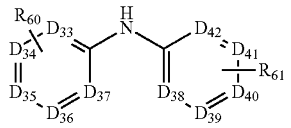

wherein:

$D_{33}$ to $D_{42}$ independently comprise C or N; and $R_{60}$ and $R_{61}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

In some embodiments, each donor moiety is radical of a compound selected from TABLE 2, wherein the donor moiety can be optionally substituted.

TABLE 2

| Number | Chemical Name | Structure |
|---|---|---|
| D1 | 9H-carbazole | 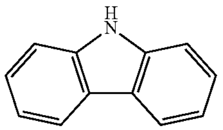 [SMILES: c1ccc2c(c1)[nH]c1ccccc12] |
| D2 | 3,6-dimethyl-9H-carbazole | 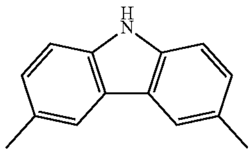 |
| D3 | 3,6-di-tert-butyl-9H-carbazole | 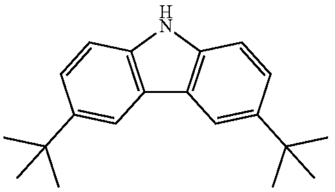 [SMILES: CC(C)(C)c1ccc2[nH]c3ccc(C(C)(C)C)cc3c2c1] |
| D4 | 3,6-dimethoxy-9H-carbazole | 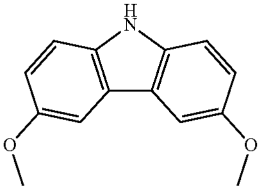 [SMILES: COc1ccc2[nH]c3ccc(OC)cc3c2c1] |

TABLE 2-continued
| Number | Chemical Name | Structure |
|---|---|---|
| D5 | 1,3,6,8-tetramethyl-9H-carbazole | 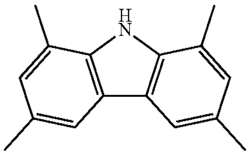 |
| D6 | 5H-benzofuro[3,4-c]carbazole | 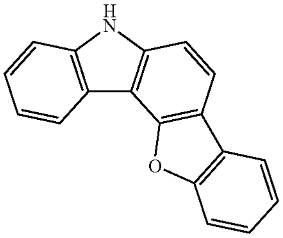 [SMILES: c1ccc2c(c1)[nH]c1ccc3c4ccccc4oc3c12] |
| D7 | 5H-benzo[4,5]thieno[3,2-c]carbazole | 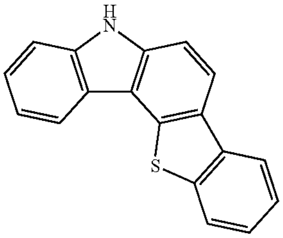 [SMILES: c1ccc2c(c1)[nH]c1ccc3c4ccccc4sc3c12] |
| D8 | 12-phenyl-5,12-dihydroindolo[3,2-a]carbazole | 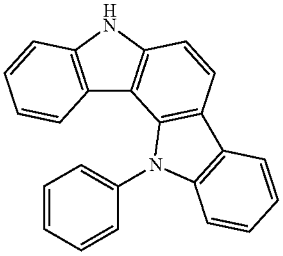 [SMILES: c1ccc(-n2c3ccccc3c3ccc4[nH]c5ccccc5c4c32)cc1] |
| D9 | 11-phenyl-11,12-dihydroindolo[2,3-a]carbazole | 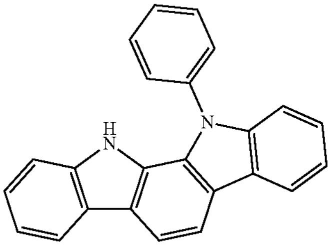 [SMILES: c1ccc(-n2c3ccccc3c3ccc4c5ccccc5[nH]c4c32)cc1] |
| D10 | 9-phenyl-9H,9'H-3,3'-bicarbazole | 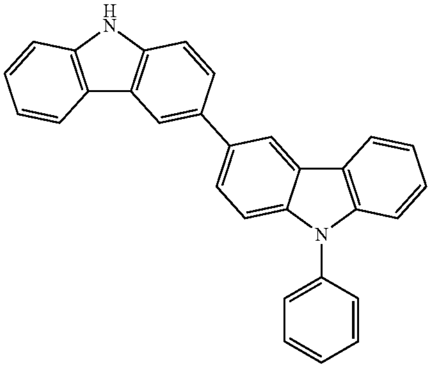 [SMILES: c1ccc(-n2c3ccccc3c3cc(-c4ccc5[nH]c6ccccc6c5c4)ccc32)cc1] |

TABLE 2-continued
| Number | Chemical Name | Structure |
| --- | --- | --- |
| D11 | 9H-3,9'-bicarbazole | 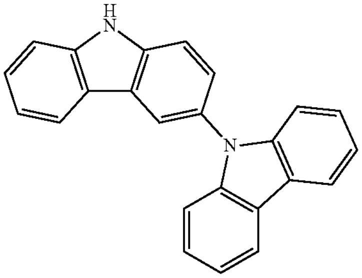 [SMILES: c1ccc2c(c1)[nH]c1ccc(-n3c4ccccc4c4ccccc43)cc12] |
| D12 | 9'H-9,3':6',9''-tercarbazole | 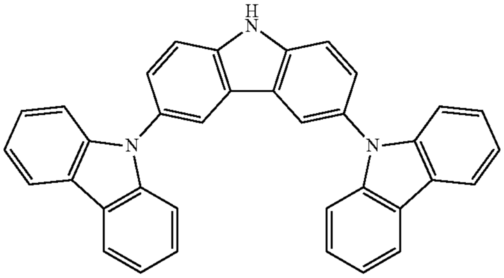 [SMILES: c1ccc2c(c1)c1ccccc1n2-c1ccc2[nH]c3ccc(-n4c5ccccc5c5ccccc54)cc3c2c1] |
| D13 | N,N-diphenyl-9H-carbazol-3-amine | 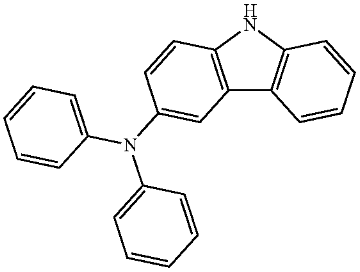 [SMILES: c1ccc(N(c2ccccc2)c2ccc3[nH]c4ccccc4c3c2)cc1] |
| D14 | $N^3,N^3,N^6,N^6$-tetraphenyl-9H-carbazole-3,6-diamine | 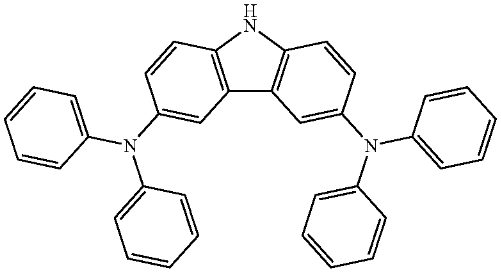 [SMILES: c1ccc(N(c2ccccc2)c2ccc3[nH]c4ccc(N(c5ccccc5)c5ccccc5)cc4c3c2)cc1] |
| D15 | 9H,9'H-2,3'-bicarbazole | 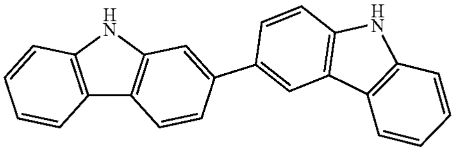 [SMILES: c1ccc2c(c1)[nH]c1cc(-c3ccc4[nH]c5ccccc5c4c3)ccc12] |
| D16 | 9H,9'H,3,3'-bicarbazole | 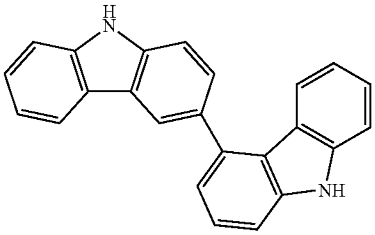 [SMILES: c1ccc2c(c1)[nH]c1ccc(-c3cccc4[nH]c5ccccc5c34)cc12] |

TABLE 2-continued
| Number | Chemical Name | Structure |
|---|---|---|
| D17 | 9H,9'H,3,4'-bicarbazole | 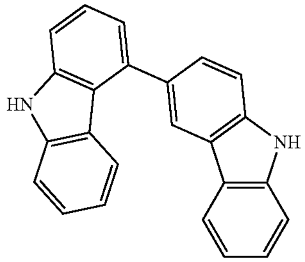 [SMILES: c1ccc2c(c1)[nH]c1ccc(-c3cccc4[nH]c5ccccc5c34)cc12] |
| D18 | 10H-phenoxazine | 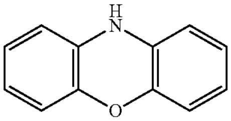 [SMILES: c1ccc2c(c1)Nc1ccccc1O2] |
| D19 | 5,10-dihydrophenazine | 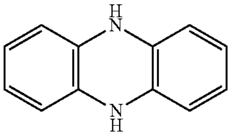 [SMILES: c1ccc2c(c1)Nc1ccccc1N2] |
| D20 | 10H-phenothiazine | 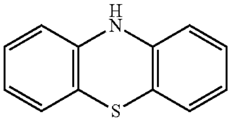 [SMILES: c1ccc2c(c1)Nc1ccccc1S2] |
| D21 | 9,9-dimethyl-9,10-dihydroacridine | 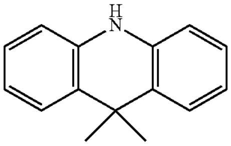 [SMILES: CC1(C)c2ccccc2Nc2ccccc21] |
| D22 | diphenylamine | 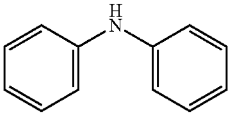 [SMILES: c1ccc(Nc2ccccc2)cc1] |
| D23 | bis(4-(tert-butyl)phenyl-amine | 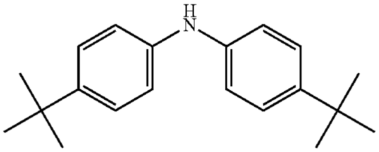 [SMILES: CC(C)(C)c1ccc(Nc2ccc(C(C)(C)C)cc2)cc1] |
| D24 | N1-(4-(diphenylamino)phenyl)-N4,N4-diphenylbenzene-1,4-diamine | 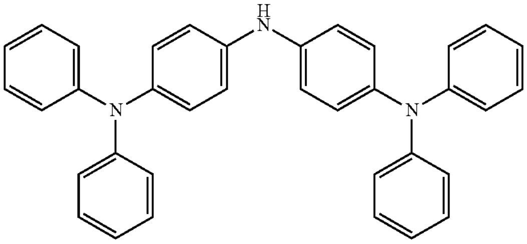 [SMILES: c1ccc(N(c2ccccc2)c2ccc(Nc3ccc(N(c4ccccc4)c4ccccc4)cc3)cc2)cc1] |

TABLE 2-continued
| Number | Chemical Name | Structure |
| --- | --- | --- |
| D25 | 9,9-dimethyl-N2,N2,N7,N7-tetraphenyl-9,10-dihydroacridine-2,7-diamine | 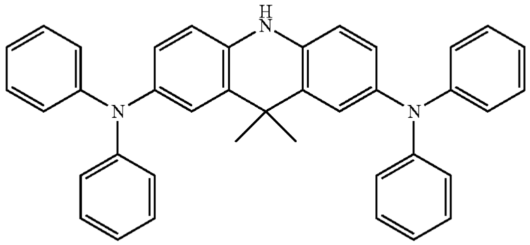 [SMILES: CC1(C)c2cc(N(c3ccccc3)c3ccccc3)ccc2Nc2ccc(N(c3ccccc3)c3ccccc3)cc21] |
| D26 | 7,7,13,13-tetramethyl-7,13-dihydro-5H-indolo[2,3-c]acridine | 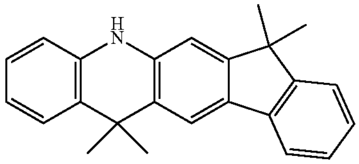 [SMILES: CC1(C)c2ccccc2Nc2cc3c(cc21)-c1ccccc1C3(C)C] |
| D27 | 8,8-dimethyl-5-phenyl-8,13-dihydor-5H-indolo[2,3-c]acridine | 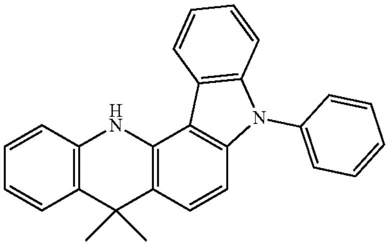 [SMILES: CC1(C)c2ccccc2Nc2c1ccc1c2c2ccccc2n1-c1ccccc1] |
| D28 | 13,13-dimethyl-11-phenyl-11,13-dihydro-5H-indolo[2,3-b]acridine | 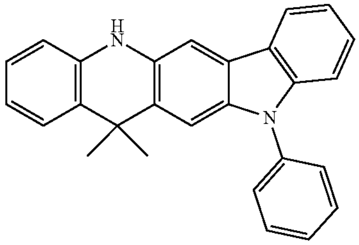 [SMILES: CC1(C)c2ccccc2Nc2cc3c4ccccc4n(-c4ccccc4)c3cc21] |
| D29 | 10,10-diphenyl-5,10-dihydrobenzo[b,e][1,4]azasiline | 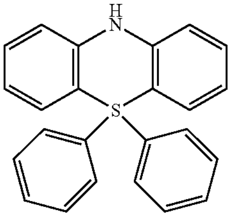 [SMILES: c1ccc(S2(c3ccccc3)c3ccccc3Nc3ccccc32)cc1] |
| D30 | 10,11-dihydro-5H-dibenzo[b,f]azepine | 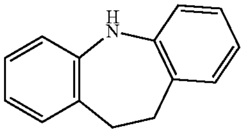 [SMILES: c1ccc2c(c1)CCc1ccccc1N2] |
| D31 | 3,7-di(9H-carbazol-9-yl)-10H-phenoxazine | 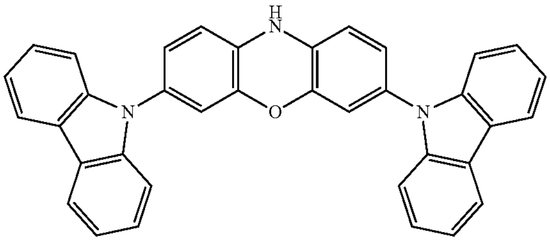 [SMILES: c1ccc2c(c1)c1ccccc1n2-c1ccc2c(c1)Oc1cc(-n3c4ccccc4c4ccccc43)ccc1N2] |

TABLE 2-continued
| Number | Chemical Name | Structure |
|---|---|---|
| D32 | 2,7-di(9H-carbazol-9-yl)-9,9-dimethyl-9,10-dihydroacridine | 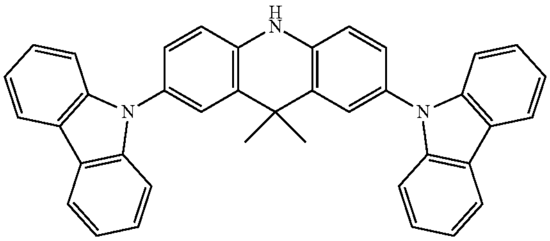 [SMILES: CC1(C)c2cc(-n3c4ccccc4c4ccccc43)ccc2Nc2ccc(-n3c4ccccc4c4ccccc43)cc21] |
| D33 | 9,9,9',9',9'',9''-hexamethyl-9',10'-dihydro-9H,9''H-10,2';:7',10''-teracridine | 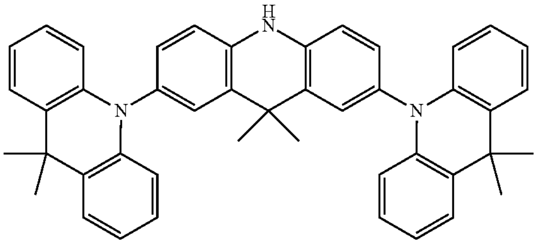 |
| D34 | 10'H-10,3':7',10''-terphenoxazine | 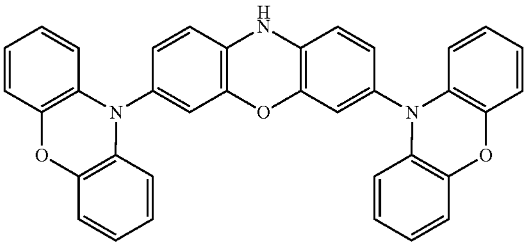 [SMILES: c1ccc2c(c1)Oc1ccccc1N2c1ccc2c(c1)Oc1cc(N3c4ccccc4Oc4ccccc43)ccc1N2] |
| D35 | 3-(9H-carbazol-9-yl)-10H-phenoxazine | 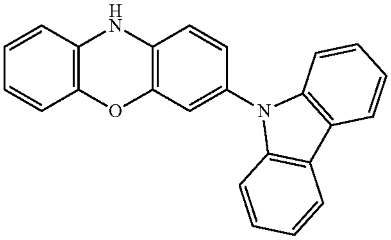 [SMILES: c1ccc2c(c1)Nc1ccc(-n3c4ccccc4c4ccccc43)cc1O2] |
| D36 | 3-(9H-carbazol-9-yl)-10H-phenothiazine | 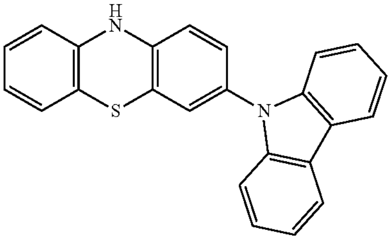 [SMILES: c1ccc2c(c1)Nc1ccc(-n3c4ccccc4c4ccccc43)cc1S2] |
| D37 | 2-(9H-carbazol-9-yl)-9,9-dimethyl-9,10-dihydroacridine | 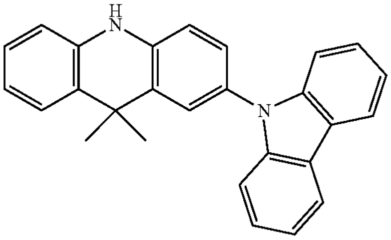 [SMILES: CC1(C)c2ccccc2Nc2ccc(-n3c4ccccc4c4ccccc43)cc21] |

TABLE 2-continued
| Number | Chemical Name | Structure |
| --- | --- | --- |
| D38 | 9,9,9',9'-tetramethyl-9,10-dihydro-9'H-2,10'-biacridine | 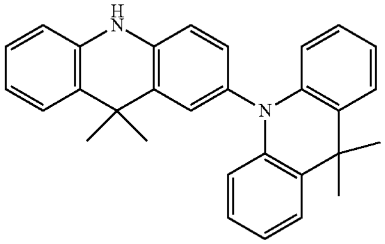 [SMILES: CC1(C)c2ccccc2Nc2ccc(N3c4ccccc4C(C)(C)c4ccccc43)cc21] |
| D39 | N,N-diphenyl-10H-phenoxazin-3-amine | 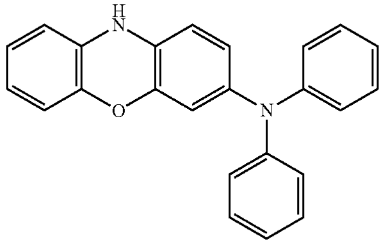 [SMILES: c1ccc(N(c2ccccc2)c2ccc3c(c2)Oc2ccccc2N3)cc1] |
| D40 | N,N-diphenyl-10H-phenthiazin-3-amine | 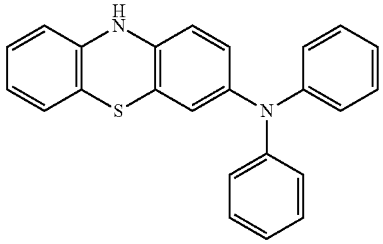 [SMILES: c1ccc(N(c2ccccc2)c2ccc3c(c2)Sc2ccccc2N3)cc1] |
| D41 | 9,9-dimethyl-N,N-diphenyl-9,10-dihydroacridin-2-amine | 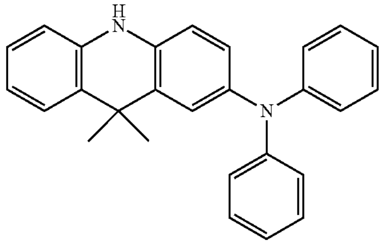 [SMILES: CC1(C)c2ccccc2Nc2ccc(N(c3ccccc3)c3ccccc3)cc21] |
| D42 | 10H-3,10'-biphenoxazine | 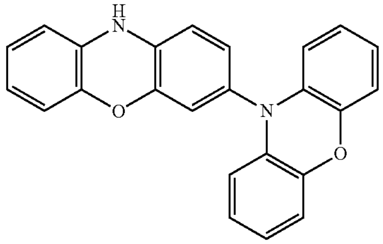 |
| D43 | 8-(9H-carbazol-9-yl)-5H-pyrido[4,3-b]indole | 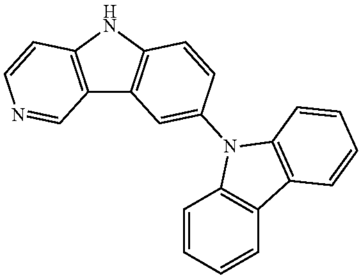 |

TABLE 2-continued

| Number | Chemical Name | Structure |
|---|---|---|
| D44 | N,N-diphenyl-5H-pyrido[4,3-b]indol-8-amine | 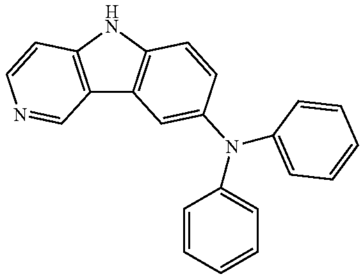 [SMILES: c1ccc(N(c2ccccc2)c2ccc3[nH]c4ccncc4c3c2)cc1] |
| D45 | N,N-diphenyl-9H-pyrido[3,4-b]indol-6-amine | 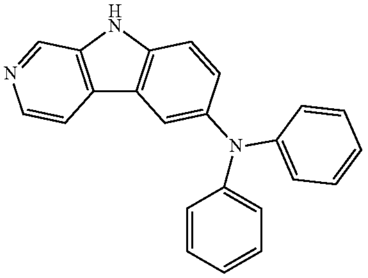 [SMILES: c1ccc(N(c2ccccc2)c2ccc3[nH]c4cnccc4c3c2)cc1] |
| D46 | N,N-diphenyl-9H-pyrido[2,3-b]indol-6-amine | 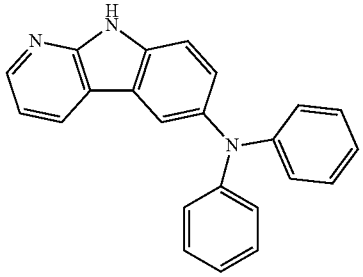 [SMILES: c1ccc(N(c2ccccc2)c2ccc3[nH]c4ncccc4c3c2)cc1] |
| D47 | 3,6-divinyl-9H-pyrido[2,3-b]indole | 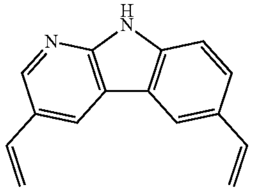 [SMILES: C=Cc1ccc2[nH]c3ncc(C=C)cc3c2c1] |

In some embodiments, the donor moiety is commercially available. In some embodiments, the donor moiety is prepared using methods known to one of ordinary skill in the art. See Im, Y., et al., *Chemistry of Materials* 29:1946-1963 (2017).

Donor-Acceptor Ligand

In some embodiments, the donor-acceptor ligand comprises at least one functional group (FG) that can bind to a nanocrystal surface.

In some embodiments, the donor-acceptor ligand has at least one functional group (FG) attached to the terminal end of the donor-acceptor ligand. In some embodiments, the at least one functional group is —OH, —SH, —$NH_2$, —$CO_2H$, —$P(O)(OH)_2$, —P(O)OH, or —$SO_3H$. In some embodiments, the at least one functional group is —$CO_2H$.

In some embodiments, the donor-acceptor ligand has the structure of formula I:

$$D_d\text{-}A_a\text{-}FG_f \qquad \text{(I)}$$

wherein:

FG is —OH, —SH, —$NH_2$, —$CO_2H$, —$P(O)(OH)_2$, —P(O)OH, or —$SO_3H$;

D is a donor moiety comprising for each occurrence independently, a monocyclic or fused polycyclic aryl or heteroaryl comprising between 5 and 20 atoms, optionally substituted with one or more substituents;

A is an acceptor moiety comprising a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4.

In some embodiments, the donor-acceptor ligand has the structure of formula II:

$$A_a\text{-}D_d\text{-}FG_f \qquad \text{(II)}$$

wherein:

FG is —OH, —SH, —$NH_2$, —$CO_2H$, —$P(O)(OH)_2$, —P(O)OH, or —$SO_3H$;

A is an acceptor moiety comprising for each occurrence independently, a monocyclic or fused polycyclic aryl or heteroaryl comprising between 5 and 20 atoms, optionally substituted with one or more substituents;

D is a donor moiety comprising a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4.

In some embodiments, wherein FG is —$CO_2H$ in formula I, the donor-acceptor ligand has the structure of formula III:

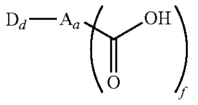

(III)

wherein:

D is a donor moiety comprising for each occurrence independently, a monocyclic or fused polycyclic aryl or heteroaryl comprising between 5 and 20 atoms, optionally substituted with one or more substituents;

A is an acceptor moiety comprising a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4.

In some embodiments, wherein FG is —$CO_2H$ in formula I, the donor-acceptor ligand has the structure of formula IV:

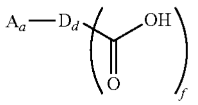

(IV)

wherein:

A is an acceptor moiety comprising for each occurrence independently, a monocyclic or fused polycyclic aryl or heteroaryl comprising between 5 and 20 atoms, optionally substituted with one or more substituents;

D is a donor moiety comprising a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4.

In some embodiments, the donor-acceptor ligand has the structure of formula I or formula II:

$D_d$-$A_a$-$FG_f$ (I) or $A_a$-$D_d$-$FG_f$ (II)

wherein:

FG is —OH, —SH, —$NH_2$, —$CO_2H$, —$P(O)(OH)_2$, —P(O)OH, or —$SO_3H$;

A is an acceptor moiety comprising a radical of:

(i) a compound of formula V:

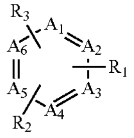

(V)

wherein:

$A_1$ to $A_6$ independently comprise C or N, and at least one of $A_1$ to $A_6$ is N; and $R_1$, $R_2$, and $R_3$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ii) a compound of formula IX:

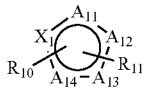

(IX)

wherein:

$A_{11}$ to $A_{14}$ independently comprise C or N, wherein at least one of $A_{11}$ to $A_{14}$ is N;

$X_1$ is O, S, or $NR_{12}$;

$R_{10}$ and $R_{11}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{12}$ is hydrogen, $C_{1-10}$ alkyl, $C_{6-18}$ aryl, or heteroaryl; or (iii) a compound of formula X:

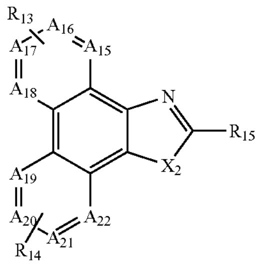

(X)

wherein:

$A_{15}$ to $A_{22}$ independently comprise C or N;

$X_2$ is O or S; and $R_{13}$, $R_{14}$, and $R_{15}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iv) a compound of formula XI:

(XI)

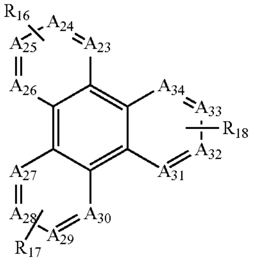

wherein:

$A_{23}$ to $A_{34}$ independently comprise C or N; and $R_{16}$, $R_{17}$, and $R_{18}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (v) a compound of formula XII:

(XII)

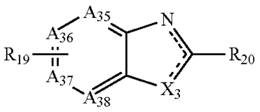

wherein:

$A_{35}$ to $A_{38}$ independently comprise C or N;

$X_3$ is O, S, or $NR_{21}$; $R_{19}$ and $R_{20}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{21}$ is hydrogen, $C_{1-10}$ alkyl, $C_{6-18}$ aryl, or heteroaryl; or (vi) a compound of formula XIII:

(XIII)

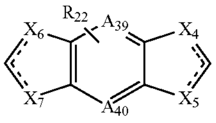

wherein:

$A_{39}$ and $A_{40}$ independently comprise C or N;

$X_4$ to $X_7$ independently comprise C, O, S, or $NR_{23}$, wherein at least one of $X_4$ to $X_7$ is $NR_{23}$;

$R_{22}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{23}$ is hydrogen, $C_{1-10}$ alkyl, $C_{6-18}$ aryl, or heteroaryl; or (vii) a compound of formula XIV:

(XIV)

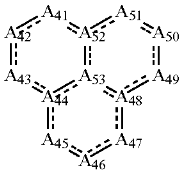

wherein:

$A_{41}$ to $A_{53}$ independently comprise C or N.

(viii) a compound of formula XV:

(XV)

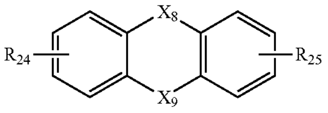

wherein:

$X_8$ is C(O) or $S(O)_2$;

$X_9$ is $CR_{26}R_{27}$, C(O), or $S(O)_2$;

$R_{24}$ and $R_{25}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{26}$ and $R_{27}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ix) a compound of formula XVI:

(XVI)

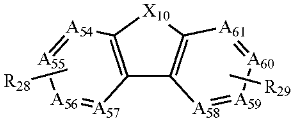

wherein:

$A_{54}$ to $A_{61}$ independently comprise C or N;

$X_{10}$ is $CR_{30}R_{31}$, S, O, or $S(O)_2$;

$R_{28}$ and $R_{29}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{30}$ and $R_{31}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (x) a compound of formula XVII:

(XVII)

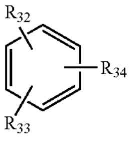

wherein:

$R_{32}$ is —$SO_2$—($C_{6\text{-}18}$ aryl), —CN, —C(O)—($C_{6\text{-}18}$ aryl), —C(O)—($C_{6\text{-}18}$ aryl)-C(O)—($C_{6\text{-}18}$ aryl), —$SO_2$—($C_{6\text{-}18}$ aryl)-$SO_2$—($C_{6\text{-}18}$ aryl), or —B—($C_{6\text{-}18}$ aryl)$_2$;

$R_{33}$ is hydrogen, $C_{1\text{-}10}$ alkyl, $C_{2\text{-}10}$ alkenyl, $C_{2\text{-}10}$ alkynyl, $C_{6\text{-}18}$ aryl, heteroaryl, $C_{1\text{-}10}$ alkoxy, $C_{1\text{-}10}$ haloalkyl, C(O)$C_{1\text{-}3}$ haloalkyl, —$SO_2$H, —$NO_2$, —CN, halogen, cycloalkyl, or $C_{6\text{-}18}$ haloaryl; and $R_{34}$ is hydrogen, $C_{1\text{-}10}$ alkyl, $C_{2\text{-}10}$ alkenyl, $C_{2\text{-}10}$ alkynyl, $C_{6\text{-}18}$ aryl, heteroaryl, $C_{1\text{-}10}$ alkoxy, $C_{1\text{-}10}$ haloalkyl, C(O)$C_{1\text{-}3}$ haloalkyl, —$SO_2$H, —$NO_2$, —CN, halogen, cycloalkyl, or $C_{6\text{-}18}$ haloaryl;

D is a donor moiety comprising a radical of:

(i') a compound of formula XVIII:

(XVIII)

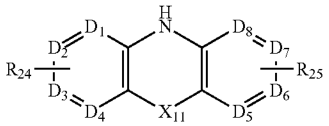

wherein:

$D_1$ to $D_8$ independently comprise C or N;

$X_{11}$ is selected from the group consisting of O, S, $NR_{37}$, $CR_{38}R_{39}$, and $SR_{40}R_{41}$;

$R_{35}$ and $R_{36}$ are each independently hydrogen, $C_{1\text{-}10}$ alkyl, $C_{2\text{-}10}$ alkenyl, $C_{2\text{-}10}$ alkynyl, $C_{6\text{-}18}$ aryl, heteroaryl, $C_{1\text{-}10}$ alkoxy, $C_{1\text{-}10}$ haloalkyl, C(O)$C_{1\text{-}3}$ haloalkyl, —$SO_2$H, —$NO_2$, —CN, halogen, cycloalkyl, or $C_{6\text{-}18}$ haloaryl; and $R_{37}$, $R_{38}$, $R_{39}$, $R_{40}$, and $R_{41}$ are each independently hydrogen, $C_{1\text{-}10}$ alkyl, $C_{6\text{-}18}$ aryl, or heteroaryl; or (ii') a compound of formula XIX:

(XIX)

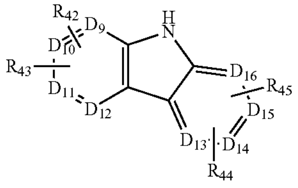

wherein:

$D_9$ to $D_{16}$ independently comprise C or N; and $R_{42}$ to $R_{45}$ are each independently hydrogen, $C_{1\text{-}10}$ alkyl, $C_{2\text{-}10}$ alkenyl, $C_{2\text{-}10}$ alkynyl, $C_{6\text{-}18}$ aryl, heteroaryl, $C_{1\text{-}10}$ alkoxy, $C_{1\text{-}10}$ haloalkyl, C(O)$C_{1\text{-}3}$ haloalkyl, —$SO_2$H, —$NO_2$, —CN, halogen, cycloalkyl, or $C_{6\text{-}18}$ haloaryl; or (iii') a compound of formula XX:

(XX)

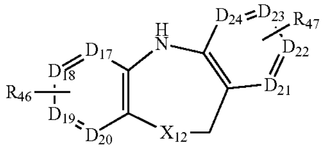

wherein:

$D_{17}$ to $D_{24}$ independently comprise C or N;

$X_{12}$ is selected from the group consisting of O, S, $NR_{48}$, $CR_{49}R_{50}$, and $SR_{51}R_{52}$;

$R_{46}$ and $R_{47}$ are each independently hydrogen, $C_{1\text{-}10}$ alkyl, $C_{2\text{-}10}$ alkenyl, $C_{2\text{-}10}$ alkynyl, $C_{6\text{-}18}$ aryl, heteroaryl, $C_{1\text{-}10}$ alkoxy, $C_{1\text{-}10}$ haloalkyl, C(O)$C_{1\text{-}3}$ haloalkyl, —$SO_2$H, —$NO_2$, —CN, halogen, cycloalkyl, or $C_{6\text{-}18}$ haloaryl; and $R_{48}$, $R_{49}$, $R_{50}$, $R_{51}$, and $R_{52}$ are each independently hydrogen, $C_{1\text{-}10}$ alkyl, $C_{6\text{-}18}$ aryl, or heteroaryl; or (iv') a compound of formula XXI:

(XXI)

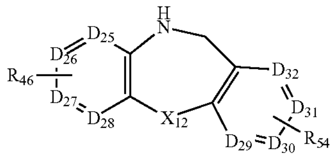

wherein:

$D_{25}$ to $D_{32}$ independently comprise C or N;

$X_{12}$ is selected from the group consisting of O, S, $NR_{55}$, $CR_{56}R_{57}$, and $SR_{58}R_{59}$;

$R_{53}$ and $R_{54}$ are each independently hydrogen, $C_{1\text{-}10}$ alkyl, $C_{2\text{-}10}$ alkenyl, $C_{2\text{-}10}$ alkynyl, $C_{6\text{-}18}$ aryl, heteroaryl, $C_{1\text{-}10}$ alkoxy, $C_{1\text{-}10}$ haloalkyl, C(O)$C_{1\text{-}3}$ haloalkyl, —$SO_2$H, —$NO_2$, —CN, halogen, cycloalkyl, or $C_{6\text{-}18}$ haloaryl; and $R_{55}$, $R_{56}$, $R_{57}$, $R_{58}$, and $R_{59}$ are each independently hydrogen, $C_{1\text{-}10}$ alkyl, $C_{6\text{-}18}$ aryl, or heteroaryl; or (v') a compound of formula XXII:

(XXII)

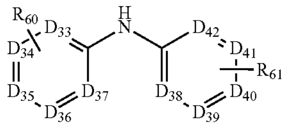

wherein:

$D_{33}$ to $D_{42}$ independently comprise C or N; and $R_{60}$ and $R_{61}$ are each independently hydrogen, $C_{1\text{-}10}$ alkyl, $C_{2\text{-}10}$ alkenyl, $C_{2\text{-}10}$ alkynyl, $C_{6\text{-}18}$ aryl, heteroaryl, $C_{1\text{-}10}$ alkoxy, $C_{1\text{-}10}$ haloalkyl, C(O)$C_{1\text{-}3}$ haloalkyl, —$SO_2$H, —$NO_2$, —CN, halogen, cycloalkyl, or $C_{6\text{-}18}$ haloaryl;

a is an integer between 1 and 4;

d is an integer between 1 and 4; and f is an integer between 1 and 4.

In some embodiments, the donor-acceptor ligand is selected from TABLE 3, wherein the donor moiety can be optionally substituted and the acceptor moiety can be optionally substituted.

TABLE 3
| Number | Acceptor | Donor | FG | a | d | f | Ligand Structure |
|---|---|---|---|---|---|---|---|
| L1 | A56 | D1 | —$CO_2H$ | 1 | 1 | 1 | 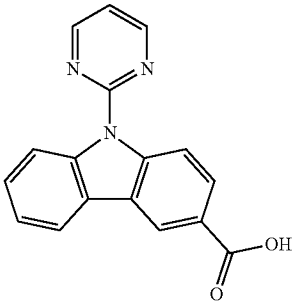 [SMILES: O=C(O)c1ccc2c(c1)c1ccccc1n2-c1ncccn1] |
| L2 | A56 | D1 | —$CO_2H$ | 1 | 1 | 1 | 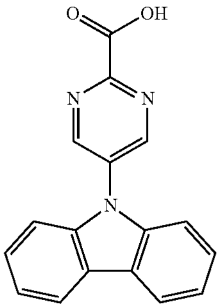 [SMILES: O=C(O)c1ncc(-n2c3ccccc3c3ccccc32)cn1] |
| L3 | A56 | D1 | —$CO_2H$ | 1 | 1 | 1 | 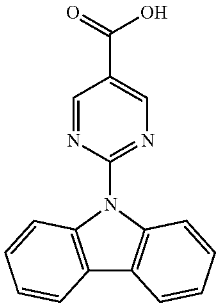 [SMILES: O=C(O)c1cnc(-n2c3ccccc3c3ccccc32)nc1] |
| L4 | A75 | D1 | —$CO_2H$ | 1 | 2 | 1 | 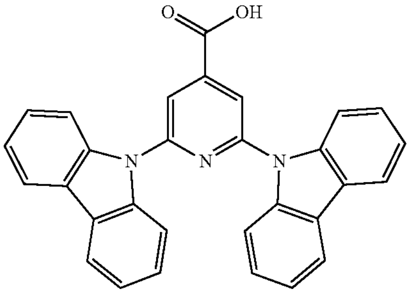 [SMILES: O=C(O)c1cc(-n2c3ccccc3c3ccccc32)nc(-n2c3ccccc3c3ccccc32)c1] |
| L5 | A74 | D1 | —$CO_2H$ | 1 | 2 | 1 | 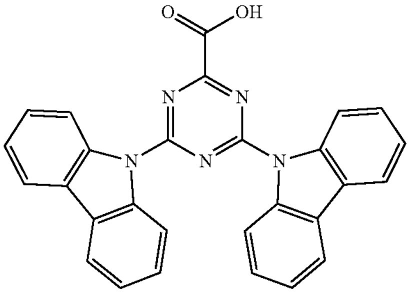 [SMILES: O=C(O)c1nc(-n2c3ccccc3c3ccccc32)nc(-n2c3ccccc3c3ccccc32)n1] |

TABLE 3-continued

| Number | Acceptor | Donor | FG | a | d | f | Ligand Structure |
|---|---|---|---|---|---|---|---|
| L6 | A56 | D47 | —$CO_2H$ | 1 | 1 | 1 | 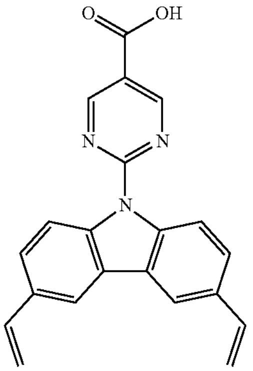 [SMILES: C=Cc1ccc2c(c1)c1cc(C=C)ccc1n2-c1ncc(C(=O)O)cn1] |

Ligand Exchange

In some embodiments, the present invention is directed to a method for exchanging ligands on nanostructures. In some embodiments, a first ligand on a nanostructure dot is exchanged with at least one donor-acceptor ligand. At least one functional group of the donor-acceptor ligand displaces the native hydrophobic ligands of the nanostructure and affords a stable anchoring of the ligand onto the nanocrystal surface. In some embodiments, the nanostructure is a quantum dot. In some embodiments, the at least one donor-acceptor ligand is a bipolar ligand. In some embodiments, the at least one donor-acceptor ligand is a TADF ligand.

In some embodiments, the present disclosure is directed to a method of replacing a first ligand on a nanostructure with a second ligand. In some embodiments, the second ligand is a donor-acceptor ligand. In some embodiments, the nanostructure is a quantum dot.

In some embodiments, the present disclosure is directed to a method of replacing a first ligand on a nanostructure with a second ligand comprising:

admixing a reaction mixture comprising a population of nanostructures having the first ligand bound to the nanostructure and at least one donor-acceptor ligand which is the second ligand, such that the second ligand displaces the first ligand and becomes bound to the nanostructure.

In some embodiments, the admixed reaction mixture is substantially free of solvent. In some embodiments, the admixed reaction mixture is free of a solvent. As used herein, the term “substantially free of solvent” is intended that the admixed reaction mixture contains less than 2% by weight of solvent. In some embodiments, the admixed reaction mixture contains by weight less than 1%, less than 0.5%, or less than 0.1% of a solvent. Solvent ligand replacement may be carried out when the second ligand is a donor-acceptor ligand and wherein the donor-acceptor ligand has a $T_g$ of less than 100° C. and a viscosity of less than about 1000 cSt (see U.S. Pat. No. 9,005,480, which is incorporated herein by reference in its entirety).

In some embodiments, the nanostructure is a quantum dot.

In some embodiments, the first ligand is bound covalently to the nanostructure. In some embodiments, the first ligand is bound non-covalently to the nanostructure.

In some embodiments, the second ligand becomes covalently bound to the nanostructure. In some embodiments, the second ligand becomes non-covalently bound to the nanostructure.

In some embodiments, the admixing is performed at a temperature between about 0° C. and about 200° C., about 0° C. and about 150° C., about 0° C. and about 100° C., about 0° C. and about 80° C., about 20° C. and about 200° C., about 20° C. and about 150° C., about 20° C. and about 100° C. about 20° C. and about 80° C., about 50° C. and about 200° C., about 50° C. and about 150° C., about 50° C. and about 100° C., about 50° C. and about 80° C., about 80° C. and about 200° C., about 80° C. and about 150° C., about 80° C. and about 100° C., about 100° C. and about 200° C., about 100° C. and about 150° C., or about 150° C. and about 200° C. In some embodiments, the admixing is performed at a temperature between about 50° C. and about 100° C. In some embodiments, the admixing is performed at a temperature of about 80° C.

In some embodiments, the admixing is performed over a period of about 1 minute and about 6 hours, about 1 minute and about 2 hours, about 1 minute and about 1 hour, about 1 minute and about 40 minutes, about 1 minute and about 30 minutes, about 1 minute and about 20 minutes, about 1 minute and about 10 minutes, about 10 minutes and about 6 hours, about 10 minutes and about 2 hours, about 10 minutes and about 1 hour, about 10 minutes and about 40 minutes, about 10 minutes and about 30 minutes, about 10 minutes and about 20 minutes, about 20 minutes and about 6 hours, about 20 minutes and about 2 hours, about 20 minutes and about 1 hour, about 20 minutes and about 40 minutes, about 20 minutes and about 30 minutes, about 30 minutes and about 6 hours, about 30 minutes and about 2 hours, about 30 minutes and about 1 hour, about 30 minutes and about 40 minutes, about 40 minutes and about 6 hours, about 40 minutes and about 2 hours, about 40 minutes and about 1 hour, about 1 hour and about 6 hours, about 1 hour and about 2 hours, or about 2 hours and about 6 hours. In some embodiments, the admixing is performed over a period of about 40 minutes and about 2 hours. In some embodiments, the admixing is performed over a period of about 1 hour.

In some embodiments, the reaction mixture further comprises a solvent. In some embodiments, the solvent is selected from the group consisting of chloroform, acetone, butanone, tetrahydrofuran, 2-methyltetrahydrofuran, ethylene glycol monoethyl ether, ethylene glycol monopropyl ether, ethylene glycol monobutyl ether, diethylene glycol diethyl ether, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof. In some embodiments, the solvent is toluene.

The percentage of first ligands displaced by donor-acceptor ligands can be measured by $^{1}H$ NMR or Fourier-transform infrared spectroscopy (FTIR). In some embodiments, the mole percentage of first ligands displaced by the donor-acceptor ligands is between about 20% and about 100%, about 20% and about 80%, about 20% and about 60%, about 20% and about 40%, about 25% and about 100%, about 25% and about 80%, about 25% and about 60%, about 25% and about 40%, about 30% and about 100%, about 30% and about 80%, about 30% and about 60%, about 30% and about 40%, about 40% and about 100%, about 40% and about 80%, about 40% and about 60%, about 60% and about 100%, about 60% and about 80%, or about 80% and about 100%.

The percentage of donor-acceptor ligands that are bound to a nanostructure in a population of nanostructures can be measured by $^{1}H$ NMR, wherein the bound ligands are calculated using: (bound donor-acceptor ligands)/(bound+free donor-acceptor ligands).

In some embodiments, the mole percentage of donor-acceptor ligands bound to a nanostructures is between about 20% and about 100% is between about 20% and about 100%, about 20% and about 80%, about 20% and about 60%, about 20% and about 40%, about 25% and about 100%, about 25% and about 80%, about 25% and about 60%, about 25% and about 40%, about 30% and about 100%, about 30% and about 80%, about 30% and about 60%, about 30% and about 40%, about 40% and about 100%, about 40% and about 80%, about 40% and about 60%, about 60% and about 100%, about 60% and about 80%, or about 80% and about 100%.

Nanostructure Composition

In some embodiments, the present disclosure provides a nanostructure composition comprising:

(a) at least one population of nanostructures; and
(b) at least one donor-acceptor ligand, wherein the donor-acceptor ligand comprises at least one terminal functional group, wherein the at least one terminal functional group is bound to the surface of the nanostructures.

In some embodiments, the nanostructure composition further comprises:

(c) at least one organic resin.

In some embodiments, the present disclosure provides a nanostructure composition comprising:

(a) at least one population of nanostructures; and
(b) at least one donor-acceptor ligand bound to the surface of the nanostructures, the donor-acceptor ligand comprising:
 (i) a donor-acceptor ligand of formula I or formula II:

$D_d$-$A_a$-$FG_f$ (I) or $A_a$-$D_d$-$FG_f$ (II)

wherein:
 FG is —OH, —SH, —$NH_2$, —$CO_2H$, —P(O)$(OH)_2$, —P(O)OH, or —$SO_3H$;
 D is a donor moiety comprising a monocyclic or fused polycyclic aryl or heteroaryl comprising between 5 and 20 atoms, optionally substituted with one or more substituents;
 A is an acceptor moiety comprising for each occurrence independently, a monocyclic or fused polycyclic aryl or heteroaryl comprising between 5 and 20 atoms, optionally substituted with one or more substituents;
 a is an integer between 1 and 4;
 d is an integer between 1 and 4; and
 f is an integer between 1 and 4; or
 (ii) a combination thereof.

In some embodiments, the nanostructure further comprises:

(c) at least one organic resin.

In some embodiments, the present disclosure provides a nanostructure composition comprising:

(a) at least one population of nanostructures, wherein the nanostructures comprise ligands bound to the nanostructures; and
(b) at least one donor-acceptor ligand bound to the surface of the nanostructures, the donor-acceptor ligand comprising:
 (i) a donor-acceptor ligand of formula III or formula IV:

(III)

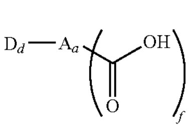

or (IV)

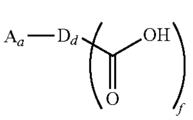

wherein:
 D is a donor moiety comprising for each occurrence independently, a monocyclic or fused polycyclic aryl or heteroaryl comprising between 5 and 20 atoms, optionally substituted with one or more substituents;
 A is an acceptor moiety comprising a monocyclic or fused polycyclic aryl or heteroaryl comprising between 5 and 20 atoms, optionally substituted with one or more substituents;
 a is an integer between 1 and 4;
 d is an integer between 1 and 4; and
 f is an integer between 1 and 4; or
 (ii) a combination thereof.

In some embodiments, the nanostructure further comprises:

(c) at least one organic resin.

In some embodiments, the present disclosure provides a nanostructure composition comprising:

(a) at least one population of nanostructures, wherein the nanostructures comprise ligands bound to the nanostructures; and
(b) at least one donor-acceptor ligand bound to the surface of the nanostructures, wherein the donor-acceptor ligand has the structure of formula I or formula II:

$D_d$-$A_a$-$FG_f$ (I) or $A_a$-$D_d$-$FG_f$ (II)

wherein:
FG is —OH, —SH, —$NH_2$, —$CO_2H$, —P(O)$(OH)_2$, —P(O)OH, or —$SO_3H$;

A is an acceptor moiety comprising a radical of:

(i) a compound of formula V:

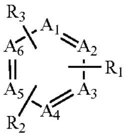

(V)

wherein:

$A_1$ to $A_6$ independently comprise C or N, and at least one of $A_1$ to $A_6$ is N; and $R_1$, $R_2$, and $R_3$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ii) a compound of formula IX:

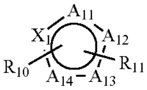

(IX)

wherein:

$A_{11}$ to $A_{14}$ independently comprise C or N, wherein at least one of $A_{11}$ to $A_{14}$ is N;

$X_1$ is O, S, or $NR_{12}$;

$R_{10}$ and $R_{11}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{12}$ is hydrogen, $C_{1-10}$ alkyl, $C_{6-18}$ aryl, or heteroaryl; or (iii) a compound of formula X:

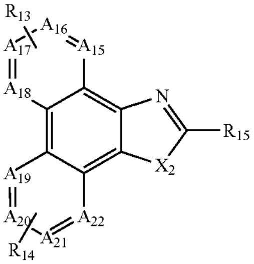

(X)

wherein:

$A_{15}$ to $A_{22}$ independently comprise C or N;

$X_2$ is O or S; and $R_{13}$, $R_{14}$, and $R_{15}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iv) a compound of formula XI:

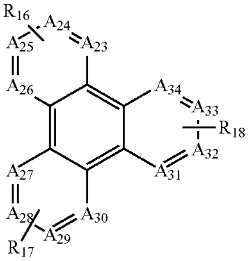

(XI)

wherein:

$A_{23}$ to $A_{34}$ independently comprise C or N; and $R_{16}$, $R_{17}$, and $R^{18}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (v) a compound of formula XII:

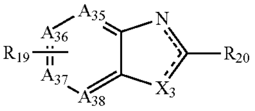

(XII)

wherein:

$A_{35}$ to $A_{38}$ independently comprise C or N;

$X_3$ is O, S, or $NR_{21}$;

$R_{19}$ and $R_{20}$ independently are hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{21}$ is hydrogen, $C_{1-10}$ alkyl, $C_{6-18}$ aryl, or heteroaryl; or (vi) a compound of formula XIII:

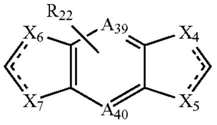

(XIII)

wherein:

$A_{39}$ and $A_{40}$ independently comprise C or N;

$X_4$ to $X_7$ independently comprise C, O, S, or $NR_{23}$, wherein at least one of $X_4$ to $X_7$ is $NR_{23}$;

$R_{22}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{23}$ is hydrogen, $C_{1-10}$ alkyl, $C_{6-18}$ aryl, or heteroaryl; or (vii) a compound of formula XIV:

(XIV)

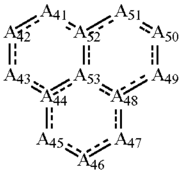

wherein:

$A_{41}$ to $A_{53}$ independently comprise C or N.

(viii) a compound of formula XV:

(XV)

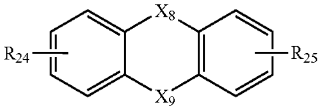

wherein:

$X_8$ is C(O) or $S(O)_2$;

$X_9$ is $CR_{26}R_{27}$, C(O), or $S(O)_2$;

$R_{24}$ and $R_{25}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{26}$ and $R_{27}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ix) a compound of formula XVI:

(XVI)

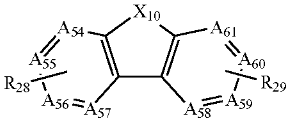

wherein:

$A_{54}$ to $A_{61}$ independently comprise C or N;

$X_{10}$ is $CR_{30}R_{31}$, S, O, or $S(O)_2$;

$R_{28}$ and $R_{29}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{30}$ and $R_{31}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (x) a compound of formula XVII;

(XVII)

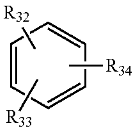

wherein:

$R_{32}$ is —$SO_2$—($C_{6-18}$ aryl), —CN, —C(O)—($C_{6-18}$ aryl), —C(O)—($C_{6-18}$ aryl)-C(O)—($C_{6-18}$ aryl), —$SO_2$—($C_{6-18}$ aryl)-$SO_2$—($C_{6-18}$ aryl), or —B—($C_{6-18}$ aryl)$_2$; $R_{33}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{34}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl;

D is a donor moiety comprising a radical of:

(i') a compound of formula XVIII:

(XVIII)

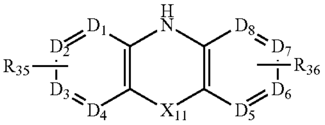

wherein:

$D_1$ to $D_8$ independently comprise C or N;

$X_{11}$ is selected from the group consisting of O, S, $NR_{37}$, $CR_{38}R_{39}$, and $SR_{40}R_{41}$;

$R_{35}$ and $R_{36}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{37}$, $R_{38}$, $R_{39}$, $R_{40}$, and $R_{41}$ are each independently hydrogen, $C_{1-10}$ alkyl, $C_{6-18}$ aryl, or heteroaryl; or (ii') a compound of formula XIX:

(XIX)

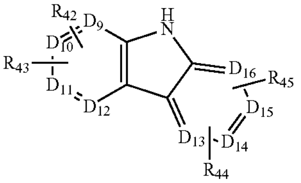

wherein:

$D_9$ to $D_{16}$ independently comprise C or N; and $R_{42}$ to $R_{45}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iii') a compound of formula XX:

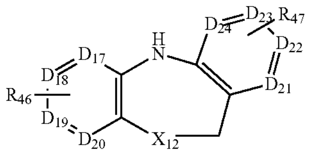

(XX)

wherein:

$D_{17}$ to $D_{24}$ independently comprise C or N;

$X_{12}$ is selected from the group consisting of O, S, $NR_{48}$, $CR_{49}R_{50}$, and $SR_{51}R_{52}$;

$R_{46}$ and $R_{47}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{48}$, $R_{49}$, $R_{50}$, $R_{51}$, and $R_{52}$ are each independently hydrogen, $C_{1-10}$ alkyl, $C_{6-18}$ aryl, or heteroaryl; or (iv') a compound of formula XXI:

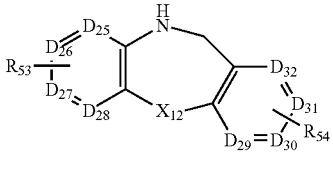

(XXI)

wherein:

$D_{25}$ to $D_{32}$ independently comprise C or N;

$X_{12}$ is selected from the group consisting of O, S, $NR_{55}$, $CR_{56}R_{57}$, and $SR_{58}R_{59}$;

$R_{53}$ and $R_{54}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{55}$, $R_{56}$, $R_{57}$, $R_{58}$, and $R_{59}$ are each independently hydrogen, $C_{1-10}$ alkyl, $C_{6-18}$ aryl, or heteroaryl; or (v') a compound of formula XXII:

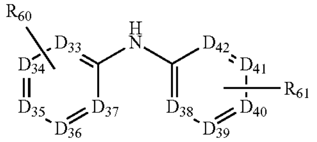

(XXII)

wherein:

$D_{33}$ to $D_{42}$ independently comprise C or N; and $R_{60}$ and $R_{61}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl;

a is an integer between 1 and 4;

d is an integer between 1 and 4; and f is an integer between 1 and 4.

In some embodiments, the nanostructure composition further comprises:

(c) at least one organic resin.

Nanostructure Film Layer

In some embodiments, the present invention provides a nanostructure film layer comprising:

(a) at least one population of nanostructures, wherein the nanostructures comprise ligands bound to the nanostructures; and (b) at least one donor-acceptor ligand bound to the nanostructures.

In some embodiments, the present invention provides a nanostructure film layer comprising:

(a) at least one population of nanostructures, wherein the nanostructures comprise ligands bound to the nanostructures;

(b) at least one donor-acceptor ligand bound to the nanostructures; and (c) at least one organic resin.

In some embodiments, the nanostructure is a quantum dot.

In some embodiments, the nanostructure film layer is an emitting layer.

Organic Resin

In some embodiments, the nanostructure composition further comprises at least one organic resin.

In some embodiments, the nanostructure composition comprises (a) at least one population of nanostructures, wherein between about 10% and about 100% of the nanostructures in the at least one population of nanostructures comprise a donor-acceptor ligand bound to the nanostructures; and (b) at least one organic resin. In some embodiments, the nanostructure is a quantum dot.

In some embodiments, the organic resin is a thermosetting resin or a ultraviolet (UV) curable resin. In some embodiments, the organic resin is cured by a method that facilitates roll-to-roll processing.

Thermosetting resins require curing in which they undergo an irreversible molecular cross-linking process which renders the resin infusible. In some embodiments, the thermosetting resin is an epoxy resin, a phenolic resin, a vinyl resin, a melamine resin, a urea resin, an unsaturated polyester resin, a polyurethane resin, an allyl resin, an acrylic resin, a polyamide resin, a polyamide-imide resin, a phenolamine condensation polymerization resin, a urea melamine condensation polymerization resin, or combinations thereof.

In some embodiments, the thermosetting resin is an epoxy resin. Epoxy resins are easily cured without evolution of volatiles or by-products by a wide range of chemicals. Epoxy resins are also compatible with most substrates and tend to wet surfaces easily. See Boyle, M. A., et al., "Epoxy Resins," Composites, Vol. 21, ASM Handbook, pages 78-89 (2001).

In some embodiments, the organic resin is a silicone thermosetting resin. In some embodiments, the silicone thermosetting resin is OE6630A or OE6630B (Dow Corning Corporation, Auburn, MI).

In some embodiments, a thermal initiator is used. In some embodiments, the thermal initiator is AIBN [2,2'-Azobis(2-methylpropionitrile)] or benzoyl peroxide.

UV curable resins are polymers that cure and quickly harden when exposed to a specific light wavelength. In some embodiments, the UV curable resin is a resin having as a functional group a radical-polymerization group such as a (meth)acrylyloxy group, a vinyloxy group, a styryl group, or a vinyl group; a cation-polymerizable group such as an epoxy group, a thioepoxy group, a vinyloxy group, or an oxetanyl group. In some embodiments, the UV curable resin is a polyester resin, a polyether resin, a (meth)acrylic resin, an epoxy resin, a urethane resin, an alkyd resin, a spiroacetal resin, a polybutadiene resin, or a polythiolpolyene resin.

In some embodiments, the UV curable resin is selected from the group consisting of urethane acrylate, allyloxylated cyclohexyl diacrylate, bis(acryloxy ethyl)hydroxyl isocyanurate, bis(acryloxy neopentylglycol)adipate, bisphernol A diacrylate, bisphenol A dimethacrylate. 1,4-butanediol diacrvlate. 1,4-butanediol dimethacrvlate, 1,3-butyleneglycol diacrylate, 1,3-butyleneglycol dimethacrylate, dicyclopentanyl diacrylate, diethyleneglycol diacrylate, diethyleneglycol dimethacrylate, dipentaerythritol hexaacrylate, dipentaerythritol monohydroxy pentaacrylate, di(trimethylolpropane)tetraacrylate, ethyleneglycol dimethacrylate, glycerol methacrylate, 1,6-hexanediol diacrylate, neopentylglycol dimethacrylate, neopentylglycol hydroxypivalate diacrylate, pentaerythritol triacrylate, pentaerythritol tetraacrylate, phosphoric acid dimethacrylate, polyethyleneglycol diacrylate, polypropyleneglycol diacrylate, tetraethyleneglycol diacrylate, tetrabromobisphenol A diacrylate, triethyleneglycol divinylether, triglycerol diacrylate, trimnethylolpropane triacrylate, tripropyleneglycol diacrylate, tris(acryloxyethyl) isocyanurate, phosphoric acid triacrylate, phosphoric acid diacrylate, acrylic acid propargyl ester, vinyl terminated polydimethylsiloxane, vinyl terminated diphenylsiloxane-dimethylsiloxane copolymer, vinyl terminated polyphenylmethylsiloxane, vinyl terminated trifluoromethylsiloxane-dimethylsiloxane copolymer, vinyl terminated diethylsiloxane-dimethylsiloxane copolymer, vinylmethylsiloxane, monomethacryloyloxypropyl terminated polydimethyl siloxane, monovinyl terminated polydimethyl siloxane, rnonoallyl-mono trimethylsiloxy terminated polyethylene oxide, and combinations thereof.

In some embodiments, the UV curable resin is a mercapto-functional compound that can be cross-linked with an isocyanate, an epoxy, or an unsaturated compound under UV curing conditions. In some embodiments, the polythiol is pentaerythritol tetra(3-mercapto-propionate)(PETMP); trimethylol-propane tri(3-mercapto-propionate) (TMPMIP); glycol di(3-mercapto-propionate)(GDNMP); tris[25-(3-mercapto-propionyloxy)ethyl]isocyanurate (TEMPIC); di-pentaerythritol hexa(3-nercapto-propionate) (Di-PETMP); ethoxylated trimethylolpropane tri(3-mercapto-propionate) (ETTMP 1300 and ETTMP 700); polycaprolactone tetra(3-mercapto-propionate) (PCL4MP 1350); pentaerythritol tetramercaptoacetate (PETMA); trimethylol-propane trimercaptoacetate (TMPMA); or glycol dimercaptoacetate (GDMA). These conpounds are sold under the trade name THIOCURE® by Bruno Bock, Marschacht, Germany.

In some embodiments, the UV curable resin is a polythiol. In some embodiments, the UV curable resin is a polythiol selected from the group consisting of ethylene glycol bis (thioglycolate), ethylene glycol bis(3-mercaptopropionate), trimethylol propane tris (thioglycolate), trimethylol propane tris (3-mercaptopropionate), pentaerythritol tetrakis (thioglycolate), pentaerythritol tetrakis(3-mercaptopropionate) (PETMP), and combinations thereof. In some embodiments, the UV curable resin is PETMP.

In some embodiments, the UV curable resin is a thiol-ene formulation comprising a polythiol and 1,3,5-Triallyl-1,3,5-triazine-2,4,6 (1H,3H,5H)-trione (TTT). In some embodiments, the UV curable resin is a thiol-ene formulation comprising PETMP and TTT.

In some embodiments, the UV curable resin further comprises a photoinitiator. A photoinitiator initiates the crosslinking and/or curing reaction of the photosensitive material during exposure to light. In some embodiments, the photoinitiator is acetophenone-based, benzoin-based, or thioxathenone-based.

In some embodiments, the photoinitiator is a vinyl acrylate-based resin. In some embodments, the photoinitiator is MINS-311RM (Minuta Technology Co., Ltd, Korea).

In some embodiments, the photoinitiator is IRGACURE© 127, IRGACURE© 184, IRGACURE© 184D, IRGACURE© 2022, IRGACURE© 2100, IRGACURE© 250, IRGACURE© 270, IRGACURE© 2959, IRGACURE© 369, IRGACURE© 369 EG, IRGACURE© 379, IRGACURE© 500, IRGACURE© 651, IRGACURE© 754, IRGACURE© 784, IRGACURE© 819, IRGACURE© 819Dw, IRGACURE© 907, IRGACURE© 907 FF, IRGACURE© Oxe01, IRGACURE© TPO-L, IRGACURE® 1173, IRGACURE® 1173D, IRGACURE® 4265, IRGACURE® BP, or IRGACURE® MBF (BASF Corporation, Wyandotte, MI). In some embodiments, the photoinitiator is TPO (2,4,6-trimethylbenzoyl-diphenyl-phosphine oxide) or MBF (methyl benzoylformate).

In some embodiments, the weight percentage of the at least one organic resin in the nanostructure composition is between about 5% and about 99%, about 5% and about 95%, about 5% and about 90%, about 5% and about 80%, about 5% and about 70%, about 5% and about 60%, about 5% and about 50%, about 5% and about 40%, about 5% and about 30%, about 5% and about 20%, about 5% and about 10%, about 10% and about 99%, about 10% and about 95%, about 10% and about 90%, about 10% and about 80%, about 10% and about 70%, about 10% and about 60%, about 10% and about 50%, about 10% and about 40%, about 10% and about 30%, about 10% and about 20%, about 20% and about 99%, about 20% and about 95%, about 20% and about 90%, about 20% and about 80%, about 20% and about 70%, about 20% and about 60%, about 20% and about 50%, about 20% and about 40%, about 20% and about 30%, about 30% and about 99%, about 30% and about 95%, about 30% and about 90%, about 30% and about 80%, about 30% and about 70%, about 30% and about 60%, about 30% and about 50%, about 30% and about 40%, about 40% and about 99%, about 40% and about 95%, about 40% and about 90%, about 40% and about 80%, about 40% and about 70%, about 40% and about 60%, about 40% and about 50%, about 50% and about 99%, about 50% and about 95%, about 50% and about 90%, about 50% and about 80%, about 50% and about 70%, about 50% and about 60%, about 60% and about 99%, about 60% and about 95%, about 60% and about 90%, about 60% and about 80%, about 60% and about 70%, about 70% and about 99%, about 70% and about 95%, about 70% and about 90%, about 70% and about 80%, about 80% and about 99%, about 80% and about 95%, about 80% and about 90%, about 90% and about 99%, about 90% and about 95%, or about 95% and about 99%.

In some embodiments, the weight percentage of the organic resin in the nanostructure molded article is between about 5% and about 99%, about 5% and about 95%, about 5% and about 90%, about 5% and about 80%, about 5% and about 70%, about 5% and about 60%, about 5% and about 50%, about 5% and about 40%, about 5% and about 30%, about 5% and about 20%, about 5% and about 10%, about 10% and about 99%, about 10% and about 95%, about 10% and about 90%, about 10% and about 80%, about 10% and about 70%, about 10% and about 60%, about 10% and about 50%, about 10% and about 40%, about 10% and about 30%, about 10% and about 20%, about 20% and about 99%, about 20% and about 95%, about 20% and about 90%, about 20% and about 80%, about 20% and about 70%, about 20% and about 60%, about 20% and about 50%, about 20% and about 40%, about 20% and about 30%, about 30% and about 99%, about 30% and about 95%, about 30% and about 90%, about 30% and about 80%, about 30% and about 70%, about 30% and about 60%, about 30% and about 50%, about 30% and about 40%, about 40% and about 99%, about 40% and about 95%, about 40% and about 90%, about 40% and about 80%, about 40% and about 70%, about 40% and about 60%, about 40% and about 50%, about 50% and about 99%, about 50% and about 95%, about 50% and about 90%, about 50% and about 80%, about 50% and about 70%, about 50% and about 60%, about 60% and about 99%, about 60% and about 95%, about 60% and about 90%, about 60% and about 80%, about 60% and about 70%, about 70% and about 99%, about 70% and about 95%, about 70% and about 90%, about 70% and about 80%, about 80% and about 99%, about 80% and about 95%, about 80% and about 90%, about 90% and about 99%, about 90% and about 95%, or about 95% and about 99%.

Illumination Devices

In some embodiments, the nanostructure composition is used to form the emitting layer of an illumination device. The illumination device may be used in a wide variety of applications, such as flexible electronics, touchscreens, monitors, televisions, cellphones, and any other high definition displays. In some embodiments, the illumination device is a light emitting diode. In some embodiments, the illumination device is a quantum dot light emitting diode (QLED). An example of a QLED is disclosed in U.S. Patent Appl. Publication No. 2018/0158984, which is incorporated herein by reference in its entirety.

In some embodiments, the present disclosure provides a light emitting diode comprising:

(a) a first conductive layer;

(b) a second conductive layer; and (c) an emitting layer between the first conductive layer and the second conductive layer, wherein the emitting layer comprises at least one population of nanostructures comprising a donor-acceptor ligand bound to the nanostructures.

In some embodiments, the donor-acceptor ligand is a bipolar ligand. In some embodiments, the donor-acceptor ligand is a TADF ligand.

In some embodiments, the light emitting diode comprises a first conductive layer, a second conductive layer, and an emitting layer, wherein the emitting layer is arranged between the first conductive layer and the second conductive layer. In some embodiments, the emitting layer is a thin film.

In some embodiments, the light emitting diode comprises additional layers between the first conductive layer and the second conductive layer such as a hole injection layer, a hole transport layer, and an electron transport layer. In some embodiments, the hole injection layer, the hole transport layer, and the electron transport layer are thin films. In some embodiments, the layers are stacked on a substrate.

When voltage is applied to the first conductive layer and the second conductive layer, holes injected at the first conductive layer move to the emitting layer via the hole injection layer and/or the hole transport layer, and electrons injected from the second conductive layer move to the emitting layer via the electron transport layer. The holes and electrons recombine in the emitting layer to generate excitons.

Substrate

The substrate may be any substrate that is commonly used in the manufacture of light emitting diodes. In some embodiments, the substrate is a transparent substrate, such as glass. In some embodiments, the substrate is a flexible material such as polyimide, or a flexible and transparent material such as polyethylene terephthalate. In some embodiments, the substrate has a thickness of about 0.1 mm to 2 mm. In some embodiments, the substrate is a glass substrate, a plastic substrate, a metal substrate, or a silicon substrate.

First Conductive Layer

In some embodiments, a first conductive layer is disposed on the substrate. In some embodiments, the first conductive layer is a stack of conductive layers. In some embodiments, the first conductive layer has a thickness between about 50 nm and about 250 nm. In some embodiments, the first conductive layer is deposited as a thin film using any known deposition technique, such as, for example, sputtering or electron-beam evaporation. In some embodiments, the first conductive layer comprises indium tin oxide (ITO), indium zinc oxide (IZO), tin dioxide ($SnO_2$), zinc oxide (ZnO), magnesium (Mg), aluminum (Al), aluminum-lithium (Al—Li), calcium (Ca), magnesium-indium (Mg—In), magnesium-silver (Mg—Ag), silver (Ag), gold (Au), or mixtures thereof. In some embodiments, the first conductive layer is an anode.

Second Conductive Layer

In some embodiments, the total layer structure may be sandwiched between a first conductive layer and a second conductive layer. In some embodiments, the first conductive layer acts as the anode of the device while second conductive layer acts as the cathode of the device. In some embodiments, the second conductive layer is a metal, such as aluminum. In some embodiments, the second conductive layer has a thickness between about 100 nm and about 150 nm. In some embodiments, the second conductive layer represents a stack of conductive layers. For example, a second conductive layer may include a layer of silver sandwiched between two layers of ITO (ITO/Ag/ITO).

In some embodiments, the second conductive layer comprises indium tin oxide (ITO), an alloy of indium oxide and zinc (IZO), titanium dioxide, tin oxide, zinc sulfide, silver (Ag), or mixtures thereof.

Semiconductor Polymer Layer

In some embodiments, the light emitting diode further comprises a semiconductor polymer layer. In some embodiments, the semiconductor polymer layer acts as a hole injection layer. In some embodiments, the semiconductor polymer layer is deposited on the first conductive layer. In some embodiments, the semiconductor polymer layer is deposited by vacuum deposition, spin-coating, printing, casting, slot-die coating, or Langmuir-Blodgett (LB) deposition. In some embodiments, the semiconductor polymer layer has a thickness between about 20 nm and about 60 nm.

In some embodiments, the semiconductor polymer layer comprises copper phthalocyanine, 4,4',4"-tris[(3-methylphenyl)phenylamino]triphenylamine (m-MTDATA), 4,4',4"-tris(diphenylamino)triphenylamine (TDATA), 4,4',4"-tris[2-naphthyl(phenyl)amino]triphenylamine (2T-NATA), polyaniline/dodecylbenzenesulfonic acid, poly(3,4-ethylenedioxythiophene)/polystyrene sulfonate)(PEDOT/PSS), polyaniline/camphor sulfonic acid, or polyaniline/poly(4-styrenesulfonate).

First Transport Layer

In some embodiments, the light emitting diode further comprises transport layers to facilitate the transport of electrons and holes affected by the generated electric field between the first conductive layer and the second conductive layer. In some embodiments, the light emitting diode further comprises a first transport layer associated with the first conductive layer. In some embodiments, the first transport layer acts as a hole transport layer (and an electron and/or exciton blocking layer). In some embodiments, the first transport layer is deposited on the first conductive layer. In some embodiments, the first transport layer is deposited on the semiconductor polymer layer. In some embodiments, the first transport layer has a thickness between about 20 nm and about 50 nm. In some embodiments, the first transport layer is substantially transparent to visible light.

In some embodiments, the first transport layer comprises a material selected from the group consisting of an amine, a triarylamine, a thiophene, a carbazole, a phthalocyanine, a porphyrin, or a mixture thereof. In some embodiments, the first transport layer comprises N,N'-di(naphthalen-1-yl)-N, N'-bis(4-vinylphenyl)-4,4'-diamine, poly[(9,9-dioctylfluorenyl-2,7-diyl)-co-(4,4'-(N-(4-sec-butylphenyl))diphenylamine)], or poly(9-vinylcarbazole).

Second Transport Layer

In some embodiments, the light emitting diode further comprises a second transport layer. In some embodiments, the second transport layer acts as an electron transport layer (and a hole and/or exciton blocking layer). In some embodiments, the second transport layer contacts the emitting layer. In some embodiments, the second transport layer is arranged between the emitting layer and the second conductive layer. In some embodiments, the second transport layer has a thickness between about 20 nm and about 50 nm. In some embodiments, the second transport layer is substantially transparent to visible light.

In some embodiments, the second transport layer comprises a material selected from the group consisting of an imidazole, a pyridine, a pyrimidine, a pyridazine, a pyraxine, an oxadiazole, a chinoline, a chinoxaline, an anthracene, a benzanthracene, a pyrene, a perylene, a benzimidazole, a triazine, a ketone, a phosphinoxide, a phenazine, a phenanthroline, a triarylborane, a metal oxide, and combinations thereof. In some embodiments, the second transport layer comprises 1,3-bis(3,5-dipyrid-3-ylphenyl)benzene (B3PyPB), bathocuproine, bathophenanthroline, 3-(biphenyl-4-yl)-5-(4-tert-butylphenyl)-4-phenyl-4H-1,2,4-triazole, 2-(4-biphenylyl)-5-phenyl-1,3,4-oxadiazole, 3,5-bis(4-tert-butylphenyl)-4-phenyl-4H-1,2,4-triazole, bis(8-hydroxy-2-methylquinoline)-(4-phenylphenoxy)aluminum, 2,5-bis(1-naphthyl)-1,3,4-oxadiazole, 3,5-diphenyl-4-(1-naphthyl)-1H-1,2,4-triazole, 1,3,5-tri(m-pyridin-3-ylphenyl)benzene (TmPyPB), 2,2',2"-(1,3,5-benzinetriyl)-tris(1-phenyl-1-H-benzimidazole)(TPBi), tris-(8-hydroxyquinoline)aluminum, $TiO_2$, ZnO, $SnO_2$, $SiO_2$, $ZrO_2$, or ZnMgO. In some embodiments, the second transport layer comprises ZnMgO.

The roles of the first transport layer and the second transport layer are reversed when the polarity of the first conductive layer and the second conductive layer are reversed.

Emitting Layer

Sandwiched between the first transport layer and the second transport layer is an emitting layer that comprises at least one population of nanostructures comprising a donor-acceptor ligand bound to the nanostructures. The emitting layer may be formed by depositing an admixture of at least one population of nanostructures comprising a donor-acceptor ligand bound to the nanostructures and a solvent and allowing the solvent to evaporate. In some embodiments, the solvent evaporates at room temperature. In some embodiments, heat is applied to the deposited film to hasten the evaporation of the solvent. In some embodiments, the admixture of nanostructures and solvent is deposited using a spin-coating technique. In some embodiments, the thickness of the emitting layer is between about 10 nm and about 50 nm.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Example 1

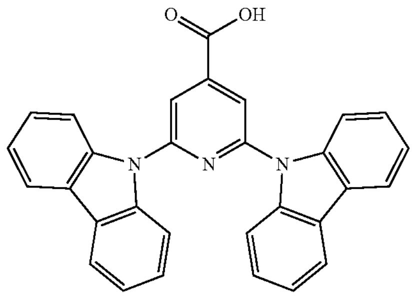 [SMILES: O=C(O)c1cc(-n2c3ccccc3c3ccccc32)nc(-n2c3ccccc3c3ccccc32)c1]

Synthesis of 2,6-di(9H-carbazol-9-yl)isonicotinic acid 9H-carbazole (1.002 g, 6 mmol) in dehydrated N,N-dimethylformamide (20 mL) was added dropwise into a dehydrated N—N-dimethylformamide (20 mL) solution containing potassium tert-butoxide (0.672 g, 6 mmol) for 15 minutes followed by stirring for 3 hours. A solution of tert-butyl 2,6-dichloroisonicotinate (0.7443 g, 3 mmol) in dehydrated N,N-dimethylformamide (10 mL) was added dropwise over 15 minutes. The solution was then stirred for 10 hours at 80° C. Then sodium bicarbonate (350 g) dissolved in water was added to the solution and the white precipitate was filtered and dried under vacuum. The product was purified by column chromatography on silica gel.

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A nanostructure composition comprising:

(a) at least one population of nanostructures comprising an InP core, a ZnS shell, and a ZnSe shell; and (b) at least one donor-acceptor ligand, wherein the donor-acceptor ligand comprises at least one terminal functional group, and wherein the at least one terminal functional group is bound to the surface of the nanostructures, wherein the donor-acceptor ligand has formula I or formula II:

$D_d$-$A_a$-$FG_f$ (I) or $A_a$-$D_d$-$FG_f$ (II)

wherein:

FG is —OH, —SH, —$NH_2$, —$CO_2H$, —P(O)$(OH)_2$, —P(O)OH, or —$SO_3H$;

D is a donor moiety comprising a monocyclic or fused polycyclic aryl or heteroaryl comprising between 5 and 20 atoms, optionally substituted with one or more substituents;

A is an acceptor moiety comprising for each occurrence independently, a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4.

2. The nanostructure composition of claim 1, wherein FG is —$CO_2H$.

3. The nanostructure composition of claim 1, wherein A is an acceptor moiety comprising a radical of:

(i) a compound of formula V:

(V)

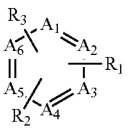

wherein $A_1$ to $A_6$ independently comprise C or N, and at least one of $A_1$ to $A_6$ is N; and $R_1$, $R_2$, and $R_3$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, C(O)$C_{1-3}$ haloalkyl, —$SO_2H$, —$NO_2$, —CN, halogen, cycloalkyl, or $C_{6-18}$ haloaryl; or (ii) a compound of formula IX:

(IX)

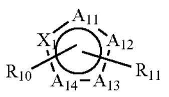

wherein:

$A_{11}$ to $A_{14}$ independently comprise C or N, wherein at least one of $A_{11}$ to $A_{14}$ is N;

$X_1$ is O, S, or $NR_{12}$; $R_{10}$ and $R_{11}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, C(O)$C_{1-3}$ haloalkyl, —$SO_2H$, —$NO_2$, —CN, halogen, cycloalkyl, or $C_{6-18}$ haloaryl; and $R_{12}$ is hydrogen, $C_{1-10}$ alkyl, $C_{6-18}$ aryl, or heteroaryl; or (iii) a compound of formula X:

(X)

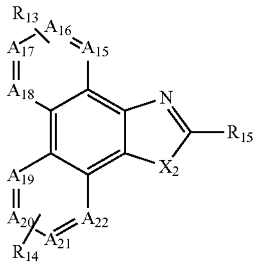

wherein:

$A_{15}$ to $A_{22}$ independently comprise C or N;

$X_2$ is O or S; and $R_{13}$, $R_{14}$, and $R_{15}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, C(O)$C_{1-3}$ haloalkyl, —$SO_2H$, —$NO_2$, —CN, halogen, cycloalkyl, or $C_{6-18}$ haloaryl; or (iv) a compound of formula XI:

(XI)

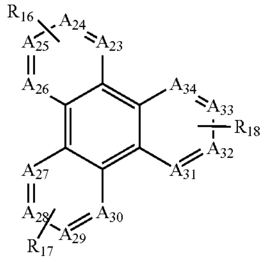

wherein:

$A_{23}$ to $A_{34}$ independently comprise C or N; and $R_{16}$, $R_{17}$, and $R_{18}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, C(O)$C_{1-3}$ haloalkyl, —$SO_2H$, —$NO_2$, —CN, halogen, cycloalkyl, or $C_{6-18}$ haloaryl; or (v) a compound of formula XII:

(XII)

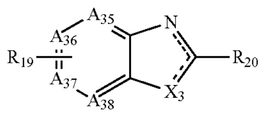

wherein:

$A_{35}$ to $A_{38}$ independently comprise C or N;

$X_3$ is O, S, or $NR_{21}$;

$R_{19}$ and $R_{20}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, C(O)$C_{1-3}$ haloalkyl, —$SO_2H$, —$NO_2$, —CN, halogen, cycloalkyl, or $C_{6-18}$ haloaryl; and $R_{21}$ is hydrogen, $C_{1-10}$ alkyl, $C_{6-18}$ aryl, or heteroaryl; or (vi) a compound of formula XIII:

(XIII)

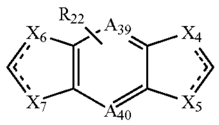

wherein:

$A_{39}$ and $A_{40}$ independently comprise C or N;

$X_4$ to $X_7$ independently comprise C, O, S, or $NR_{23}$, wherein at least one of $X_4$ to $X_7$ is $NR_{23}$;

$R_{22}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{23}$ is hydrogen, $C_{1-10}$ alkyl, $C_{6-18}$ aryl, or heteroaryl; or (vii) a compound of formula XIV:

(XIV)

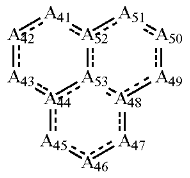

wherein:

$A_{41}$ to $A_{53}$ independently comprise C or N; or (viii) a compound of formula XV:

(XV)

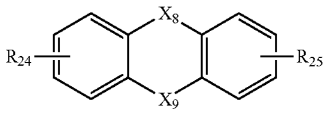

wherein:

$X_8$ is C(O) or $S(O)_2$;

$X_9$ is $CR_{26}R_{27}$, C(O), or $S(O)_2$;

$R_{24}$ and $R_{25}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{26}$ and $R_{27}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ix) a compound of formula XVI:

(XVI)

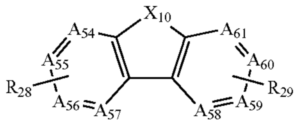

wherein:

$A_{54}$ to $A_{61}$ independently comprise C or N;

$X_{10}$ is $CR_{30}R_{31}$, S, O, or $S(O)_2$;

$R_{28}$ and $R_{29}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{30}$ and $R_{31}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (x) a compound of formula XVII:

(XVII)

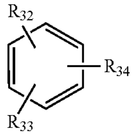

wherein:

$R_{32}$ is —$SO_2$—($C_{6-18}$ aryl), —CN, —C(O)—($C_{6-18}$ aryl), —C(O)—($C_{6-18}$ aryl)-C(O)—($C_{6-18}$ aryl), —$SO_2$—($C_{6-18}$ aryl)-$SO_2$—($C_{6-18}$ aryl), or —B—($C_{6-18}$ aryl)$_2$;

$R_{33}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{34}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

4. The nanostructure composition of claim 1, wherein A is an acceptor moiety that is a radical of a compound having formula V:

(V)

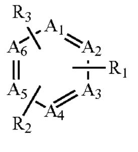

wherein:

$A_1$ to $A_6$ independently comprise C or N, and at least one of $A_1$ to $A_6$ is N; and $R_1$, $R_2$, and $R_3$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

5. The nanostructure composition of claim 4, wherein at least one of $R_1$, $R_2$, or $R_3$ is —CN, methyl, phenyl, or pyridine.

6. The nanostructure composition of claim 1, wherein D is a donor moiety comprising a radical of:

(i') a compound of formula XVIII:

(XVIII)

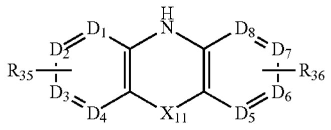

wherein:

$D_1$ to $D_8$ independently comprise C or N;

$X_{11}$ is selected from the group consisting of O, S, $NR_{37}$, $CR_{38}R_{39}$, and $SR_{40}R_{41}$;

$R_{35}$ and $R_{36}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{37}$, $R_{38}$, $R_{39}$, $R_{40}$, and $R_{41}$ are each independently hydrogen, $C_{1-10}$ alkyl, $C_{6-18}$ aryl, or heteroaryl; or (ii') a compound of formula XIX:

(XIX)

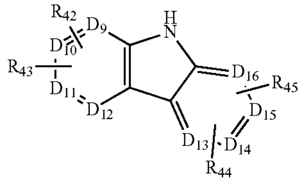

wherein:

$D_9$ to $D_{16}$ independently comprise C or N; and $R_{42}$ and $R_{45}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iii') a compound of formula XX:

(XX)

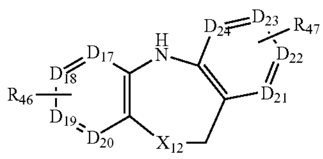

wherein:

$D_{17}$ to $D_{24}$ independently comprise C or N;

$X_{12}$ is selected from the group consisting of O, S, $NR_{48}$, $CR_{49}R_{50}$, and $SR_{51}R_{52}$;

$R_{46}$ and $R_{47}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{48}$, $R_{49}$, $R_{50}$, $R_{51}$, and $R_{52}$ are each independently hydrogen, $C_{1-10}$ alkyl, $C_{6-18}$ aryl, or heteroaryl; or (iv') a compound of formula XXI:

(XXI)

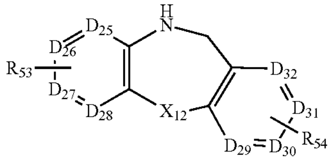

wherein:

$D_{25}$ to $D_{32}$ independently comprise C or N;

$X_{12}$ is selected from the group consisting of O, S, $NR_{55}$, $CR_{56}R_{57}$, and $SR_{58}R_{59}$;

$R_{53}$ and $R_{54}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{55}$, $R_{56}$, $R_{57}$, $R_{58}$, and $R_{59}$ are each independently hydrogen, $C_{1-10}$ alkyl, $C_{6-18}$ aryl, or heteroaryl; or (v') a compound of formula XXII:

(XXII)

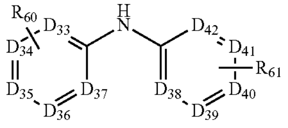

wherein:

$D_{33}$ to $D_{42}$ independently comprise C or N; and $R_{60}$ and $R_{61}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

7. The nanostructure composition of claim 1, wherein D is an donor moiety that is a radical of a compound having formula XIX:

(XIX)

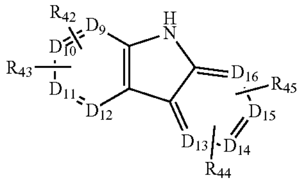

wherein:

$D_9$ to $D_{16}$ independently comprise C or N; and $R_{42}$ to $R_{45}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

8. The nanostructure composition of claim 7, wherein $D_9$ to $D_{16}$ are C.

9. The nanostructure composition of claim 7, wherein at least one of $R_{42}$ to $R_{45}$ is $C_{1-10}$ alkyl, carbazole, or diphenyl amine.

10. An illumination device comprising the nanostructure composition of claim 1.

11. The illumination device of claim 10, wherein the illumination device is a touchscreen, a monitor, a television, a cellphone, or a light emitting diode.

12. A method of replacing a first ligand on a nanostructure with a second ligand, the method comprising:

admixing a reaction mixture comprising a population of nanostructures comprising an InP core, a ZnS shell, and a ZnSe shell, each nanostructure having the first ligand bound to the nanostructure and a donor-acceptor ligand as the second ligand, such that the second ligand displaces the first ligand and becomes bound to the nanostructure, wherein the donor-acceptor ligand has formula I or formula II:

$D_d$-$A_a$-$FG_f$ (I) or $A_a$-$D_d$-$FG_f$ (II)

wherein:

FG is —OH, —SH, —$NH_2$, —$CO_2H$, —$P(O)(OH)_2$, —P(O)OH, or —$SO_3H$;

D is a donor moiety comprising a monocyclic or fused polycyclic aryl or heteroaryl comprising between 5 and 20 atoms, optionally substituted with one or more substituents;

A is an acceptor moiety comprising for each occurrence independently, a monocyclic or fused polycyclic aryl or heteroaryl comprising between 5 and 20 atoms, optionally substituted with one or more substituents;

a is an integer between 1 and 4;

d is an integer between 1 and 4; and f is an integer between 1 and 4.

13. The method of claim 12, wherein A is an acceptor moiety comprising a radical of:

(i) a compound of formula V:

(V)

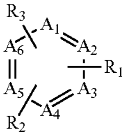

wherein:

$A_1$ to $A_6$ independently comprise C or N, and at least one of $A_1$ to $A_6$ is N; and $R_1$, $R_2$, and $R_3$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ii) a compound of formula IX:

(IX)

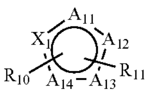

wherein:

$A_{11}$ to $A_{14}$ independently comprise C or N, wherein at least one of $A_{11}$ to $A_{14}$ is N;

$X_1$ is O, S, or $NR_{12}$;

$R_{10}$ and $R_{11}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{12}$ is hydrogen, $C_{1-10}$ alkyl, $C_{6-18}$ aryl, or heteroaryl; or (iii) a compound of formula X:

(X)

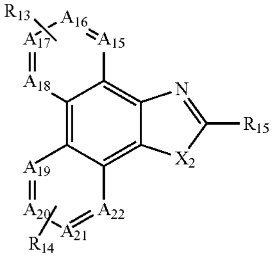

wherein:

$A_{15}$ to $A_{22}$ independently comprise C or N;

$X_2$ is O or S; and $R_{13}$, $R_{14}$, and $R_{15}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iv) a compound of formula XI:

(XI)

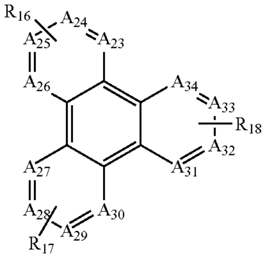

wherein:

$A_{23}$ to $A_{34}$ independently comprise C or N; and $R_{16}$, $R_{17}$, and $R_{18}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (v) a compound of formula XII:

(XII)

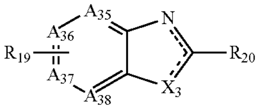

wherein:

$A_{35}$ to $A_{38}$ independently comprise C or N;

$X_3$ is O, S, or $NR_{21}$;

$R_{19}$ and $R_{20}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{21}$ is hydrogen, $C_{1-10}$ alkyl, $C_{6-18}$ aryl, or heteroaryl; or (vi) a compound of formula XIII:

(XIII)

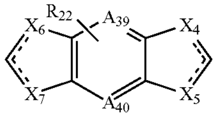

wherein:

$A_{39}$ and $A_{40}$ independently comprise C or N;

$X_4$ to $X_7$ independently comprise C, O, S, or $NR_{23}$, wherein at least one of $X_4$ to $X_7$is $NR_{23}$;

$R_{22}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{23}$ is hydrogen, $C_{1-10}$ alkyl, $C_{6-18}$ aryl, or heteroaryl; or (vii) a compound of formula XIV:

(XIV)

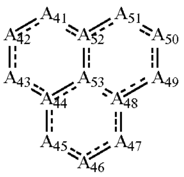

wherein:

$A_{41}$ to $A_{53}$ independently comprise C or N; or (viii) a compound of formula XV:

(XV)

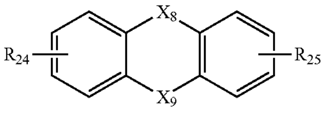

wherein:

$X_8$ is C(O) or $S(O)_2$;

$X_9$ is $CR_{26}R_{27}$, C(O), or $S(O)_2$;

$R_{24}$ and $R_{25}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{26}$ and $R_{27}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (ix) a compound of formula XVI:

(XVI)

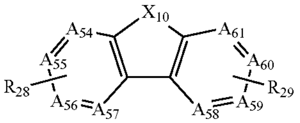

wherein:

$A_{54}$ to $A_{61}$ independently comprise C or N;

$X_{10}$ is $CR_{30}R_{31}$, S, O, or $S(O)_2$;

$R_{28}$ and $R_{29}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{30}$ and $R_{31}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (x) a compound of formula XVII:

(XVII)

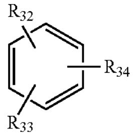

wherein:

$R_{32}$ is —$SO_2$—($C_{6-18}$ aryl), —CN, —C(O)—($C_{6-18}$ aryl), —C(O)—($C_{6-18}$ aryl)-C(O)—($C_{6-18}$ aryl), —$SO_2$—($C_{6-18}$ aryl)-$SO_2$—($C_{6-18}$ aryl), or —B—($C_{6-18}$ aryl)$_2$;

$R_{33}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{34}$ is hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

14. The method of claim 12, wherein D is a donor moiety comprising a radical of:

(i') a compound of formula XVIII:

(XVIII)

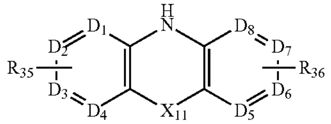

wherein:

$D_1$ to $D_8$ independently comprise C or N;

$X_{11}$ is selected from the group consisting of O, S, $NR_{37}$, $CR_{38}R_{39}$, and $SR_{40}R_{41}$;

$R_{35}$ and $R_{36}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{37}$, $R_{38}$, $R_{39}$, $R_{40}$, and $R_{41}$ are each independently hydrogen, $C_{1-10}$ alkyl, $C_{6-18}$ aryl, or heteroaryl; or (ii') a compound of formula XIX:

(XIX)

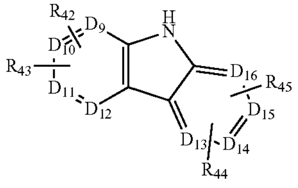

wherein:

$D_9$ to $D_{16}$ independently comprise C or N; and $R_{42}$ and $R_{45}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; or (iii') a compound of formula XX:

(XX)

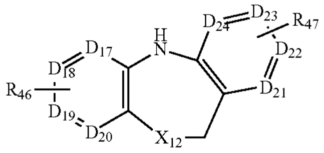

wherein:

$D_{17}$ to $D_{24}$ independently comprise C or N;

$X_{12}$ is selected from the group consisting of O, S, $NR_{48}$, $CR_{49}R_{50}$, and $SR_{51}R_{52}$;

$R_{46}$ and $R_{47}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{48}$, $R_{49}$, $R_{50}$, $R_{51}$, and $R_{52}$ are each independently hydrogen, $C_{1-10}$ alkyl, $C_{6-18}$ aryl, or heteroaryl; or (iv') a compound of formula XXI:

(XXI)

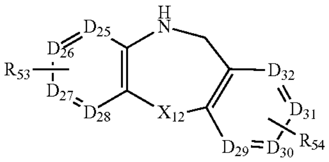

wherein:

$D_{25}$ to $D_{32}$ independently comprise C or N;

$X_{12}$ is selected from the group consisting of O, S, $NR_{55}$, $CR_{56}R_{57}$, and $SR_{58}R_{59}$;

$R_{53}$ and $R_{54}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl; and $R_{55}$, $R_{56}$, $R_{57}$, $R_{58}$, and $R_{59}$ are each independently hydrogen, $C_{1-10}$ alkyl, $C_{6-18}$ aryl, or heteroaryl; or (v') a compound of formula XXII:

(XXII)

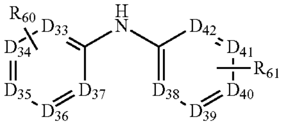

wherein:

$D_{33}$ to $D_{42}$ independently comprise C or N; and $R_{60}$ and $R_{61}$ are each independently hydrogen, $C_{1-10}$ alkyl, $C_{2-10}$ alkenyl, $C_{2-10}$ alkynyl, $C_{6-18}$ aryl, heteroaryl, $C_{1-10}$ alkoxy, $C_{1-10}$ haloalkyl, $C(O)C_{1-3}$ haloalkyl, —$SO_2H$, —$NO_2$, —CN, halogen, cycloalkyl, or $C_{6-18}$ haloaryl.

15. The method of claim 12, wherein the second ligand displaces between about 30% and about 100% on a molar basis of the first ligand on the nanostructure.

16. The method of claim 12, wherein the admixing is at a temperature between about 20° C. and about 100° C.

* * * * *